US011514917B2

(12) United States Patent
Kang et al.

(10) Patent No.: US 11,514,917 B2
(45) Date of Patent: Nov. 29, 2022

(54) METHOD, DEVICE, AND SYSTEM OF SELECTIVELY USING MULTIPLE VOICE DATA RECEIVING DEVICES FOR INTELLIGENT SERVICE

(71) Applicant: Samsung Electronics Co., Ltd., Gyeonggi-do (KR)

(72) Inventors: Junghwan Kang, Gyeonggi-do (KR); Sungwoon Jang, Gyeonggi-do (KR); Sangki Kang, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 160 days.

(21) Appl. No.: 16/547,088

(22) Filed: Aug. 21, 2019

(65) Prior Publication Data

US 2020/0066279 A1 Feb. 27, 2020

(30) Foreign Application Priority Data

Aug. 27, 2018 (KR) .......................... 10-2018-0100238
Feb. 28, 2019 (KR) .......................... 10-2019-0024396

(51) Int. Cl.
*G10L 15/32* (2013.01)
*G10L 15/22* (2006.01)
(Continued)

(52) U.S. Cl.
CPC .............. *G10L 15/32* (2013.01); *G06F 3/167* (2013.01); *G10L 15/20* (2013.01); *G10L 15/22* (2013.01);
(Continued)

(58) Field of Classification Search
CPC ......... G06F 3/167; G10L 15/32; G10L 15/20; G10L 15/30; G10L 25/84; G10L 2015/223; G10L 15/228
See application file for complete search history.

(56) References Cited

U.S. PATENT DOCUMENTS 9,070,367 B1* 6/2015 Hoffmeister .......... G10L 15/063
9,491,522 B1* 11/2016 Trollope .......... H04N 21/41407
(Continued)

FOREIGN PATENT DOCUMENTS

JP 2017-010518 1/2017
KR 1020090084212 8/2009
(Continued)

OTHER PUBLICATIONS

KR20150103586A Machine Translation (Year: 2015).*
(Continued)

*Primary Examiner* — Daniel C Washburn
*Assistant Examiner* — Athar N Pasha
(74) *Attorney, Agent, or Firm* — The Farrell Law Firm, P.C.

(57) ABSTRACT

An electronic device is provided, which includes a user interface, at least one communication module, a microphone, at least one speaker, at least one processor operatively connected with the user interface, the at least one communication module, the microphone, and the at least one speaker, and at least one memory operatively connected with the at least one processor, wherein the at least one memory stores instructions, which when executed, instruct the at least one processor to while the electronic device is wiredly or wirelessly connected with an access point (AP) connected with at least one external electronic device, after receiving, through the microphone, part of a wake-up utterance to invoke a voice-based intelligent assistant service, broadcast identification information about the electronic device and receive identification information broadcast from the external electronic device, after receiving the whole wake-up utterance through the microphone, individually transmit first information related to the wake-up utterance received through the microphone to the at least one external electronic device and individually receive, from the external electronic device, second information related to the wake-up utterance received by the at least one external electronic device, and determine whether to transmit voice information
(Continued)

received after the wake-up utterance to an external server based on at least part of the first information and the second information. Other various embodiments are possible as well.

13 Claims, 39 Drawing Sheets

(51) Int. Cl.
*G10L 15/20* (2006.01)
*G10L 25/84* (2013.01)
*G06F 3/16* (2006.01)
*G10L 15/30* (2013.01)

(52) U.S. Cl.
CPC .............. *G10L 15/30* (2013.01); *G10L 25/84* (2013.01); *G10L 2015/223* (2013.01); *G10L 2015/228* (2013.01)

(56) References Cited

U.S. PATENT DOCUMENTS

| | | | | |
|---|---|---|---|---|
| 10,685,652 | B1* | 6/2020 | Cherukuri | ............... G10L 15/22 |
| 2007/0021957 | A1* | 1/2007 | Granger | ............... H04M 3/561 |
| | | | | 704/200 |
| 2014/0249817 | A1 | 9/2014 | Hart et al. | |
| 2016/0104480 | A1* | 4/2016 | Sharifi | .................... G10L 15/32 |
| | | | | 704/254 |
| 2016/0210964 | A1 | 7/2016 | Kurata et al. | |
| 2016/0379121 | A1 | 12/2016 | Ge et al. | |
| 2017/0083285 | A1 | 3/2017 | Meyers et al. | |
| 2017/0330566 | A1* | 11/2017 | Trott | ........................ G10L 15/30 |
| 2017/0357478 | A1 | 12/2017 | Piersol et al. | |

FOREIGN PATENT DOCUMENTS

| | | | |
|---|---|---|---|
| KR | 1020100066918 | | 6/2010 |
| KR | 20150103586 A | * | 9/2015 |
| KR | 1020150103586 | | 9/2015 |
| WO | WO 2018/067528 | | 4/2018 |

OTHER PUBLICATIONS

International Search Report dated Dec. 9, 2019 issued in counterpart application No. PCT/KR2019/010918, 9 pages.
Anonymous, "User Datagram Protocol", Wikipedia, XP055551734, Sep. 12, 2010, 7 pages.
European Search Report dated Oct. 1, 2021 issued in counterpart application No. 19854239.1-1203, 9 pages.

* cited by examiner

FIG.9A

| | | |
|---|---|---|
| 911 — 10.251.xx.3 | 100 | ← Highest SNR (919) |
| 913 — 10.251.xx.1 | 50 | 921 |
| 915 — 10.251.xx.2 | 60 | 923 |
| 917 — 10.251.xx.4 | 70 | 925 |

| | | |
|---|---|---|
| 961 — 10.251.xx.3 | 80 | ← Highest Confidence Score (959) |
| 953 — 10.251.xx.1 | 20 | 961 |
| 955 — 10.251.xx.2 | 30 | 962 |
| 957 — 10.251.xx.4 | 40 | 965 |

950

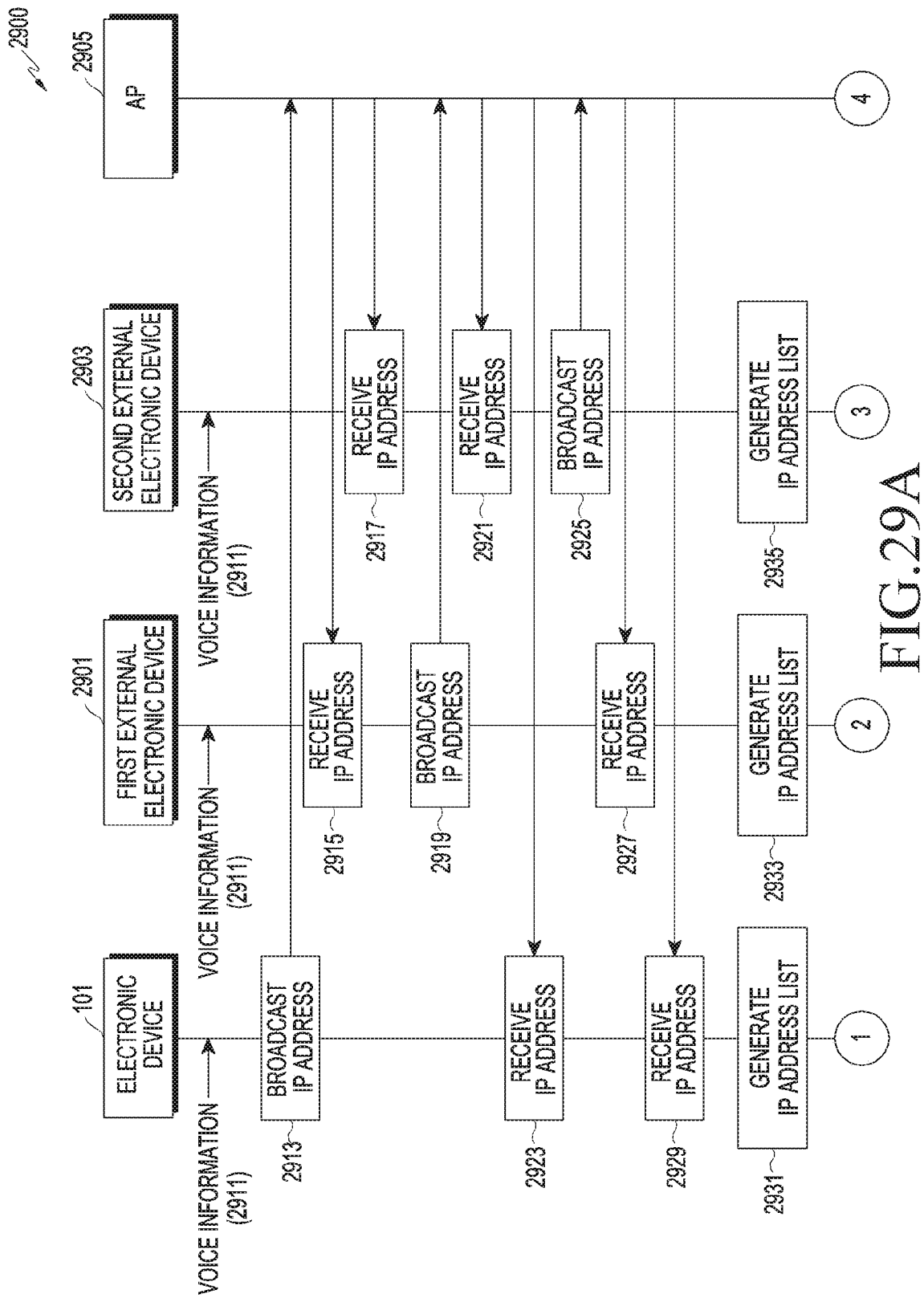

METHOD, DEVICE, AND SYSTEM OF SELECTIVELY USING MULTIPLE VOICE DATA RECEIVING DEVICES FOR INTELLIGENT SERVICE

CROSS-REFERENCE TO RELATED APPLICATION(S)

This application is based on and claims priority under 35 U.S.C. § 119 to Korean Patent Application No. 10-2018-0100238, filed on Aug. 27, 2018, in the Korean Intellectual Property Office, and Korean Patent Application No. 10-2019-0024396, filed on Feb. 28, 2019, in the Korean Intellectual Property Office, the entire disclosure of each of which is incorporated herein by reference.

BACKGROUND

1. Field

The disclosure relates generally to intelligent services, and more specifically, to methods, devices, and systems of selecting a device to receive voice from among a plurality of voice receiving devices.

2. Description of Related Art

Electronic devices, such as smart televisions (TVs), smartphones, air conditioners, refrigerators, speakers, etc., are able to provide an intelligent assistant service for performing various tasks in response to user voice input.

To use a voice-based intelligent assistant service, a user may speak a request to an electronic device acting as a user interface for the intelligent assistant service. In the conventional art, if a plurality of devices provides the same intelligent assistant service in the same space, the processing of the user's request may be duplicated as each device provides its response, which may deteriorate a user experience and unnecessarily consume processing resources. Thus, a need exists for a method, device, and system of implementing an intelligent service to address the foregoing issues.

The above information is presented as background information only to assist with an understanding of the disclosure. No determination has been made, and no assertion is made, as to whether any of the above might be applicable as prior art with regard to the disclosure.

SUMMARY

Accordingly, the disclosure is designed to address at least the problems and/or disadvantages described above and to provide at least the advantages described below.

In accordance with an aspect of the disclosure, an electronic device is provided, which includes a user interface; at least one communication module; a microphone; at least one speaker; at least one processor operatively connected with the user interface, the at least one communication module, the microphone, and the at least one speaker; and at least one memory operatively connected with the at least one processor, wherein the at least one memory stores instructions, which when executed, instruct the at least one processor to while the electronic device is wiredly or wirelessly connected with an access point (AP) connected with at least one external electronic device, after receiving, through the microphone, part of a wake-up utterance to invoke a voice-based intelligent assistant service, broadcast identification information about the electronic device and receive identification information broadcast from the at least one external electronic device, after receiving the whole wake-up utterance through the microphone, individually transmit first information related to the wake-up utterance received through the microphone to the at least one external electronic device and individually receive, from the external electronic device, second information related to the wake-up utterance received by the at least one external electronic device, and determine whether to transmit voice information received after the wake-up utterance to an external server based on at least part of the first information and the second information.

In accordance with another aspect of the disclosure, an electronic device is provided, which includes a communication module; a microphone; a speaker; at least one processor operatively connected with the communication module, the microphone, and the speaker; and a memory operatively connected with the at least one processor, wherein the memory stores instructions, which when executed, instruct the processor to upon receiving, through the microphone, part of a wake-up utterance to invoke a voice-based intelligent assistant service, determine whether the electronic device is in a state of being connected with an access point (AP) through the communication module, when the electronic device is in the state of being connected with the AP, broadcast identification information about the electronic device through the communication module and receive at least one piece of identification information broadcast from at least one external electronic device connected with the AP, after receiving the whole wake-up utterance through the microphone, transmit first information about the wake-up utterance to each of the at least one external electronic device, receive at least one piece of second information about the wake-up utterance from each of the at least one external electronic device, determine whether the electronic device is a leader device based on the first information and the at least one piece of second information, when the electronic device is not in the state of being connected with the AP, after receiving the whole wake-up utterance through the microphone, transmit the first information about the wake-up utterance to an external server and receive leader information obtained based on the first information and the at least one piece of second information from the external server.

In accordance with another aspect of the disclosure, a server is provided, which includes at least one communication module; at least one processor operatively connected with the at least one communication module; and at least one memory operatively connected with the at least one processor, wherein the at least one memory stores instructions, which when executed, instruct the processor to receive, from a first electronic device, through the at least one communication module, first information and a leader request to select a leader device, transmit a leader selection to the first electronic device through the at least one communication module, in response to the leader request, and receive, from a first electronic device, through the at least one communication module, a leader lock request.

In accordance with another aspect of the disclosure, an electronic device is provided, which includes a user interface; a communication module; a microphone; a speaker; a processor operatively connected with the user interface, the communication module, the microphone, and the speaker; and a memory operatively connected with the processor, wherein the memory stores instructions, which when executed, instruct the processor to connect the electronic device with an access point (AP) connected with an external electronic device, in response to receiving, through the microphone, a part of a wake-up command to invoke a voice-based intelligent assistant service, transmit identification information about the electronic device to the AP and receive identification information about the external electronic device broadcast from the AP, in response to receiving the whole wake-up command through the microphone, transmit first information related to a strength of the wake-up command received through the microphone to the external electronic device and receive, from the external electronic device, second information related to a strength of the wake-up command received by the external electronic device, and determine whether to transmit voice information received after the wake-up command to an external server based on at least part of the first information and the second information Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features, and advantages of certain embodiments of the disclosure will be more apparent from the following detailed description taken in conjunction with the accompanying drawings, in which:

FIGS. 9A, 9B, and 9C illustrate an operation of determining whether to transmit voice information to an external server according to an embodiment;

FIGS. 29A and 29B illustrate an operation of determining a leader device according to an embodiment.

Throughout the drawings, like reference numerals will be understood to refer to like parts, components, and structures.

DETAILED DESCRIPTION

Various embodiments of the disclosure will now be described in detail with reference to the accompanying drawings. In the following description, specific details such as detailed configuration and components are merely provided to assist the overall understanding of these embodiments of the disclosure. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

Figure 1:
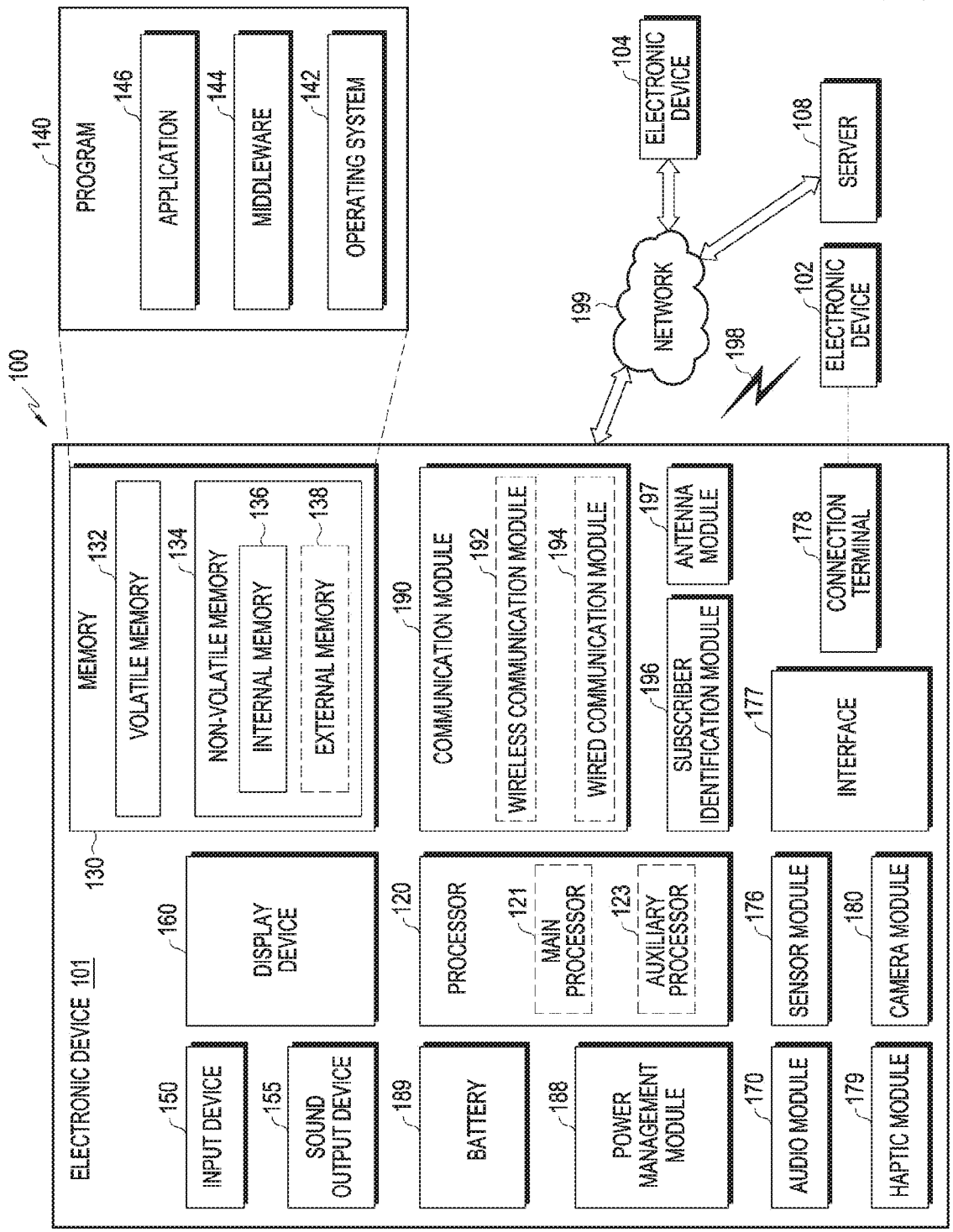
FIG. 1 illustrates an electronic device in a network environment according to an embodiment.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, e.g., software (e.g., a program 140) to control at least one other component (e.g., a hardware or software component) of the electronic device 101 connected with the processor 120 and may process or compute various data. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) directly or wirelessly connected with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, e.g., a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via the user's tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or wireless communication channel between the electronic device 101 and an external electronic device (e.g., the electronic device 102, the electronic device 104, or the server 108) and performing communication through the established communication channel. The communication module 190 may include one or more communication processors that are operable independently from the processor 120 (e.g., the application processor) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The first and second external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technique may be used, for example.

Figure 2A:
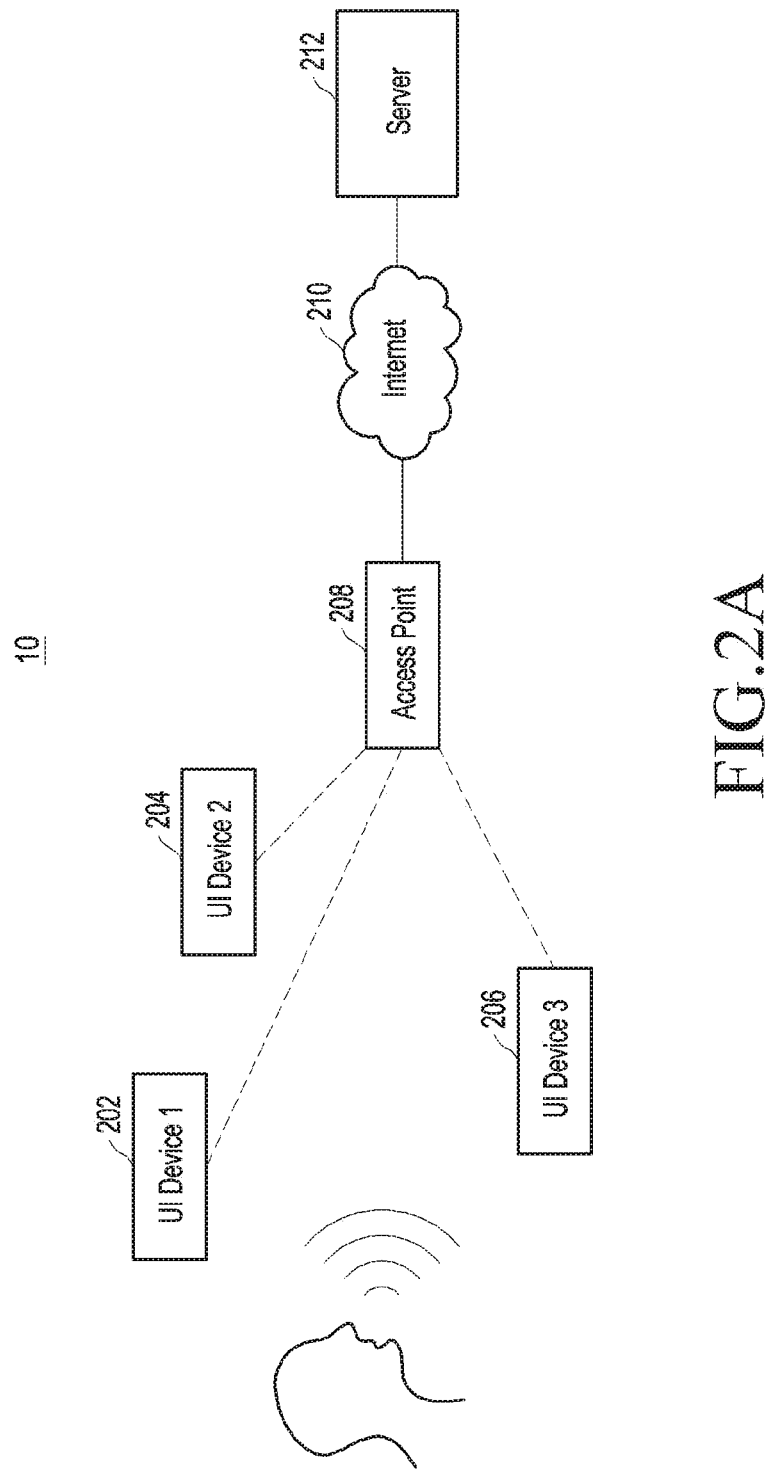
FIG. 2A illustrates an intelligent assistant service system according to an embodiment.

FIG. 2A illustrates an intelligent assistant service system according to an embodiment.

Referring to FIG. 2A, according to an embodiment, an intelligent assistant service system 10 may include at least one of electronic devices 202, 204, and 206 (hereinafter, "user interface (UI) devices") that provide a voice-based UI and a server 212 (hereinafter, "processing server") connected via the Internet 210 with the first to third UI device 202, 204, and 206. Selectively, the first to third UI devices 202, 204, and 206 may include a visual user interface (e.g., a touchscreen display). The first to third UI devices 202, 204, and 206 may have a similar configuration as the electronic device 101 of FIG. 1, but are not limited thereto.

In FIG. 2A, the first to third UI devices 202, 204, and 206 may be connected to the server 212 via an access point (AP) 208. The plurality of UI devices 202, 204, and 206 may include a first UI device 202 (also referred to as a "first electronic device"), a second UI device 204 (also referred to as a "second electronic device"), and a third UI device 206 (also referred to as a "third electronic device"). The first to third UI devices 202, 204, and 206 may have the configuration of, e.g., the electronic device 101 of FIG. 1 but are not limited thereto.

In the above embodiment, the user may provide an utterance to request the first UI device 202 to perform work or a task, and the first UI device 202 may provide utterance data to the processing server 212. The processing server 212 may process the utterance data using automatic speech recognition (ASR) and natural language understanding (NLU), thereby generating response data. The processing server 212 may provide the generated response data to the first UI device 202, and the first UI device 202 may provide a response to the user using a voice and/or display. Alternatively, the above-described voice data processing may at least partially be performed by the first UI device 202. The second UI device 204 and the third UI device 206 may also perform the same functions as the first UI device 202.

Some intelligent assistant services may be configured not to be always-on rather than needing to be triggered by the user. In this case, the user may trigger the intelligent service by a wake-up utterance to the UI device or using the touchscreen or button on the UI device. The wake-up utterance may be an utterance (e.g., "Bixby," "Ok, Google," "Alexa," or "Siri") pre-chosen by the user or intelligent assistant service system 10 and may be previously stored in each of the first UI device 202, the second UI device 204, and the third UI device 206. After the service initiates, e.g., saying "Bixby", the user may provide a task-requesting utterance to the UI device, e.g., "what is the weather for today?".

In some cases, there may be a plurality of UI devices in the same space while providing the same intelligent assistant service. In this case, when the user issues a wake-up utterance to use the intelligent assistant service, the plurality of UI devices in the same place may each recognize the wake-up utterance and respond to the user's utterance, thereby causing confusion in the user experience and a waste of resources. To address this issue, the plurality of UI devices may be configured so that all of the UI devices perform network communication with the processing server and, among the plurality of UI devices, only the closest UI to the user may respond to the user's wake-up utterance. However, having all of the plurality of UI devices performing network communication with the server may result in unnecessary consumption of communication resources.

As illustrated in FIG. 2A, according to an embodiment, when a plurality of UI devices 202, 204, and 206 simultaneously receive a wake-up utterance in the same space, they may mutually transmit and receive the information in a broadcast scheme, thereby allowing an electronic device which is to respond to the wake-up utterance (hereinafter, a "leader") to be determined.

More specifically, as used herein, the term "leader device" may mean an electronic device which is selected to respond to the wake-up utterance among the plurality of electronic devices 202, 204, and 206 and is connected with an intelligent assistant server (e.g., the processing server 212) to provide an intelligent assistant service. Because only one electronic device selected communicates with the processing server 212, a waste of communication resources may be prevented.

According to an embodiment, when the plurality of electronic devices 202, 204, and 206 receive at least part of the wake-up utterance in the same space, they may receive the Internet protocol (IP) addresses of their neighbor electronic devices 202, 204, and 206 in a broadcasting scheme and then the whole wake-up utterance and then receive information about the wake-up utterance from each of the electronic devices 202, 204, and 206 through user datagram protocol (UDP) communication. At this time, the plurality of electronic devices 202, 204, and 206 may select a leader device to respond to the wake-up utterance based on the received information about the wake-up utterance.

Figure 2B:
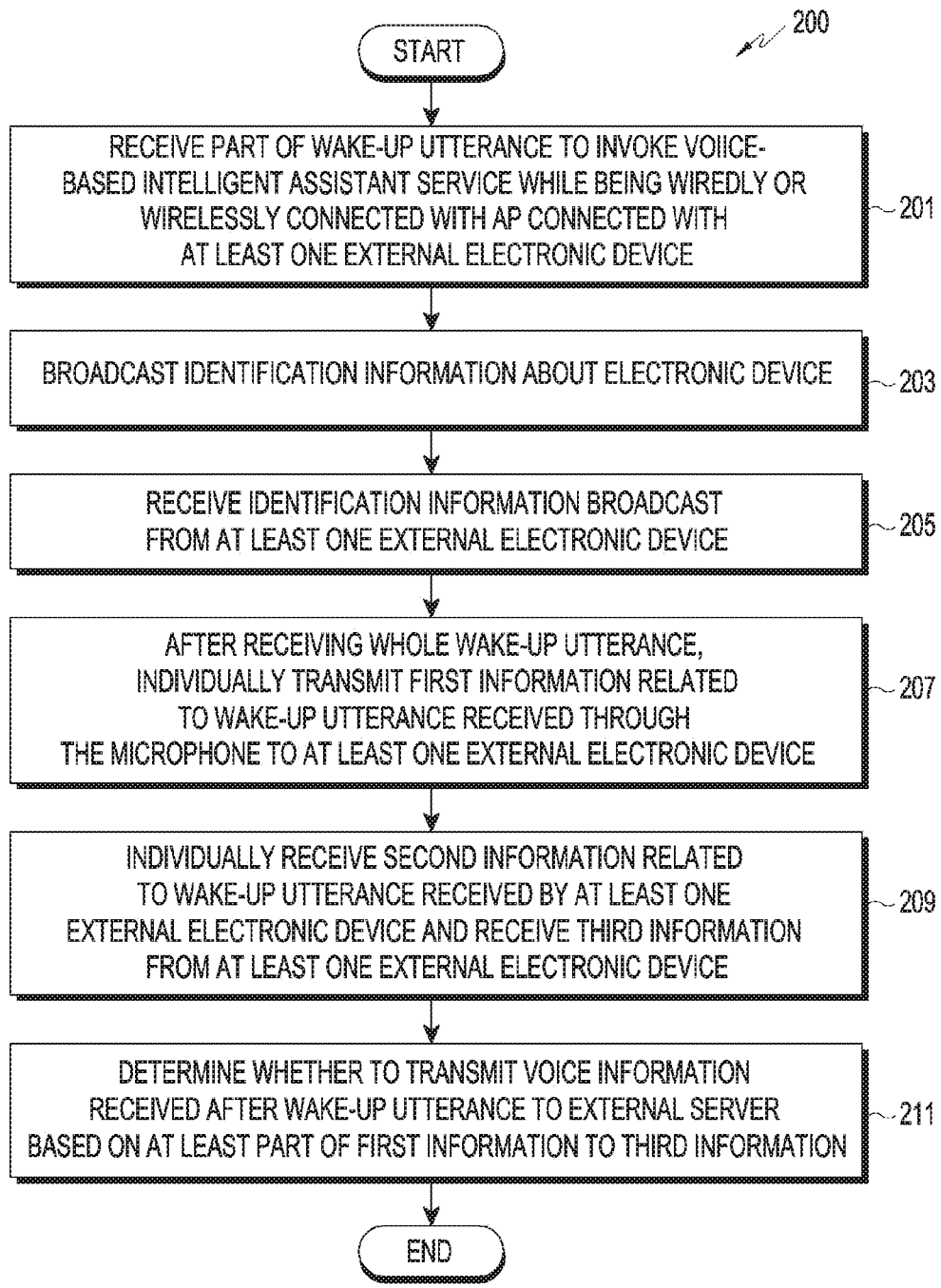
FIGS. 2B and 2C are flowcharts illustrating a method of determining a leader device according to an embodiment.
Figure 2C:
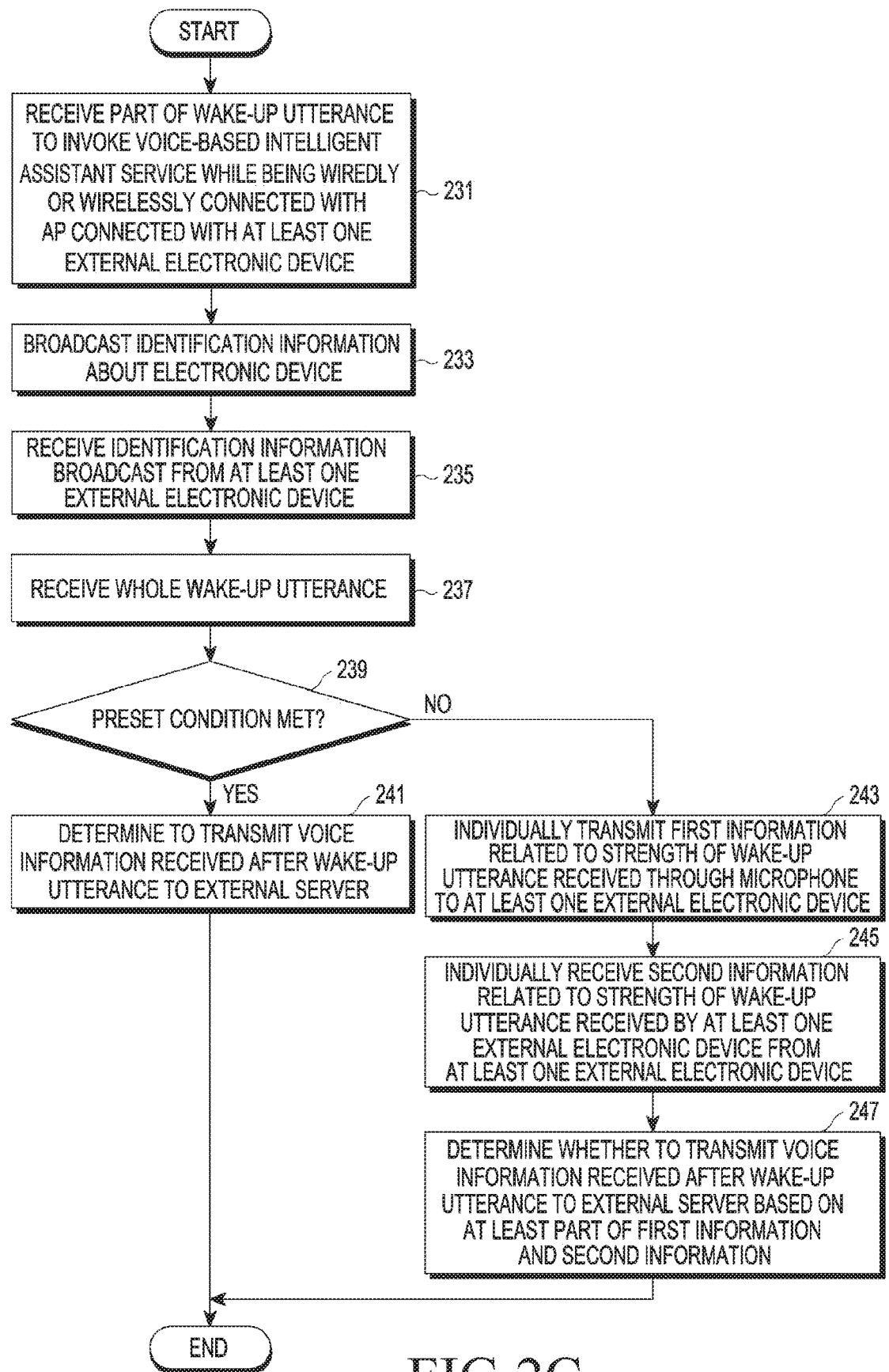

FIGS. 2B and 2C are flowcharts illustrating a method 200 of determining a leader according to an embodiment. In the embodiment shown in FIG. 2A, each of the first to third electronic devices 202, 204, and 206 may be wiredly or wirelessly (e.g., wireless fidelity (Wi-Fi)) to the AP 208 and simultaneously receive a wake-up utterance to invoke a voice-based intelligent assistant service. In this case, each of the first to third electronic devices 202, 204, and 206 may perform the operations illustrated in FIGS. 2B and 2C. For illustration purposes, only operations performed by the first electronic device 202 among the first to third electronic devices 202, 204, and 206 are described below.

Referring to FIG. 2B, in operation 201, the first electronic device 202, along with the second electronic device 204 and the third electronic device 206, is connected with the AP 208 while receiving, from the user, a wake-up utterance to invoke a voice-based intelligent assistant service. Operation 201 may be triggered at the time of receiving part of the wake-up utterance. For example, when the wake-up utterance is "Hi, Bixby," the time of receiving part of the wake-up utterance may be a first time when part, "Hi," of "Hi, Bixby" is received.

In operation 203, the first electronic device 202 may broadcast identification information about the first electronic device 202 to the second electronic device 204 and the third electronic device 206. For example, the identification information about the first electronic device 202 may include the IP address of the first electronic device 202. At this time, each of the second electronic device 204 and the third electronic device 206 may also broadcast its own identification information immediately after the first time. Because the first electronic device 202 broadcasts the identification information to the second electronic device 204 and the third electronic device 206, e.g., via the AP 208, it may not receive an acknowledgment (ACK) of the identification information from the second and third electronic devices 204 and 206.

In operation 205, the first electronic device 202 may receive the identification information broadcast from the second and third electronic devices 204 and 206. For example, the identification information about the second and third electronic devices 204 and 206 may be the respective IP addresses of the second and third electronic devices 204 and 206.

Operation 207 may be initiated after a second time when the first electronic device 202 receives the whole wake-up utterance. The first electronic device 202 may transmit first information related to the wake-up utterance received through the microphone of the first electronic device 202 using the identification information about the second and third electronic devices 204 and 206 individually received.

At this time, each of the second and third electronic devices 204 and 206 may transmit information related to the wake-up utterance they receive to the other devices using the identification information about the other devices. At this time, the second electronic device 204 may transmit second information about the wake-up utterance that the second electronic device 204 receives, and the third electronic device 206 may transmit third information about the wake-up utterance that the third electronic device 206 receives. For example, the first to third information may include at least one of the signal-to-noise ratio (SNR), audio quality, sound pressure, feature value of the input voice signal, or confidence score of the wake-up utterance that each of the first to third electronic devices 202, 204, and 206 receives through its microphone. For example, the confidence score of wake-up utterance may be a value indicating the similarity between a pre-stored wake-up utterance and the wake-up utterance received through the microphone. The degree of match between the pre-stored wake-up utterance and the wake-up utterance received through the microphone may be set to a value ranging from 0 to 100, and as the distance between the user and the device decreases, the similarity may increase.

Although in operations 203 to 205 the first electronic device 202 broadcasts the identification information about the first electronic device 202 to the second and third electronic devices 204 and 206 and receives identification information broadcast from the second and third electronic devices 204 and 206, operations 203 to 205 may be omitted in a case where there is stored identification information. For example, the first electronic device 202 may receive identification information broadcast from the second and third electronic devices 204 and 206 and store the received identification information for a designated time. While the first UI device 202 maintains the stored identification information, operations 203 to 205 may be omitted.

When operations 203 to 205 are omitted, the first electronic device 202 may receive the whole wake-up utterance and then transmit the first information related to the wake-up utterance using the stored identification information in operation 207.

In operation 209, the first electronic device 202 may receive information about the wake-up utterance received by the second and third electronic devices 204 and 206 individually from the second and third electronic devices 204 and 206. For example, the first electronic device 202 may receive the second information from the second electronic device 204 and the third information from the third electronic device 206.

In operation 211, the first electronic device 202 may determine whether the first electronic device 202 transmits, to an external server, voice information received after the wake-up utterance, based on at least part of the first information to the third information. When the SNR included in the first information is larger than the SNRs included in the second information and the third information, the first electronic device 202 may determine that the first electronic device 202 transmits voice information received after the wake-up utterance to the external server.

The SNR included in the first information being largest may mean that as the first electronic device 202 is positioned closest to the user, the user has a higher chance of having issued the wake-up utterance for a voice command using the first electronic device 202. Because the electronic device identified to have a larger SNR may perform voice recognition more precisely, if the first electronic device 202 receives a voice of a relatively larger SNR than those of the other electronic devices (e.g., the second electronic device 204 and the third electronic device 206), the first electronic device 202 may determine itself as the leader device and transmit voice information. However, when the SNR included in the first electronic device 202 is smaller than the SNRs included in the second information and third information, the first electronic device 202 may determine to refrain from transmitting voice information received after the wake-up utterance to the external server.

Although the first electronic device 202 has been identified to have a larger SNR in the example above, the first electronic device 202 might not be the one positioned closest to the user. For example, when the first electronic device 202 is a device to which a noise cancellation and sound volume application solution to secure remote recognition performance, it may be identified to have a larger SNR than the electronic devices (e.g., the second electronic device 204 and the third electronic device 206), which are actually positioned closer to the user. To prevent this from happening, the first electronic device 202 may determine that the first electronic device 202 itself transmits voice information received after the wake-up utterance to the external server based on the confidence score of wake-up utterance included in the first information and the confidence score of wake-up utterance included in the third information.

When the SNR included in the first information is larger than the SNR included in the second information by a particular value (e.g., 10), the first electronic device 202 may transmit voice information received after the wake-up utterance to the external server. When the difference between the SNR included in the first information and the SNR included in the second information is smaller than a particular value, the first electronic device 202 may determine whether the first electronic device 202 itself transmits voice information received after the wake-up utterance to the external server considering other elements included in the first information and the second information. For example, when the difference between the SNR included in the first information and the SNR included in the second information is smaller than a particular value, the first electronic device 202 may determine whether the first electronic device 202 itself transmits voice information received after the wake-up utterance to the external server considering the confidence score of the wake-up utterance. As another example, when the difference between the SNR included in the first information and the SNR included in the second information is smaller than a particular value, the first electronic device 202 may determine whether the first electronic device 202 itself transmits voice information received after the wake-up utterance to the external server considering state information. For example, the state information may include information that indicates whether the first electronic device 202 is in a screen-on state, whether the user has used the device within a particular time, or whether the priority of the electronic devices has previously been set. As such, when the leader device is determined based on other additional state information than SNR, an exchange of state information between the devices is described below with reference to FIG. 9B.

FIG. 2C is a flowchart illustrating a method of determining a leader according to an embodiment. To avoid a redundant explanation, operations of FIG. 2C that are substantially similar to the operations of FIG. 2B described above are omitted from the description below.

Referring to FIG. 2C, in operation 231, the first electronic device 202, along with the second electronic device 204 and the third electronic device 206, is connected with the AP 208 while receiving, from the user, a wake-up utterance to invoke a voice-based intelligent assistant service. Operation 231 may be the same as operation 201 of FIG. 2B.

In operation 233, the first electronic device 202 may broadcast identification information about the first electronic device 202 to the second electronic device 204 and the third electronic device 206. Operation 233 may be the same as operation 203 of FIG. 2B.

In operation 235, the first electronic device 202 may receive the identification information broadcast from the second and third electronic devices 204 and 206. Operation 235 may be the same as operation 205 of FIG. 2B.

In operation 237, the first electronic device 202 may receive the whole wake-up utterance. Operation 237 may be initiated after a second time when the first electronic device 202 receives the whole wake-up utterance.

In operation 239, the first electronic device 202 may determine whether a preset condition is met. For example, the preset condition may be when the first electronic device 202 is interacting with the user or when the user previously sets the first electronic device 202 as a device to perform a voice command. For example, when the first electronic device 202 is providing a voice-based intelligent assistant service (e.g., playing music or text-to-speech (TTS) or inputting a follow up command through a voice-based intelligent assistant service), the first electronic device 202 may determine that the preset condition is met. For example, when the first electronic device 202 is set to have the highest priority by the user, the first electronic device 202 may determine that the preset condition is met.

Upon determining that the preset condition is met, the first electronic device 202 may determine to transmit voice information received after the wake-up utterance to the external server in operation 241. For example, when the first electronic device 202 is interacting with the user or is set to have the highest priority, the first electronic device 202 may determine that the first electronic device 202 transmits the voice information to the external server. In other words, when the preset condition is met, the first electronic device 202 may determine itself (the first electronic device 202) as the leader device without considering information about the wake-up utterance received through the microphone from at least one external electronic device (i.e., without performing operations 207 and 209 of FIG. 2B). Accordingly, when the first electronic device 202 is interacting with the user, although the second electronic device 204 and the third electronic device 206 receive the user's utterance, the first electronic device 202 may be operated as the leader device.

When the preset condition is determined to be met in operation 239, the first electronic device 202 may individually transmit, to the second and third electronic devices 204 and 206, first information related to the strength of the wake-up utterance received through the microphone in operation 243. Operation 243 may be the same as operation 207 of FIG. 2B.

In operation 245, the first electronic device 202 may receive information about the wake-up utterance received by the second and third electronic devices 204 and 206 individually from the second and third electronic devices 204 and 206. Operation 245 may be the same as operation 209 of FIG. 2B.

In operation 247, the first electronic device 202 may determine whether the first electronic device 202 transmits, to an external server, voice information received after the wake-up utterance, based on at least part of the first information to the third information. Operation 247 may be the same as operation 211 of FIG. 2B.

Although the description in connection with FIGS. 2B and 2C presumes that a wake-up utterance is received and a voice command is separately received, the reception of a wake-up utterance and the reception of a voice command may be continuously performed (e.g., a seamless command). When a seamless command is received, if the first electronic device 202 is a device incapable of processing seamless commands, the first electronic device 202 may not transmit the first information and, when the first electronic device 202 is a device capable of processing seamless commands, the first electronic device 202 may transmit the first information to each of the at least one external electronic device. Accordingly, when the user issues a seamless command, the leader device may be identified among devices capable of processing seamless commands.

Figure 3:
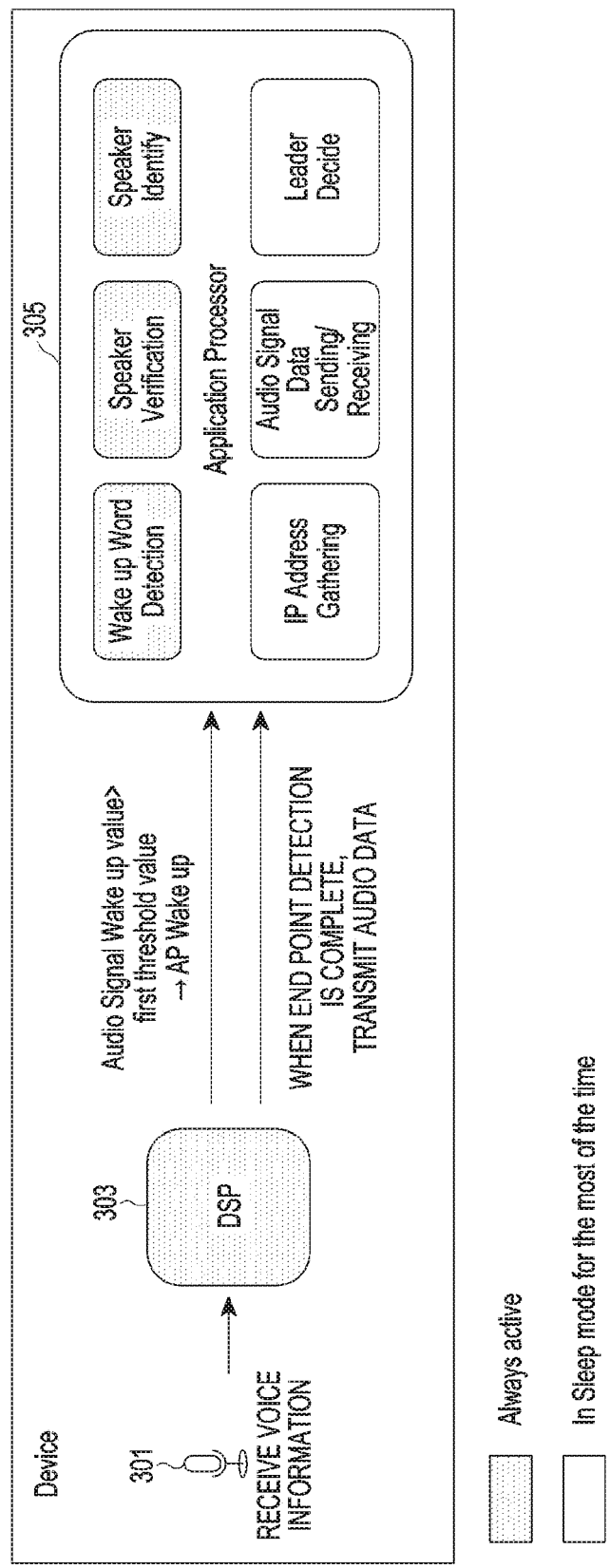
FIG. 3 illustrates an operation of receiving part of a wake-up command to receive identification information about at least one external electronic device according to an embodiment.

FIG. 3 illustrates an operation of receiving part of a wake-up command to receive identification information about at least one external electronic device according to an embodiment.

Referring to FIG. 3, an embodiment of receiving part of a wake-up utterance as in operation 201 of FIG. 2B is described below in greater detail. As shown, the first electronic device 202 may include a microphone 301, a digital signal processor (DSP) 303, and an application processor 305.

The microphone 301 may be used for the first electronic device 202 to receive voice information. The DSP 303 may always be in an active state and may thus be a chip operated at low power. When voice information received through the microphone includes at least part of the wake-up utterance, the DSP 303 may transmit a signal to wake up the AP 305. The DSP 303 may transmit the SNR and voice information received through the microphone 301 to the AP 305.

The AP 305 may detect the wake-up utterance based on the voice information received from the DSP 303 and determine whether the user is a registered user or a user who has been authorized to use the corresponding function among registered users. Although FIG. 3 illustrates that the DSP 303 and the AP 305 are separate components, the DSP 303 may be implemented in the AP 305. For example, as illustrated in FIG. 1, the application processor 305 and the DSP 303 may be implemented as a main processor 121.

Figure 4A:
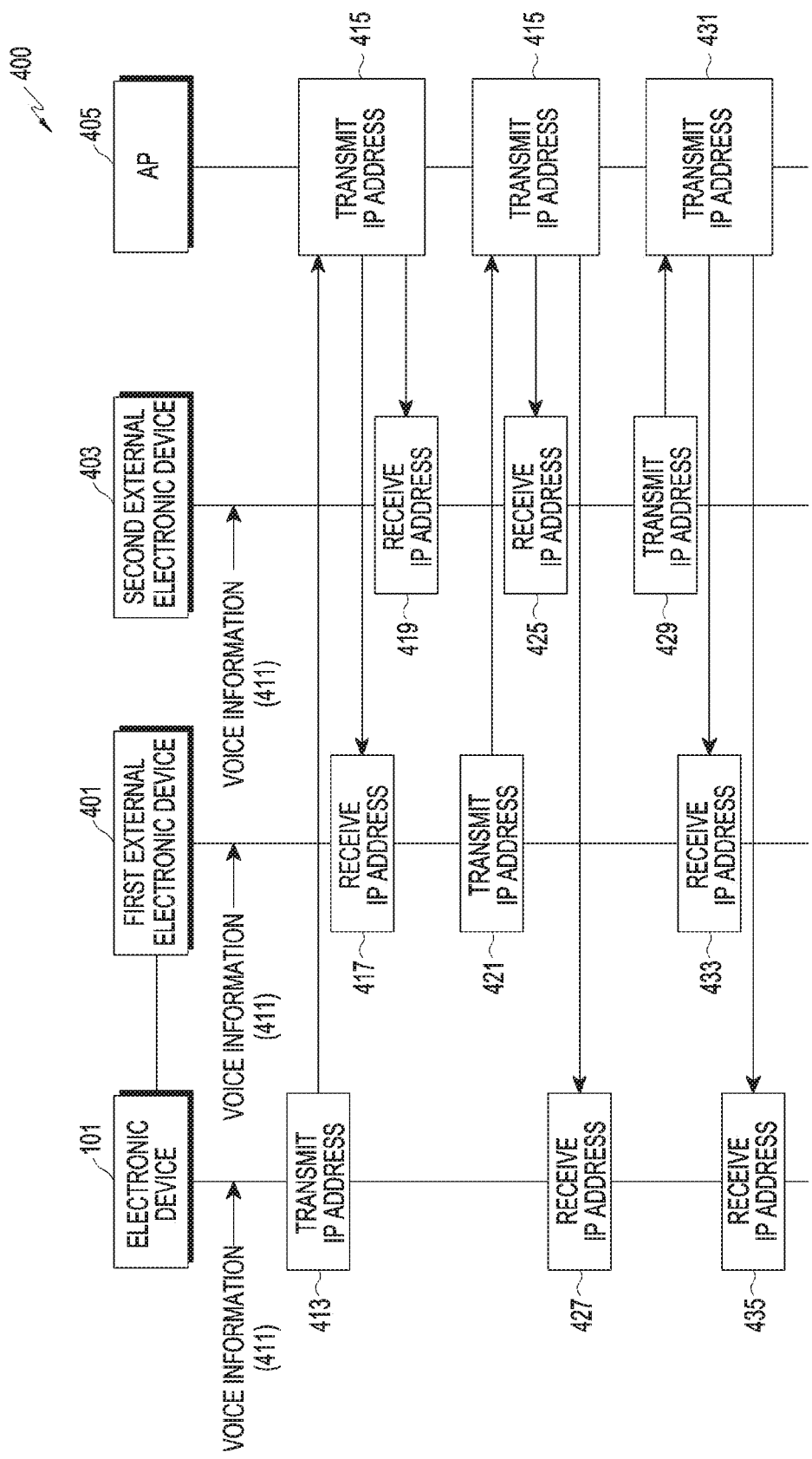
FIGS. 4A and 4B illustrate an operation of receiving identification information about at least one external electronic device according to an embodiment.
Figure 4B:
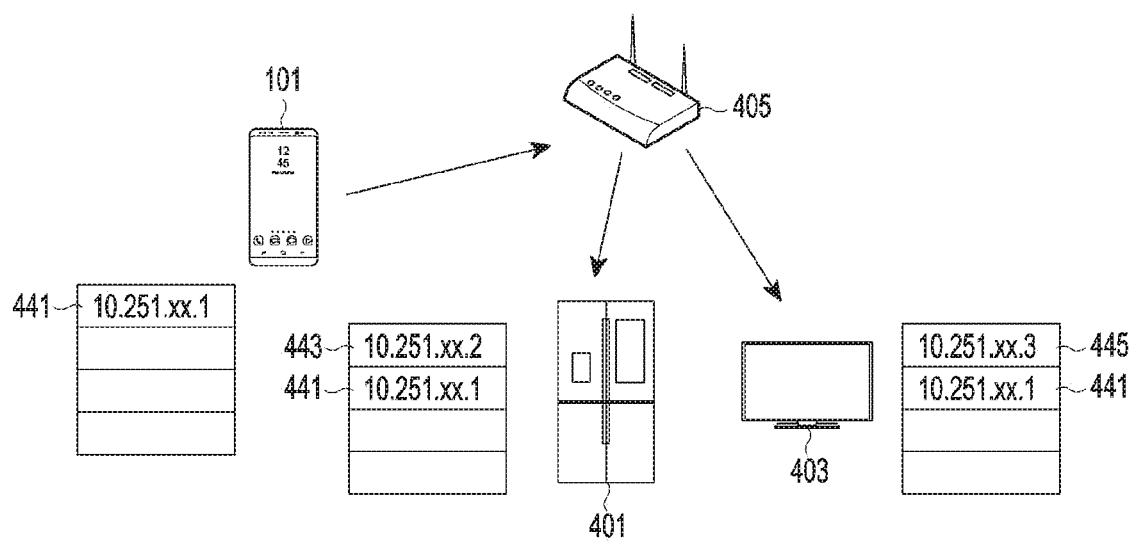

FIGS. 4A and 4B illustrate an operation of receiving identification information about at least one external electronic device according to an embodiment.

Referring to FIGS. 4A and 4B, an embodiment 400 in which the first electronic device 202 broadcasts identification information and receives at least one piece of identification information broadcast from at least one electronic device 204 and 206 as in operation 202 of FIG. 2B is described below in greater detail. In the shown embodiment, when an electronic device 101 (e.g., the first electronic device 202 of FIG. 2A), a first external electronic device 401 (e.g., the second electronic device 204 of FIG. 2A), and a second external electronic device 403 (e.g., the third electronic device 206 of FIG. 2A) are arranged near each other, and the user issues voice information, the electronic device 101, the first external electronic device 401, and the second external electronic device 403 may all receive the voice information. According to an embodiment, the electronic device 101, the first external electronic device 401, and the second external electronic device 403 may be connected to one AP 405 (e.g., the AP 208 of FIG. 2A). Although FIGS. 4A and 4B illustrate the electronic device 101 broadcasting identification information through the AP 405, embodiments of the disclosure are not limited thereto. For example, the electronic device 101 may directly broadcast identification information to the first external electronic device 401 and the second external electronic device 403.

Referring to FIG. 4A, upon receiving voice information 411 through the microphone, the electronic device 101 may transmit an IP address to the AP 405 in operation 413. For example, the voice information 411 received through the microphone may be part of a wake-up utterance. When the voice information 411 is received, the DSP of the electronic device 101 may wake up and transmit the IP address to the AP 405.

Upon receiving the IP address from the electronic device 101, the AP 405 may transmit the IP address of the electronic device 101 to the first external electronic device 401 and second external electronic device 403 connected with the AP 405 in operation 415.

The first external electronic device 401 and the second external electronic device 403 may receive the IP address of the electronic device 101 from the AP 405 in operations 417 and 419.

For example, as illustrated in FIG. 4B, when the electronic device 101 broadcasts the identification information 441 about the electronic device 101 through the AP 405, the first external electronic device 401 may store identification information 443 about the first external electronic device 401 together with the identification information 441 about the electronic device 101. When the electronic device 101 broadcasts the identification information 441 about the electronic device 101 through the AP 405, the second external electronic device 403 may store identification information 445 about the second external electronic device 403 together with the identification information 441 about the electronic device 101.

Referring again to FIG. 4A, when the voice information 411 is received, the DSP of the first external electronic device 401 may be awakened, in order to transmit the IP address of the first external electronic device 401 to the AP 405 in operation 421.

Upon receiving the IP address from the first external electronic device 401, the AP 405 transmits the IP address of the first external electronic device 401 to the electronic device 101 and second external electronic device 403 connected with the AP 405 in operation 423. The electronic device 101 and the second external electronic device 403 receive the IP address of the first external electronic device 101 from the AP 405 in operations 425 and 427.

When the voice information 411 is received, the DSP of the second external electronic device 403 may be awakened, in order to transmit the IP address of the second external electronic device 401 to the AP 405 in operation 429. Upon receiving the IP address from the second external electronic device 403, the AP 405 transmits the IP address of the second external electronic device 403 to the electronic device 101 and first external electronic device 401 connected with the AP 405 in operation 431. The electronic device 101 and the first external electronic device 401 may receive the IP address of the second external electronic device 101 from the AP 405 in operations 433 and 435.

Although FIG. 4A illustrates that the AP 405 receives and transmits one IP address at a time, a plurality of IP addresses may be received before then transmitting the IP address may be transmitted together. For example, the AP 405 may transmit the IP address of the electronic device 101 and the IP address of the first external electronic device 401 together, instead of transmitting the IP address of the electronic device 101 by itself in operation 415.

Figure 5:
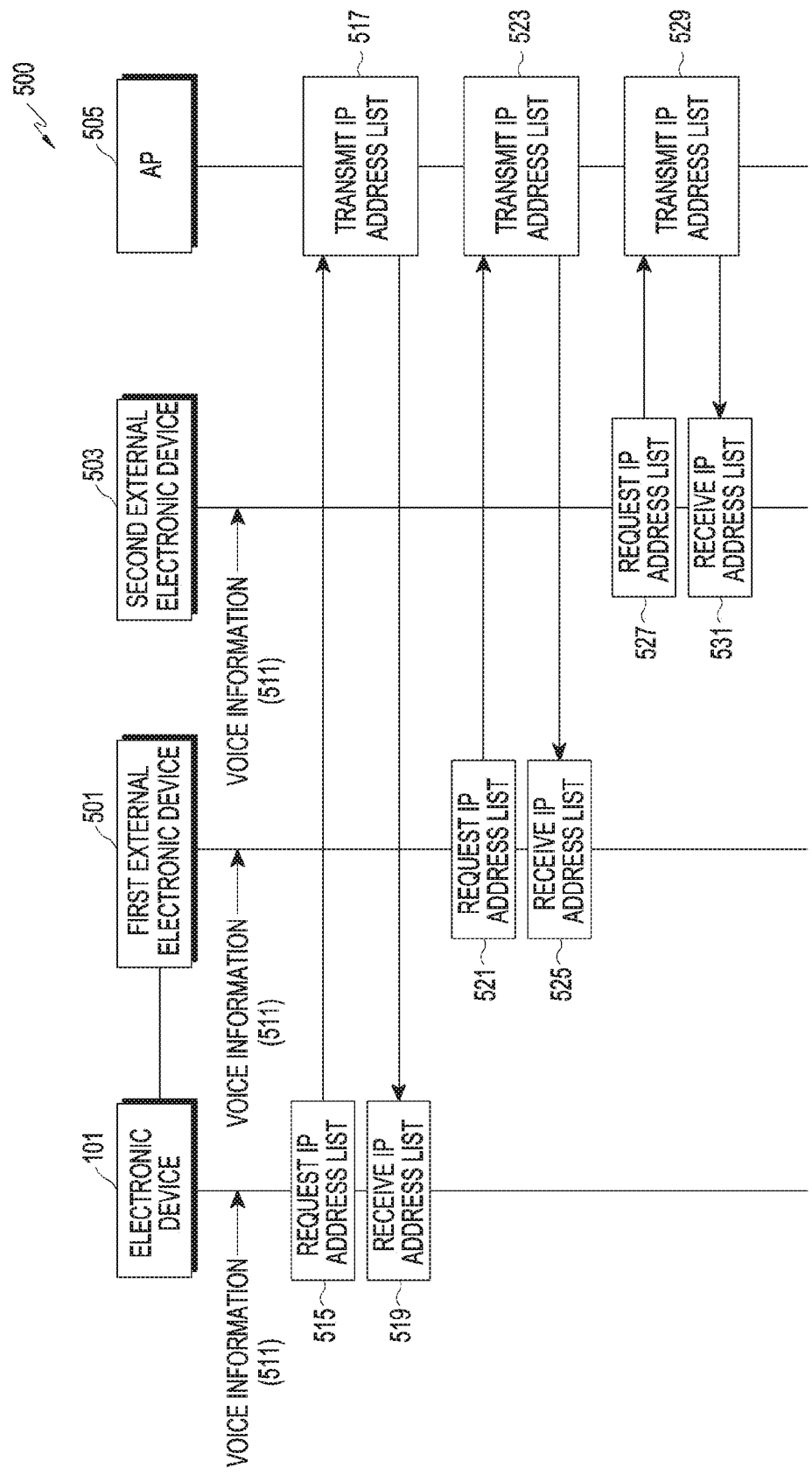
FIG. 5 illustrates an operation of receiving identification information about at least one external electronic device according to an embodiment.

FIG. 5 illustrates an operation of receiving identification information about at least one external electronic device according to an embodiment.

In FIG. 5, an embodiment 500 in which the electronic device 101 (e.g., the first electronic device 202 of FIG. 2A) broadcasts identification information and receives identification information broadcast from at least one external electronic device in operation 205 of FIG. 2 is described below. For example, it may be assumed in the description with respect to FIG. 5 that an electronic device 101, a first external electronic device 501 (e.g., the second electronic device 204 of FIG. 2A), and a second external electronic device 503 (e.g., the third electronic device 206 of FIG. 2A) are arranged in any space and operations are performed in such an environment that when the user issues voice information, the electronic device 101, the first external electronic device 501, and the second external electronic device 503 all are able to receive the voice information and that the electronic device 101, the first external electronic device 501, and the second external electronic device 503 are connected with one AP 505 (e.g., the AP 208 of FIG. 2A0. The AP 505 may be implemented as a separate device to manage an IP address list for peripheral devices.

Referring to FIG. 5, upon receiving voice information 511 through the microphone, the electronic device 101 sends a request for an IP address list to the AP 505 in operation 515. The voice information 511 received through the microphone may be part of a wake-up command. When the voice information 511 is received, the DSP of the electronic device 101 may be awakened, in order to send a request for the IP address list to the AP 505.

Upon receiving the IP address list request from the electronic device 101, the AP 505 transmits an IP address list including the IP addresses of the electronic device 101, the first external electronic device 501, and the second external electronic device 503 connected with the AP 505 in operation 517. The electronic device 101 receives and stores the IP address list in operation 519. The stored IP address list may be used later to transmit wake-up command information.

The AP 505 may previously identify the IP addresses of the connected electronic devices and store the IP addresses. For example, the AP 505 may generate and previously store an IP address list.

Upon receiving voice information 511 through the microphone, the first external electronic device 501 sends a request for an IP address list to the AP 505 in operation 521. Upon receiving the IP address list request from the first external electronic device 501, the AP 505 transmits an IP address list including the IP addresses of the electronic device 101, the first external electronic device 501, and the second external electronic device 503 connected with the AP 505 in operation 523. The first external electronic device 501 receives and stores the IP address list in operation 525.

Upon receiving voice information 511 through the microphone, the second external electronic device 503 sends a request for an IP address list to the AP 505 in operation 527. Upon receiving the IP address list request from the first external electronic device 501, the AP 505 transmits an IP address list including the IP addresses of the electronic device 101, the first external electronic device 501, and the second external electronic device 503 connected with the AP 505 in operation 529. The second external electronic device 503 receives and stores the IP address list in operation 531.

Figure 6A:
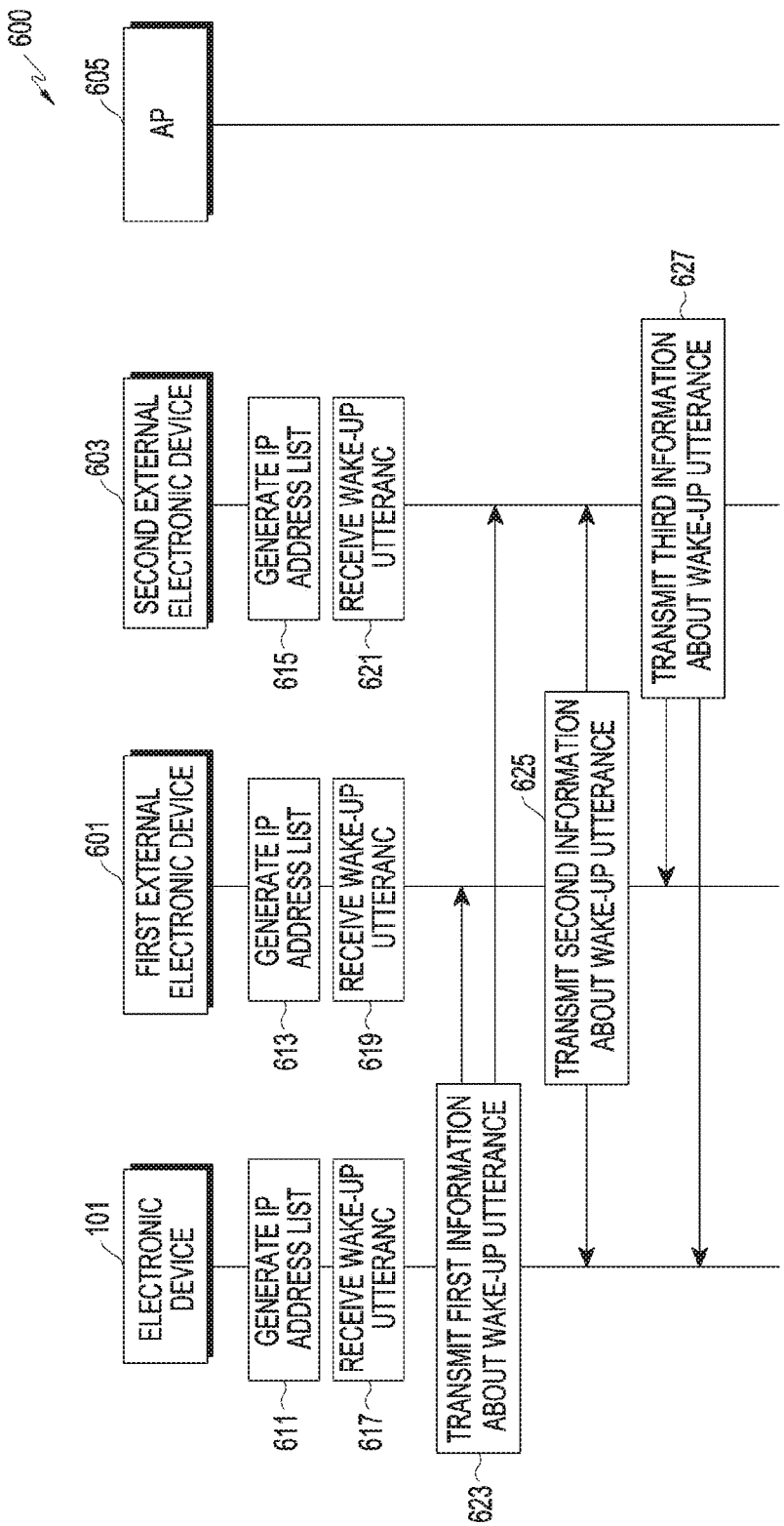
FIGS. 6A and 6B illustrate an operation of transmitting information about a wake-up command according to an embodiment.
Figure 6B:
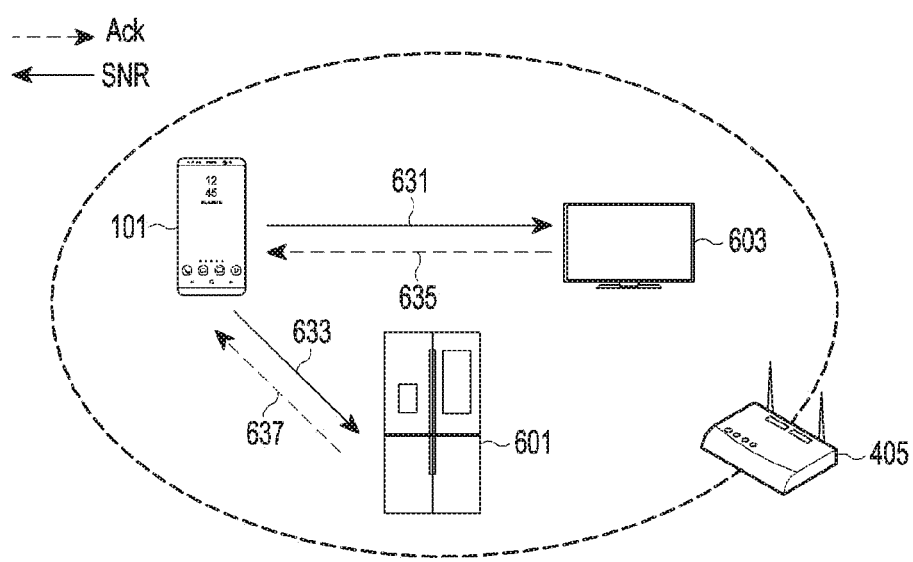

FIGS. 6A and 6B illustrate an operation of transmitting information about a wake-up command according to an embodiment.

Referring to FIGS. 6A and 6B, an embodiment 600 in which the electronic device 101 (e.g., the first electronic device 202 of FIG. 2A) transmits first information about a wake-up utterance to at least one first external electronic device 601 (e.g., the second electronic device 204 of FIG. 2A) or second external electronic device 603 (e.g., the third electronic device 206 of FIG. 2A) in operation 207 of FIG. 2 is described below.

For example, as shown in FIG. 6A, the electronic device 101 may generate (611) or identify an IP address list for at least one external electronic device 601 and 603 connected with an AP 605 (e.g., the AP 208 of FIG. 2A) in operation 611. The electronic device 101 may receive the whole wake-up utterance through the microphone in operation 617. For example, the electronic device 101 may receive voice information and determine whether the whole wake-up utterance is received. Upon receiving the wake-up utterance, the electronic device 101 may transmit first information about the wake-up utterance to the first external electronic device 601 and the second external electronic device 603 in operation 623. For example, the first information may include at least one of the SNR, audio quality, volume, sound pressure, or confidence score of the received wake-up utterance. For example, as shown in FIG. 6B, the electronic device 101 may transmit the first information to each of the first external electronic device 601 and the second external electronic device 603 through user datagram protocol (UDP) communication in operations 631 and 633. The electronic device 101 may receive (635 and 637) ACKs from the first external electronic device 601 and the second external electronic device 603, corresponding to the transmission of the first information, in operations 635 and 637. The electronic device 101 may transmit the first information to each of the first external electronic device 601 and the second external electronic device 603 through one-to-N communication and receive ACKs, thereby identifying whether each external electronic device 601 and 603 has received the first information. When the electronic device 101 receives no ACK, the electronic device 101 may re-transmit the first information to the corresponding external electronic device. The electronic device 101 may minimize the transmission count by refraining from re-transmitting the first information to the external electronic device which has received an ACK.

Referring to FIG. 6A, the first external electronic device 601 may generate an IP address list for the electronic device 101 and the second external electronic device 603 connected with the AP 605 in operation 613. The first external electronic device 601 receives the whole wake-up utterance through the microphone in operation 619 and transmits second information about the wake-up utterance to the electronic device 101 and the second external electronic device 603 in operation 625. For example, the second information may include at least one of the SNR, audio quality, volume, sound pressure, or confidence score of the wake-up utterance received through the microphone of the first external electronic device 601.

In operation 615, the second external electronic device 603 may generate an IP address list for the electronic device 101 and the first external electronic device 601 connected with the AP 605. The second external electronic device 603 may receive the whole wake-up utterance through the microphone in operation 621 and transmits third information about the wake-up utterance to the electronic device 101 and the first external electronic device 601 in operation 627. For example, the third information may include at least one of the SNR, audio quality, volume, sound pressure, or confidence score of the wake-up utterance received through the microphone of the second external electronic device 603.

Although the electronic device 101, the first external electronic device 601, and the second external electronic device 603 receive the same wake-up utterance issued by the user, the first information, the second information, and the third information may differ from each other depending on where the electronic device 101, the first external electronic device 601, and the second external electronic device 603 are arranged and the ambient environment.

Figure 7:
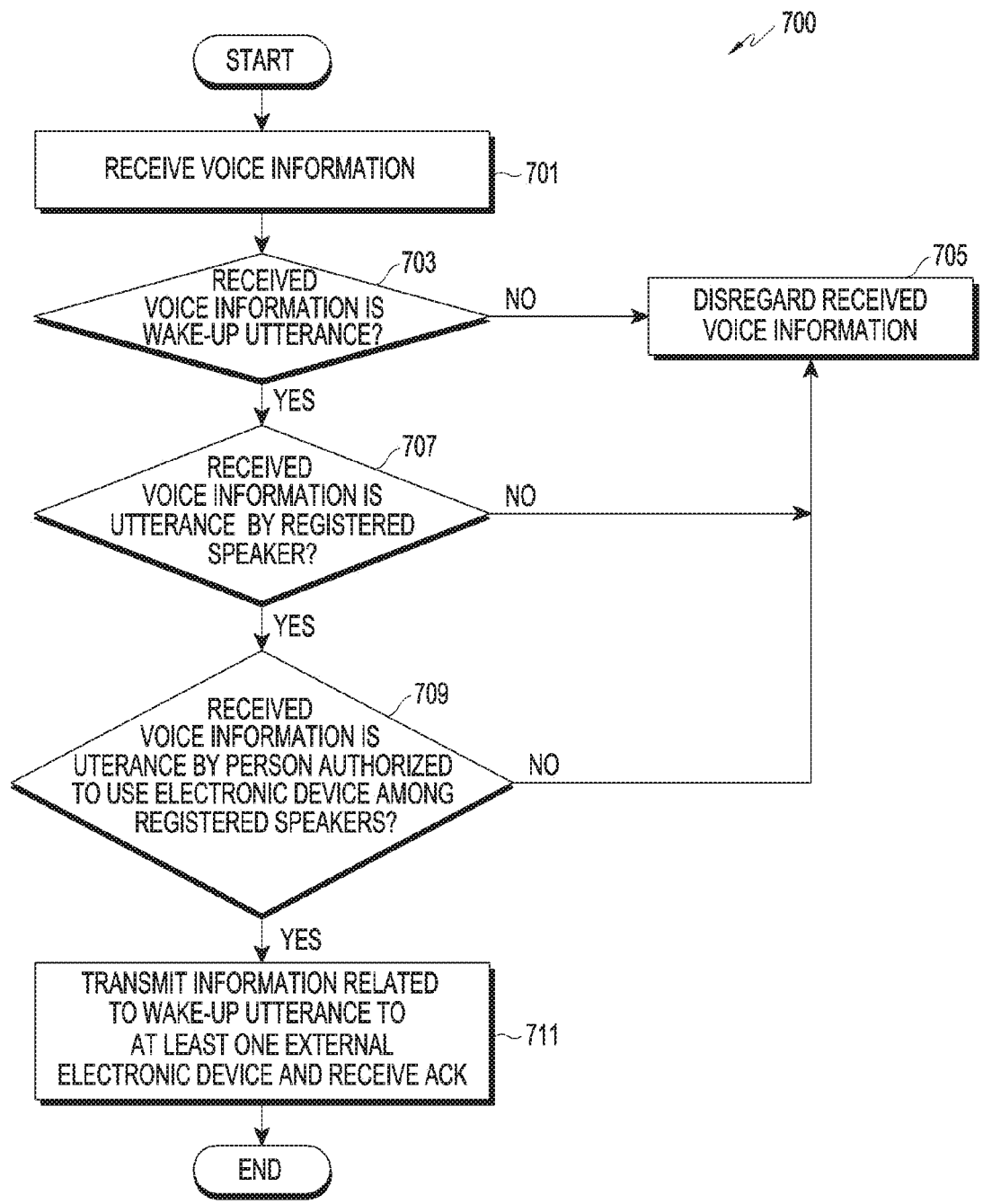
FIG. 7 is a flowchart illustrating a method of transmitting information about a wake-up command according to an embodiment.

FIG. 7 is a flowchart illustrating a method of transmitting information about a wake-up command according to an embodiment.

Referring to FIG. 7, an embodiment 700 in which the first electronic device 202 transmits first information about a wake-up utterance to at least one second electronic device 204 or third electronic device 206 in operation 207 of FIG. 2 is described below. FIG. 7 is a view illustrating an operation of transmitting information about a wake-up utterance according to an embodiment.

Referring to FIG. 7, in operation 701, the first electronic device 202 may receive voice information. In operation 703, the first electronic device 202 may determine whether the received voice information is a wake-up utterance. For example, the wake-up utterance may be one of "Bixby," "Siri," or "Alexa." For example, the first electronic device 202 may determine whether the voice information is a wake-up utterance using a keyword recognition algorithm to extract and recognize only a word to be recognized.

When the received voice information is not a wake-up utterance, the first electronic device 202 may disregard the received voice information in operation 705.

When the received voice information is a wake-up utterance, the first electronic device 202 may determine whether the received voice information is an utterance issued by a registered speaker in operation 707. For example, the electronic device 101 may determine whether the received voice information is an utterance issued by a registered speaker using a speaker recognition algorithm to recognize the voice of a particular speaker.

When the received voice information is not an utterance issued by a registered speaker, the first electronic device 202 may disregard the received voice information in operation 705.

When the received voice information is an utterance issued by a registered speaker, the first electronic device 202 may determine whether the received voice information is an utterance issued by a person authorized to use the first electronic device 202 among registered speakers in operation 709. For example, the first electronic device 202 may determine whether the received voice information is an utterance issued by a person authorized to use the first electronic device 202 among registered speakers using a speaker recognition algorithm to recognize the voice of a particular speaker. For example, when the first electronic device 202 is a smartphone, only smartphone users may be registered persons authorized to use the smartphone. For example, among speaker A, speaker B, and speaker C who have been registered in the first electronic device 202, only speaker A may be authorized to use the first electronic device 202.

When the received voice information is an utterance issued by a person who is not authorized to use the first electronic device 202 among the registered speakers, the first electronic device 202 may disregard the received voice information in operation 705.

When the received voice information is an utterance issued by a person authorized to use the first electronic device 202 among the registered speakers, the first electronic device 202 may transmit information related to the wake-up utterance to at least one second electronic device 204 or third electronic device 206 and receive an ACK thereof in operation 711. As the information related to the wake-up utterance is transmitted to the external electronic device only when the wake-up utterance is an utterance issued by a person authorized to use the first electronic device 202 among the registered speakers, the first electronic device 202 may be prevented from attending the competition of determining a leader device due to the voice information issued by a person who is not authorized to use the first electronic device 202.

Figure 8A:
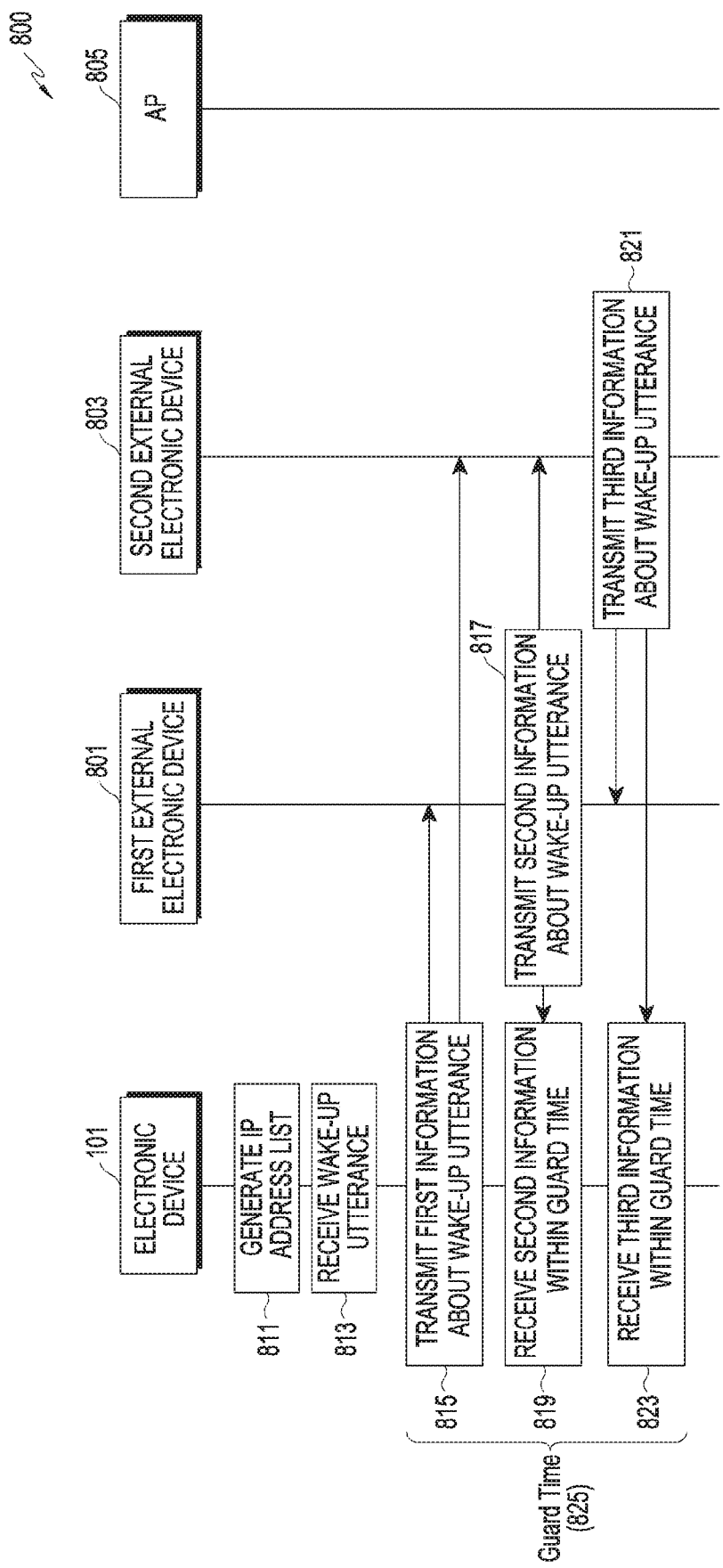
FIGS. 8A and 8B illustrate operations of receiving information about a wake-up command according to an embodiment.
Figure 8B:
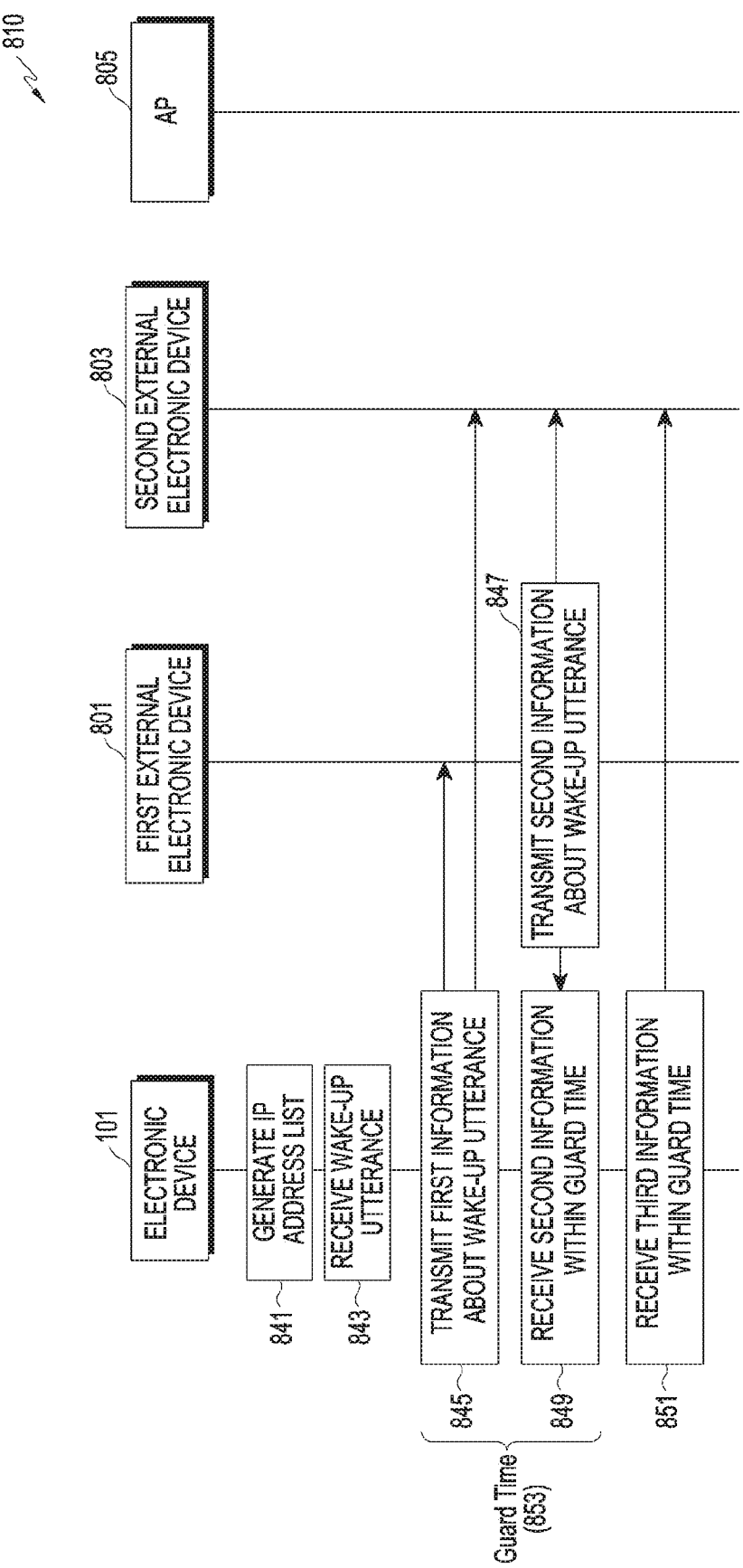

FIGS. 8A and 8B illustrate operations of receiving information about a wake-up command according to an embodiment.

Referring to FIGS. 8A and 8B, embodiments 800 and 810 in which the electronic device 101 (e.g., the first electronic device 202 of FIG. 2A) receives information about a wake-up utterance received by at least one external electronic device 801 and 803 from a first external electronic device 801 (e.g., the second electronic device 204 of FIG. 2A) and a second external electronic device 803 (e.g., the third electronic device 206 of FIG. 2A) in operation 209 of FIG. 2 are described below.

For example, as shown in FIG. 8A, the electronic device 101 may generate (811) an IP address list for the first external electronic device 801 and the second external electronic device 803 connected with an AP 805 (e.g., the third electronic device 206 of FIG. 2A) in operation 811.

In operation 813, the electronic device 101 may receive the whole wake-up utterance through the microphone.

Upon receiving the wake-up utterance, the electronic device 101 may transmit first information about the wake-up utterance to the first external electronic device 801 and the second external electronic device 803 in operation 815.

When the first external electronic device 801 transmits second information about the wake-up utterance received by the first external electronic device 801 in operation 817, the electronic device 101 may receive the second information after transmitting the first information and before a guard time 825 elapses in operation 819.

When the second external electronic device 803 transmits third information about the wake-up utterance received by the second external electronic device 803 in operation 821, the electronic device 101 may receive the third information after transmitting the first information and before a guard time 825 elapses in operation 823. In this case, the electronic device 101 may determine that the information about the wake-up utterance is received from all the external electronic devices 801 and 803 included in the IP address list within the guard time 825.

As another example, when an external electronic device which transmits no information about the wake-up utterance is identified among the external electronic devices included in the IP address list within the guard time 825, the electronic device 101 may additionally request the identified external electronic device to transmit information about the wake-up utterance to thereby receive the information about the wake-up utterance from all the external electronic devices.

For example, as shown in FIG. 8B, the electronic device 101 may generate an IP address list for the first external electronic device 801 and the second external electronic device 803 connected with an AP 805 in operation 841. The electronic device 101 may receive the whole wake-up utterance through the microphone in operation 843.

Upon receiving the wake-up utterance, the electronic device 101 may transmit first information about the wake-up utterance to the first external electronic device 801 and the second external electronic device 803 in operation 845.

When the first external electronic device 801 transmits second information about the wake-up utterance received by the first external electronic device 801 in operation 847, the electronic device 101 may receive the second information after transmitting the first information and before a guard time 853 elapses in operation 849. The electronic device 101 may determine that it has failed to receive information about the wake-up utterance from the second external electronic device 805 among the external electronic devices included in the IP address list within the guard time 853, after transmitting the first information, and send an additional request 851 for the third information about the wake-up utterance received by the second external electronic device 805 to the second external electronic device 805.

As the electronic device 101 determines the external electronic device which transmits no information about the wake-up utterance among the external electronic devices included in the IP address list and sends an additional request, any external electronic device may be prevented from missing in determining the leader device.

Figure 9C:
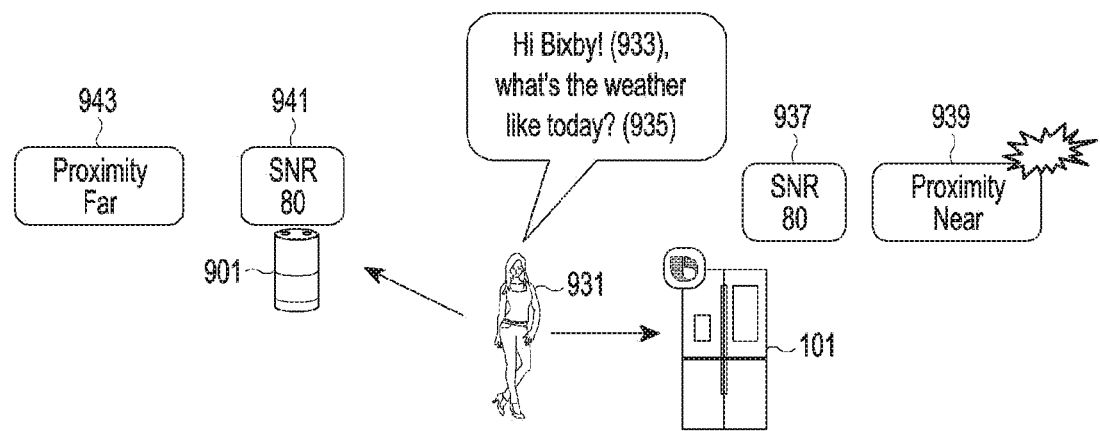

FIGS. 9A, 9B, and 9C illustrate an operation of determining whether to transmit voice information to an external server according to an embodiment.

Referring to FIGS. 9A to 9C, an embodiment in which the first electronic device 202 determines whether to transmit voice information received after a wake-up utterance to an external server in operation 211 of FIG. 2 is described below. the first electronic device 202 may store identification information broadcast from a plurality of electronic devices. For example, the identification information broadcast from the plurality of electronic devices may be IP addresses, such as 10.251.xx.1 (913), 10.251.xx.2 (915), and 10.251.xx.4 (917) as illustrated in FIG. 9A. The first electronic device 202 may receive information about the wake-up utterance from the plurality of electronic devices corresponding to the identification information included in the IP address list and store the information in the form of a table 910. For example, the wake-up utterance-related information may be the SNR of the wake-up utterance received by each electronic device, for example 50 (921), 60 (923), or 70 (925). The first electronic device 202 may store the identification information about the first electronic device 202, i.e., 10.251.xx.3 (911), along with the SNR of the wake-up utterance received by the first electronic device 202, i.e., 100 (919). When the SNR of the first electronic device 202 is the largest among the SNRs stored in the table 910, the first electronic device 202 may determine to transmit the voice information received after the wake-up utterance to the external server.

Referring to FIG. 9B, the identification information broadcast from the plurality of electronic devices may be IP addresses, such as 10.251.xx.1 (953), 10.251.xx.2 (955), and 10.251.xx.4 (957). The first electronic device 202 may receive information about the wake-up utterance from the plurality of electronic devices corresponding to the identification information included in the IP address list and store the information in the form of a table 950. For example, the wake-up utterance-related information may be the confidence score of the wake-up utterance received by each electronic device, for example 20 (961), 30 (963), or 40 (965). The first electronic device 202 may store the identification information about the first electronic device 202, i.e., 10.251.xx.3 (951), along with the confidence score of the wake-up utterance received by the first electronic device 202, i.e., 80 (959). When the confidence score of the wake-up utterance of the first electronic device 202 is the largest among the confidence scores of wake-up utterances stored in the table 950, the first electronic device 202 may determine to transmit the voice information received after the wake-up utterance to the external server.

The electronic device to transmit the voice information received after the wake-up utterance to the external server may be the leader device. Although such an example is described as to determine the leader device based on comparison of SNRs or confidence scores of wake-up utterance, the leader device may be determined based on at least one property of wake-up utterance such as audio quality, volume, or sound pressure.

The leader device may also be determined considering the state information about the first electronic device 202 or a plurality of electronic devices as well as the properties of wake-up utterance. For example, the state information may include at least one of the type information about the first electronic device 202, information about the application running on the first electronic device 202, the distance between the user and the first electronic device 202, or the capability of the first electronic device 202. Referring to FIG. 9C, an embodiment in which the first electronic device 202 determines the leader device based on state information and information about a wake-up utterance is described below.

For example, as shown in FIG. 9C, the user 931 may issue voice information, e.g., "Hi, Bixby! (933), What's the weather like today? (935)" after a wake-up utterance. The electronic device 101 (e.g., the first electronic device 202 of FIG. 2A) may calculate the SNR for "Hi, Bixby! (933)" to be 80 (937) and determine that the proximity to the user is near (939). The electronic device 101 may receive far (943), which is the proximity of the first external electronic device 901 (e.g., the second electronic device 204 of FIG. 2A) to the user, and may receive the SNR value 80 (941) for "Hi, Bixby! (933)" calculated by the first external electronic device 901. Although its own SNR is the same as the SNR of the first external electronic device 901, the electronic device 101 may determine that the electronic device 101 is the leader device based on the proximity to the user.

As another example, when the electronic device 101 is a TV and an image playing application is running, it may be determined not to transmit voice information received after the wake-up utterance to the external server (i.e., it is not the leader device) regardless of information about the wake-up utterance received by the electronic device 101. If the electronic device 101 transmits the voice information received after the wake-up utterance to the external server, it may be required to receive a command corresponding to the voice information from the external server and execute the command. Thus, the application currently running may be determined first.

When the electronic device 101 is determined to be the leader device, the electronic device 101 may connect with the external server and transmit the voice information received after the wake-up utterance to the external server.

Figure 10:
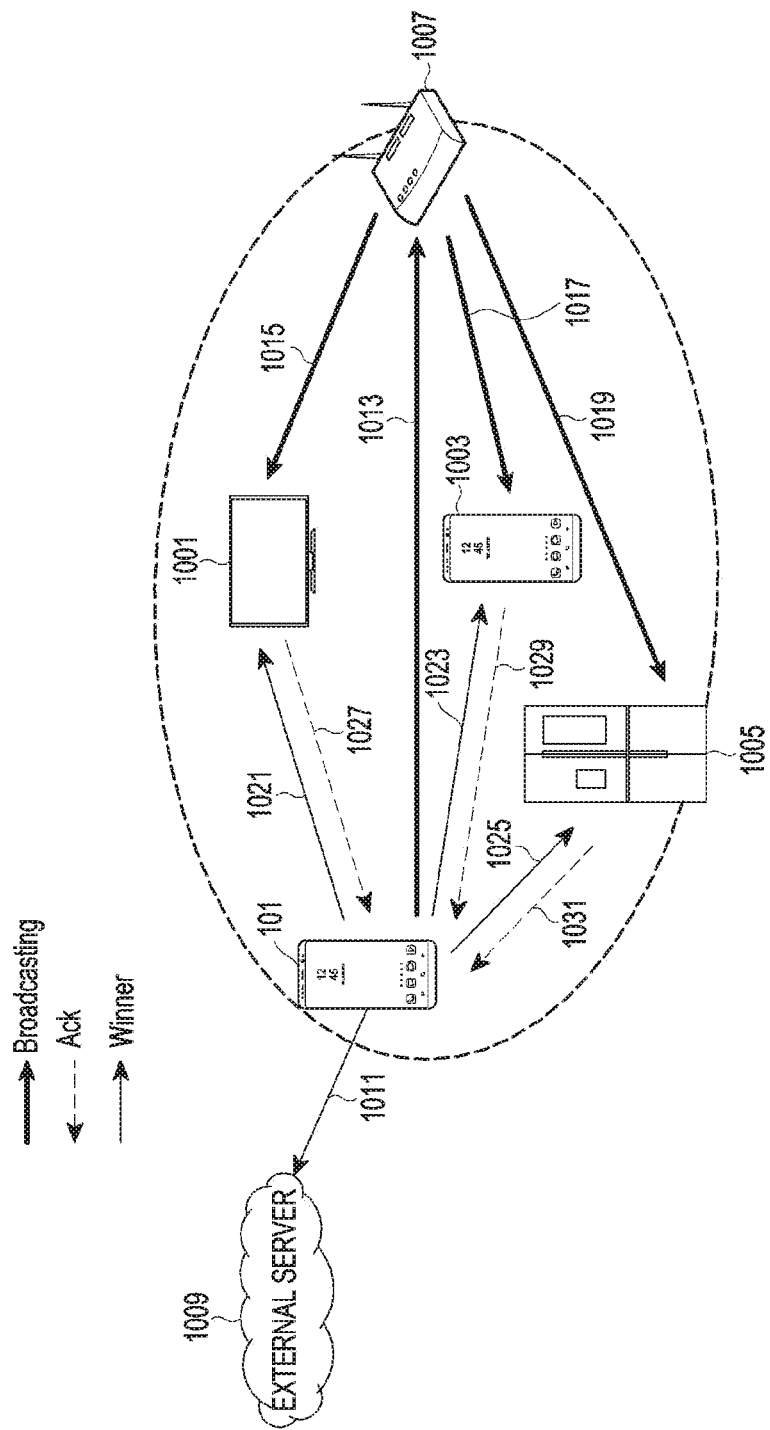
FIG. 10 illustrates an operation of receiving voice information and transmitting the voice information to an external server according to an embodiment.

FIG. 10 illustrates an operation of receiving voice information and transmitting the voice information to an external server according to an embodiment.

Referring to FIG. 10, operations performed by the electronic device 101 when the electronic device 101 (e.g., the first electronic device 202 of FIG. 2A) is determined to be the leader device are described below. FIG. 10 is a view illustrating an operation of receiving voice information and transmitting the voice information to an external server according to an embodiment. As shown in FIG. 10, when the electronic device 101 is determined to be the leader device, the electronic device 101 may transmit (1011) a signal to indicate that the electronic device 101 is the leader device to an external server 1009 (e.g., the processing server 212 of FIG. 2A) and broadcast (1013, 1015, 1017, and 1019) signals to indicate that the electronic device 101 is the leader device through an AP 1007 (e.g., the AP 208 of FIG. 2A) to a first external electronic device 1001 (e.g., the second electronic device 204 of FIG. 2A), a second external electronic device 1003 (e.g., the third electronic device 206 of FIG. 2A), and a third external electronic device 1005. The electronic device 101 may transmit (1021, 1023, and 1025) signals to indicate that the electronic device 101 is the leader device to the first external electronic device 1001, the second external electronic device 1003, and the third external electronic device 1005 connected with the AP 1007 through 1:N (reliable multicast transport protocol) communication and receive ACKs (1027, 1029, and 1031).

As the electronic device 101 transmits the signals to indicate that the electronic device 101 is the leader device to the AP 1007 and the plurality of external electronic devices 1001, 1003, and 1005 connected with the AP 1007, the plurality of external electronic devices 1001, 1003, and 1005 connected with the AP 1007 may be prevented from transmitting voice information to the external server 1009.

Figure 11:
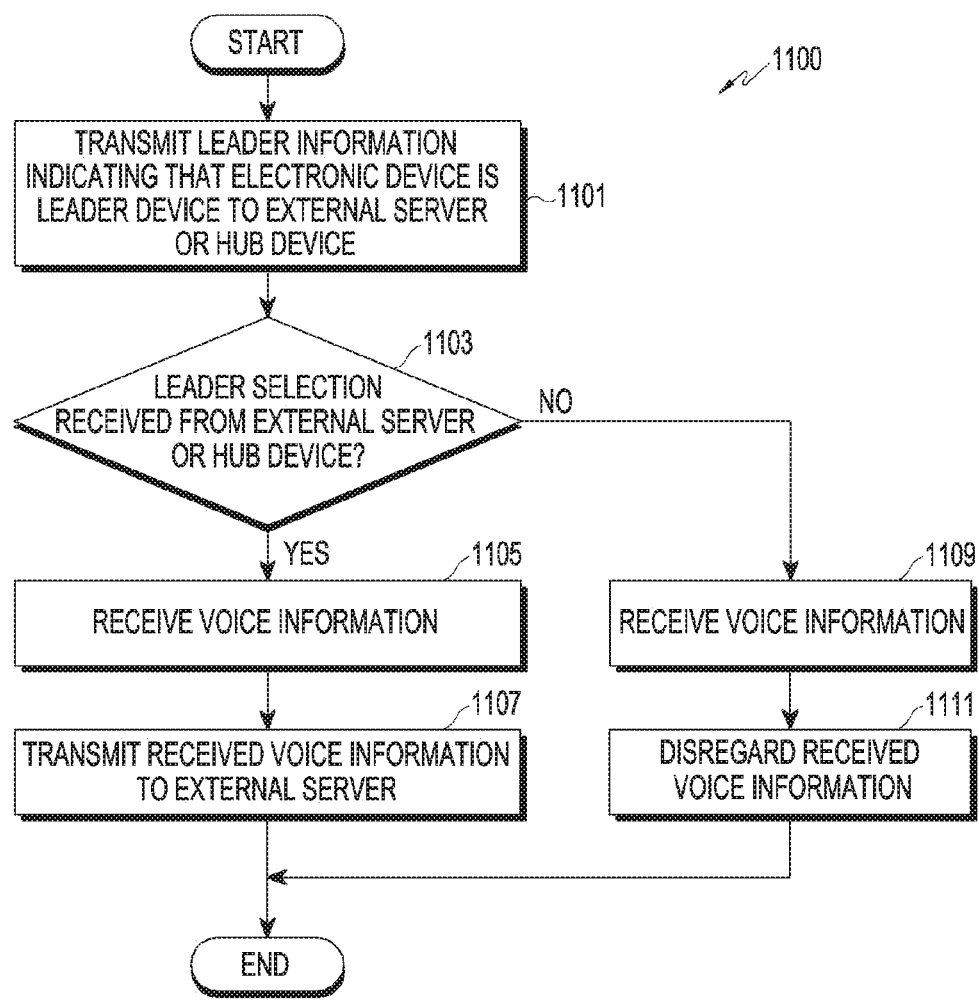
FIG. 11 is a flowchart illustrating a method of transmitting voice information according to selecting a leader device, according to an embodiment.

FIG. 11 is a flowchart (1100) illustrating an operation of transmitting voice information according to selecting a leader, according to an embodiment.

In FIG. 11, selecting a leader device may mean that the electronic device determines and notifies the external server that the electronic device itself is the leader device and is confirmed by the external server that it is the leader device.

In operation 1101, according to an embodiment, the electronic device 101 (e.g., the processor 120) may transmit leader information indicating that the electronic device is the leader device to an external server or a hub device. For example, the hub device may be one of electronic devices providing an intelligent assistant service or may be a home appliance, e.g., a cable box, with the functionality of managing electronic devices.

In operation 1103, the electronic device 101 may receive a leader selection from the external server or hub device. The leader selection may be a signal that the external server or hub device sends to indicate that it is the leader in response to the leader information from the electronic device 101.

Upon receiving the leader selection from the external server or hub device, the electronic device 101 may receive voice information in operation 1105, according to an embodiment. The voice information may be a voice command issued by the user to use the intelligent assistant service. For example, the voice information may be a question, e.g. "What's today's weather forecast?" or a command, e.g. "Play music playlist 1."

In operation 1107, the electronic device 101 may transmit the received voice information to the external server, according to an embodiment. For example, the electronic device 101 may transmit the received voice information to the external server, and the external server may analyze the voice information. Or, the electronic device 101 may transmit data resulting from analyzing the voice information to the external server.

If no leader selection is received from the external server or hub device in operation 1103, the electronic device 101 may receive voice information in operation 1109, according to an embodiment.

In operation 1111, the electronic device 101 may disregard the received voice information, according to an embodiment. If no leader selection is received from the external server or hub device, the electronic device 101 might not be the leader device. For example, although the electronic device 101 has determined itself to be the leader device among the plurality of external electronic devices connected with the AP where the electronic device 101 is connected, the electronic device 101 might not be selected as the leader device due to competition with external electronic devices not connected with the AP. In such a case, the external electronic device selected as the leader device may transmit the voice information and, thus, the electronic device 101, although receiving the voice information, may disregard the received voice information.

Figure 12A:
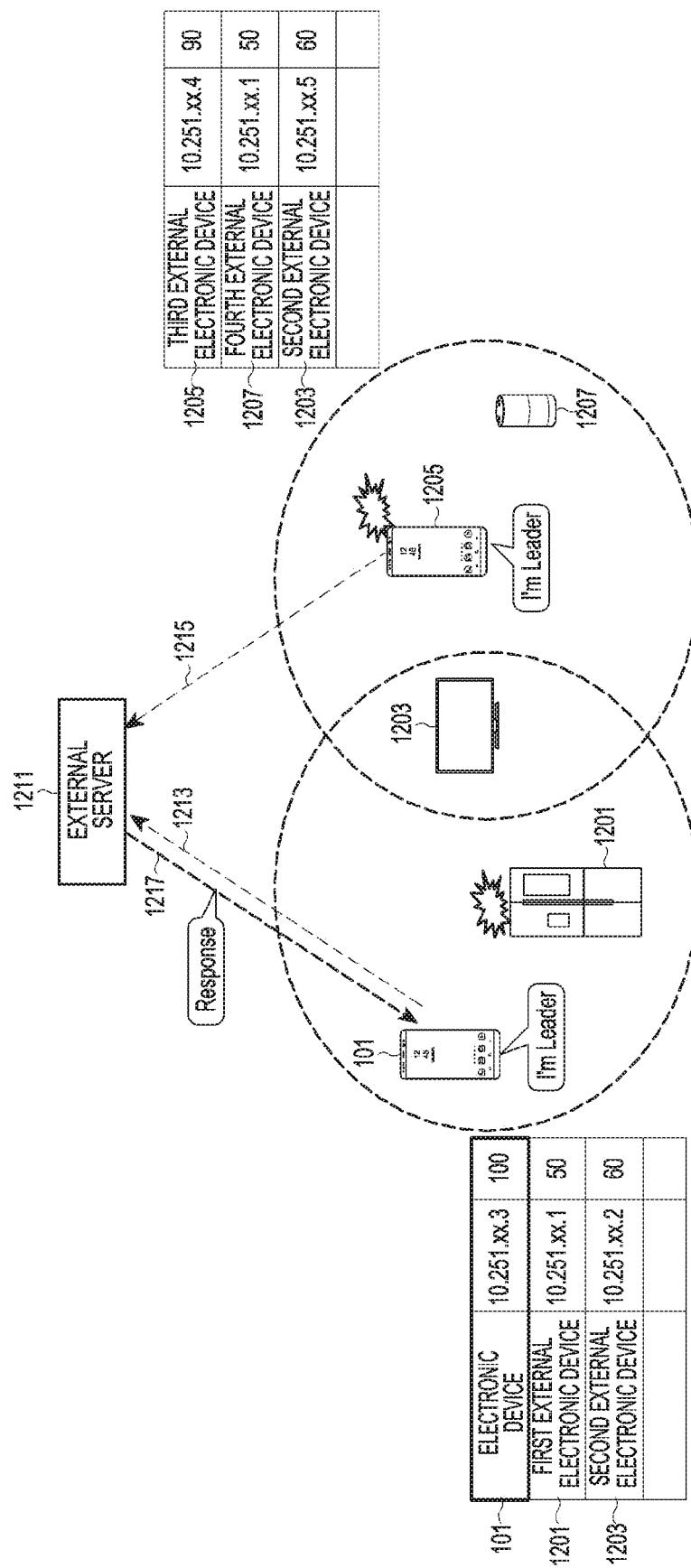
FIGS. 12A and 12B illustrate an operation of transmitting voice information according to selecting a leader device according to an embodiment.
Figure 12B:
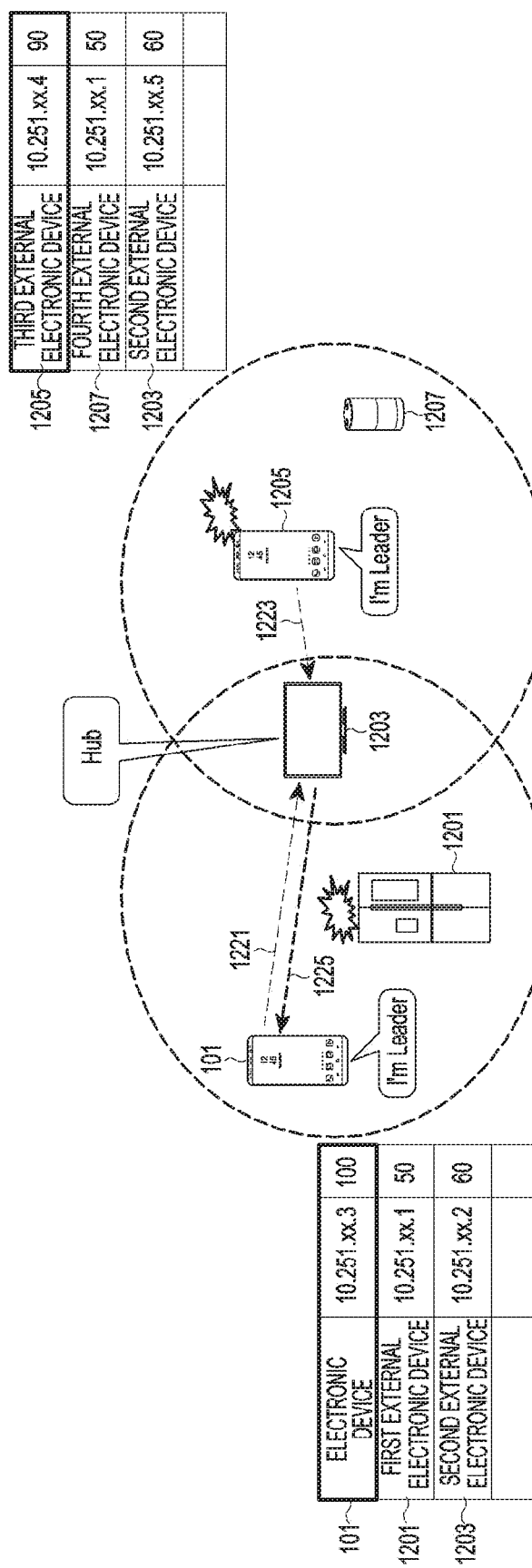

FIGS. 12A and 12B are views illustrating an operation of transmitting voice information according to selecting a leader according to an embodiment. FIGS. 12A and 12B assume an environment where an electronic device 101, a first external electronic device 1201, and a second external electronic device 1203 are connected with a first AP and the second external electronic device 1203, the a third external electronic device 1205, and a fourth external electronic device 1207 are connected with a second AP.

Referring to FIG. 12A, when an external server 1211 determines the leader device, the electronic device 101 may determine that the electronic device 101 itself is the leader device using only information about the wake-up utterance received from the first external electronic device 1201 and the second external electronic device 1203 connected with the first AP and in operation 1213, transmit leader information indicating that the electronic device 101 is the leader device to the external server 1211. The third external electronic device 1205, which has the highest SNR among the external electronic devices 1203, 1205, and 1207 connected with the second AP, may determine that the third external electronic device 1205 is the leader device and in operation 1215, transmits leader information indicating that the third external electronic device 1205 is the leader device to the external server 1211.

The number of electronic devices (i.e., the leader device) performing voice information received after the wake-up utterance is one. Thus, upon receiving leader information from the electronic device 101 and the third external electronic device 1205, the external server 1211 may determine the leader device and in operation 1217, transmits a leader selection indicating that it has been selected as the leader device to the electronic device 101. For example, the external server 1211 may determine the leader device as the electronic device 101 which has the larger SNR and/or larger confidence score of wake-up utterance of the electronic device 101 and the third external electronic device 1205 which have transmitted the leader information.

Referring to FIG. 12B, when the second external electronic device 1203 is operated as the hub device, the electronic device 101 may determine that the electronic device 101 itself is the leader device using only information about the wake-up utterance received from the first external electronic device 1201 and the second external electronic device 1203 connected with the first AP and in operation 1221, transmit leader information indicating that the electronic device 101 is the leader device to the second external electronic device 1203. The third external electronic device 1205, which has the highest SNR among the external electronic devices 1203, 1205, and 1207 connected with the second AP, may determine that the third external electronic device 1205 is the leader device and in operation 1223, transmit leader information indicating that the third external electronic device 1205 is the leader device to the second external electronic device 1203. The second external electronic device 1203 may determine that the electronic device 101 is the leader device and in operation 1225, transmit the leader selection to the electronic device 101. Although the second external electronic device 1203 is operated as the hub device in FIG. 12B, the hub device may be a separate device.

Figure 13:
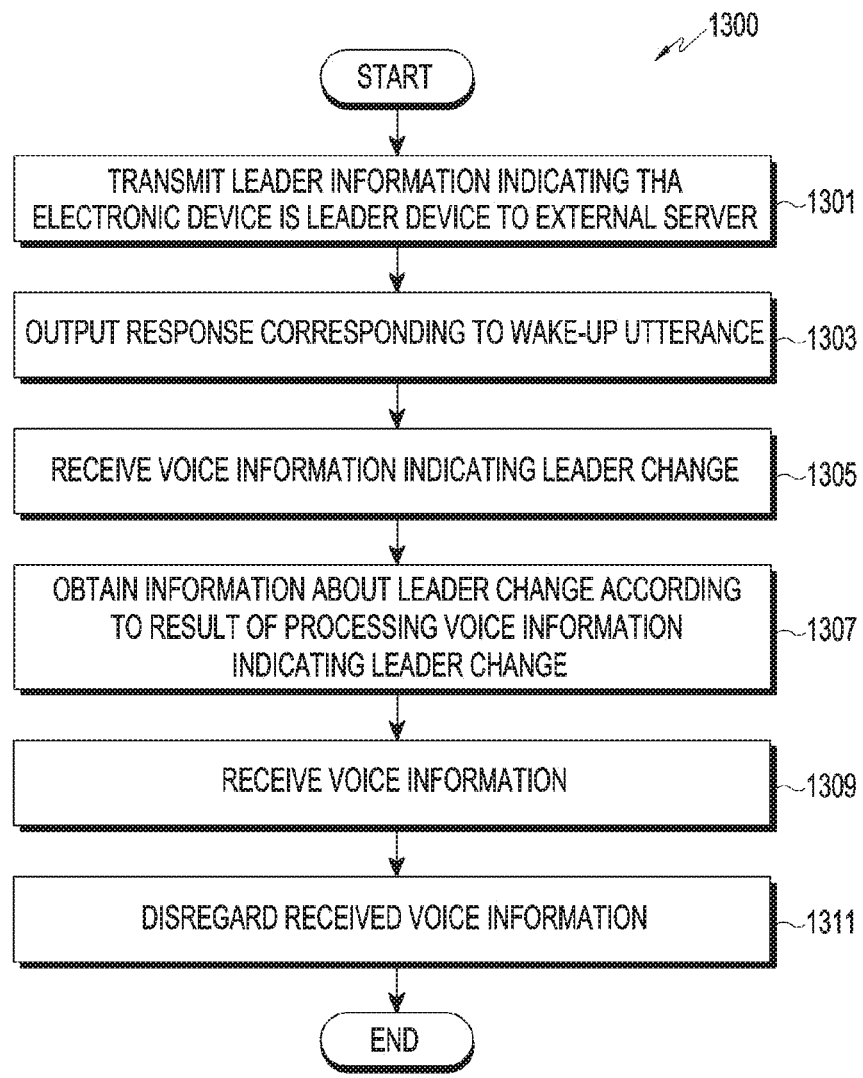
FIG. 13 is a flowchart illustrating a method of changing a leader device according to an embodiment.

FIG. 13 is a flowchart (1300) illustrating a method of changing a leader according to an embodiment.

Referring to FIG. 13, in operation 1301, an electronic device 101 (e.g., the processor 120) may transmit leader information indicating that the electronic device 101 is the leader device to an external server through, e.g., the communication module 190, according to an embodiment.

In operation 1303, the electronic device 101 may output a response corresponding to a wake-up utterance, according to an embodiment. For example, the electronic device 101 may output "Enter a command" through the speaker, corresponding to "Hi, Bixby" issued by the user. Or, the electronic device 101 may notify the user of the reception of the wake-up utterance by flickering on the display, corresponding to "Hi, Bixby" issued by the user.

In operation 1305, the electronic device 101 may receive voice information indicating a leader change, according to an embodiment. Because the user may invoke an intelligent assistant service using a first external electronic device, although the electronic device 101 has been determined to be the leader device, voice information to change the leader device to the first external electronic device may be input to the electronic device 101.

In operation 1307, the electronic device 101 may obtain information about the leader change according to a result of processing the voice information indicating the leader change, according to an embodiment For example, the electronic device 101 may transmit the voice information indicating the leader change to the external server and receive information about the leader change from the external server. As another example, the electronic device 101 may process the voice information indicating the leader change and judge the information about the leader change.

In operation 1309, the electronic device 101 may receive voice information received after the wake-up utterance, according to an embodiment.

In operation 1311, the electronic device 101 may disregard the received voice information, according to an embodiment. For example, as the voice information indicating the leader change is received, the leader device may be changed from the electronic device 101 to another external electronic device. Since the electronic device 101 is no longer the leader device, the electronic device 101 may disregard the received voice information.

Figure 14A:
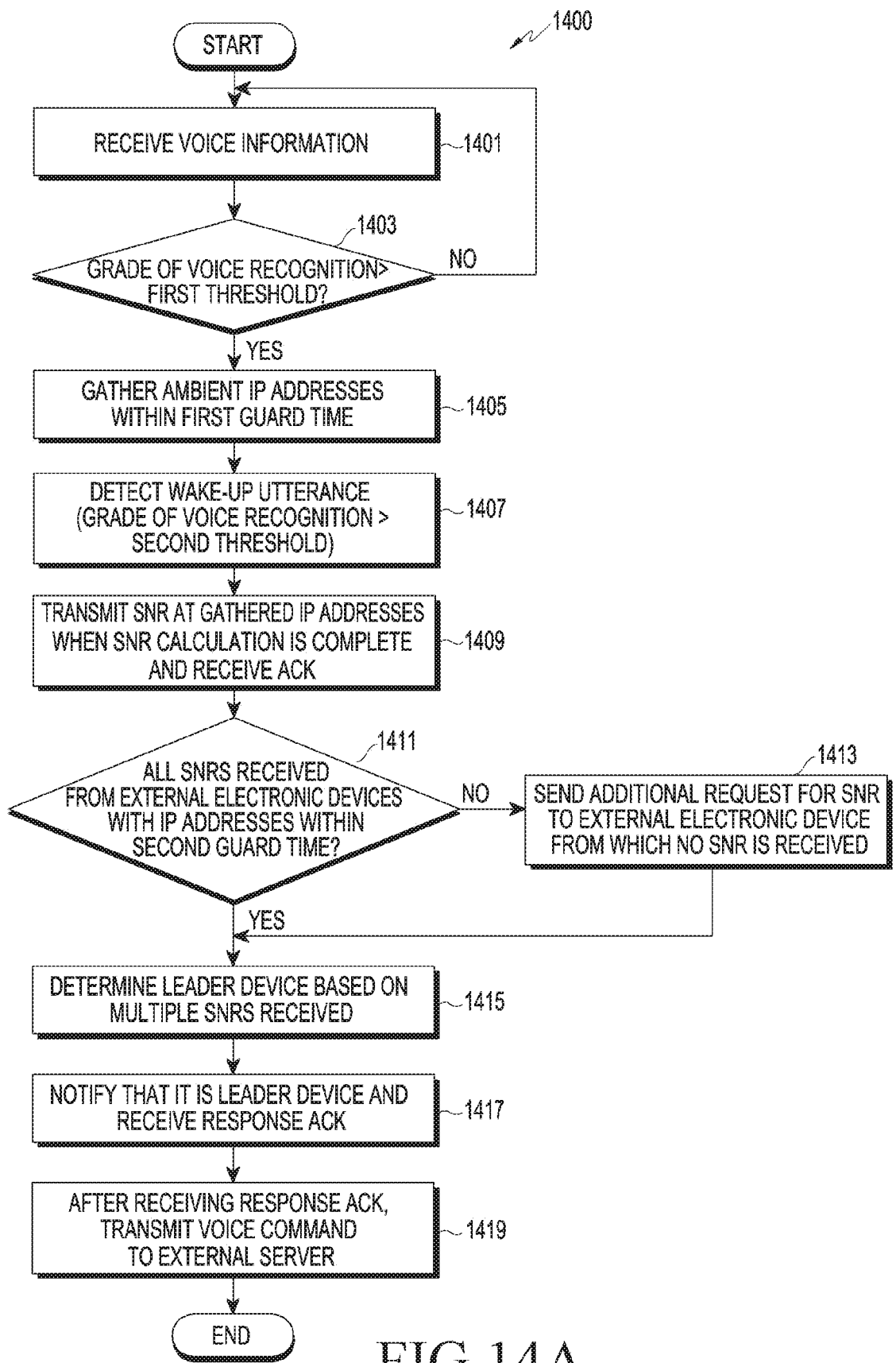
FIGS. 14A and 14B are flowcharts illustrating a method of determining a leader device according to an embodiment.

FIG. 14A is a flowchart 1400 illustrating a method of determining a leader according to an embodiment.

Referring to FIG. 14A, in operation 1401, an electronic device 101 receives voice information according to an embodiment. For example, the voice information may include a wake-up utterance to invoke an intelligent assistant service and a voice command for the intelligent assistant service.

In operation 1403, the electronic device 101 may determine whether the grade of voice recognition is larger than a first threshold, according to an embodiment. For example, the first threshold may be part of the wake-up utterance, e.g., a value indicating "Hi" which is part of "Hi, Bixby" or "Alex" which is part of "Alexa." For example, the first threshold may be a value indicating a matching proportion relative to the overall wake-up utterance. The electronic device 101 may identify the matching ratio between the received voice information and the overall wake-up utterance and identify whether the matching ratio exceeds the first threshold. When the grade of voice recognition does is not larger than the first threshold in operation 1403, the electronic device 101 may go back to operation 1401 to receive voice information.

When the grade of voice recognition does is larger than the first threshold in operation 1403, the electronic device 101 may gather ambient IP addresses within a first guard time in operation 1405. The first guard time may be any time after the time of determining that the grade of voice recognition is larger than the first threshold and may be, e.g., 100 ms to 150 ms. Gathering IP addresses may mean receiving the IP addresses of at least one external electronic device connected with the AP where the electronic device 101 is connected. By receiving part of the wake-up utterance and gathering ambient IP addresses, the electronic device 101 may transmit the SNR at the ambient IP addresses immediately when the whole wake-up utterance is received and the SNR is calculated.

In operation 1407, the electronic device 101 may detect the wake-up utterance, according to an embodiment. For example, the electronic device 101 may detect the wake-up utterance using 'keyword recognition" which extracts and recognizes only the target word for recognition.

In operation 1409, upon detecting the wake-up utterance, the electronic device 101 may calculate the SNR of the wake-up utterance and transmit the calculated SNR at the gathered IP addresses, according to an embodiment. For example, the electronic device 101 may transmit the SNR at the ambient IP addresses through UDP communication and receive ACKs from the external electronic devices corresponding to the ambient IP addresses.

In operation 1411, the electronic device 101 may determine whether it receives the SNRs from all the external electronic devices of the IP addresses within a second guard time. For example, the second guard time may be any time after the time when the electronic device 101 transmits the SNR of wake-up utterance in operation 1409.

In operation 1413, upon failing to receive the SNRs from all the external electronic devices of the IP addresses within the second guard time in operation 1411, the electronic device 101 may send an additional request for SNR to the external electronic devices from which no SNRs are received.

For example, if the electronic device 101 stores the IP addresses of the first external electronic device and second external electronic device and receives the SNR from the first external electronic device within the second guard time, the electronic device 101 may send an additional request for SNR to the second external electronic device. In such operation, the electronic device 101 may receive the SNRs from all the external electronic devices connected with the AP.

Upon receiving the SNRs from all the external electronic devices of the IP addresses within the second guard time in operation 1411, the electronic device 101 may determine the leader device based on the plurality of received SNRs, according to an embodiment in operation 1415. For example, the electronic device 101 may compare the SNRs received from the plurality of external electronic devices connected with the AP with the SNR of the wake-up utterance received through the microphone, thereby determining the leader device. For example, when the SNR of the wake-up utterance received through the microphone is the largest, the electronic device 101 may determine that the electronic device 101 itself is the leader device.

In operation 1417, the electronic device 101 may notify the ambient external electronic devices that the electronic device 101 is the leader device and receive response ACKs. For example, the electronic device 101 may transmit a signal to indicate that the electronic device 101 is the leader device to each of the external electronic devices connected with the AP via UDP communication and receive ACKs. The electronic device 101 may retransmit signals indicating that the electronic device 101 is the leader device to any external electronic devices from which no ACK is received.

In operation 1419, after the electronic device 101 may receive an ACK from each of the external electronic devices connected with the AP and transmit a voice command to the external server, according to an embodiment.

As set forth above, according to an embodiment, the electronic device 101 may receive part of a wake-up utterance, gather the IP addresses of the ambient external electronic devices, detect the wake-up utterance, transmit the SNR of wake-up utterance to the gathered IP addresses, and receive SNRs from the ambient external electronic devices, thereby determining the leader device. Accordingly, one device to perform the user's voice command among the plurality of electronic devices connected with the AP may be determined.

Figure 14B:
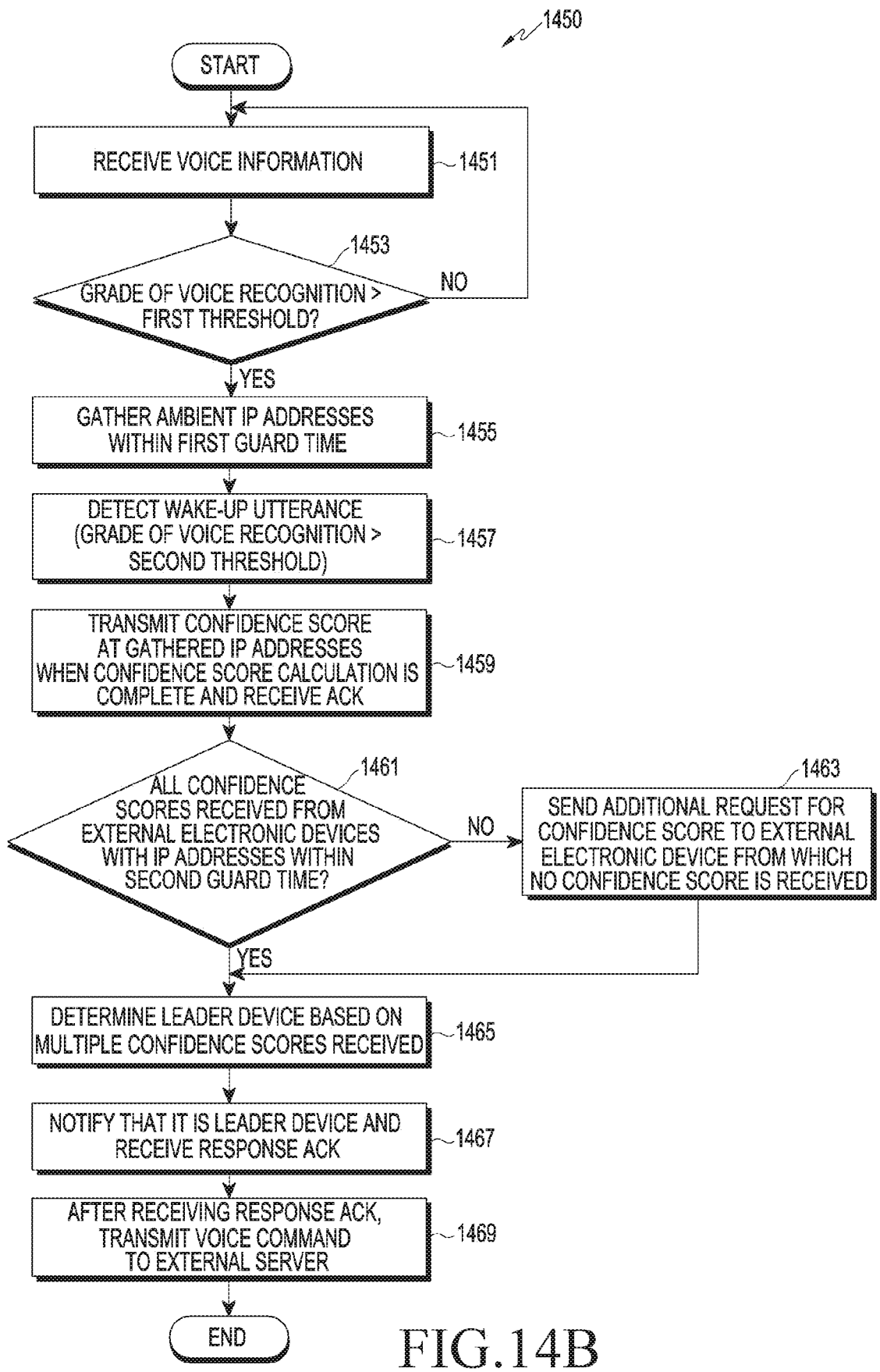

FIG. 14B is a flowchart 1450 illustrating a method of determining a leader according to an embodiment.

Referring to FIG. 14B, in operation 1451, an electronic device 101 (e.g., the processor 120) may receive voice information according to an embodiment.

In operation 1453, the electronic device 101 may determine whether the grade of voice recognition is larger than a first threshold, according to an embodiment.

In operation 1455, the electronic device 101 may gather ambient IP addresses within a first guard time.

In operation 1457, the electronic device 101 may detect the wake-up utterance, according to an embodiment. Operations 1451 to 1457 are the same as operations 1401 to 1407 described above in connection with FIG. 14A, and thus, no detailed description thereof is given.

In operation 1459, upon detecting the wake-up utterance, the electronic device 101 may calculate the confidence score of the wake-up utterance and transmit the calculated confidence score to the gathered IP addresses, according to an embodiment. For example, the electronic device 101 may transmit the confidence score at the ambient IP addresses through UDP communication and receive ACKs from the external electronic devices corresponding to the ambient IP addresses.

In operation 1461, the electronic device 101 may determine whether it receives the confidence scores from all the external electronic devices of the IP addresses within a second guard time. For example, the second guard time may be any time after the time when the electronic device 101 transmits the confidence score of wake-up utterance in operation 1459.

In operation 1463, upon failing to receive the confidence scores from all the external electronic devices of the IP addresses within the second guard time in operation 1461, the electronic device 101 may send an additional request for confidence score to the external electronic devices from which no confidence scores are received. For example, if the electronic device 101 stores the IP addresses of the first external electronic device and second external electronic device and receives a confidence score from the first external electronic device within the second guard time but not from the second external electronic device, the electronic device 101 may send an additional request for confidence score to the second external electronic device. In such an operation, the electronic device 101 may receive the confidence scores from all the external electronic devices connected with the AP.

Upon receiving the confidence scores from all the external electronic devices of the IP addresses within the second guard time in operation 1461, the electronic device 101 may determine the leader device based on the plurality of received confidence scores, according to an embodiment in operation 1465. For example, the electronic device 101 may compare the confidence scores received from the plurality of external electronic devices connected with the AP with the confidence score of the wake-up utterance received through the microphone, thereby determining the leader device. For example, when the confidence score of the wake-up utterance received through the microphone is the largest, the electronic device 101 may determine that the electronic device 101 itself is the leader device. "The confidence score is the largest" may mean that the similarity between the wake-up utterance pre-stored in the electronic device 101 and the wake-up utterance received through the microphone is the largest and, thus, may mean that the clarity of the user's wake-up utterance is high.

In operation 1467, the electronic device 101 may notify the ambient external electronic devices that the electronic device 101 is the leader device and receive response ACKs.

In operation 1469, the electronic device 101 may receive an ACK from each of the external electronic devices connected with the AP and transmit a voice command to the external server, according to an embodiment. Operations 1467 and 1469 are the same as operations 1417 and 1419 described above in connection with FIG. 14A, and thus, no detailed description thereof is given.

As set forth above, according to an embodiment, the electronic device 101 may receive part of a wake-up utterance, gather the IP addresses of the ambient external electronic devices, detect the wake-up utterance, transmit the confidence score of wake-up utterance at the gathered IP addresses, and receive confidence scores from the ambient external electronic devices, thereby determining the leader device. Accordingly, one device to perform the user's voice command among the plurality of electronic devices connected with the AP may be determined.

Figure 15:
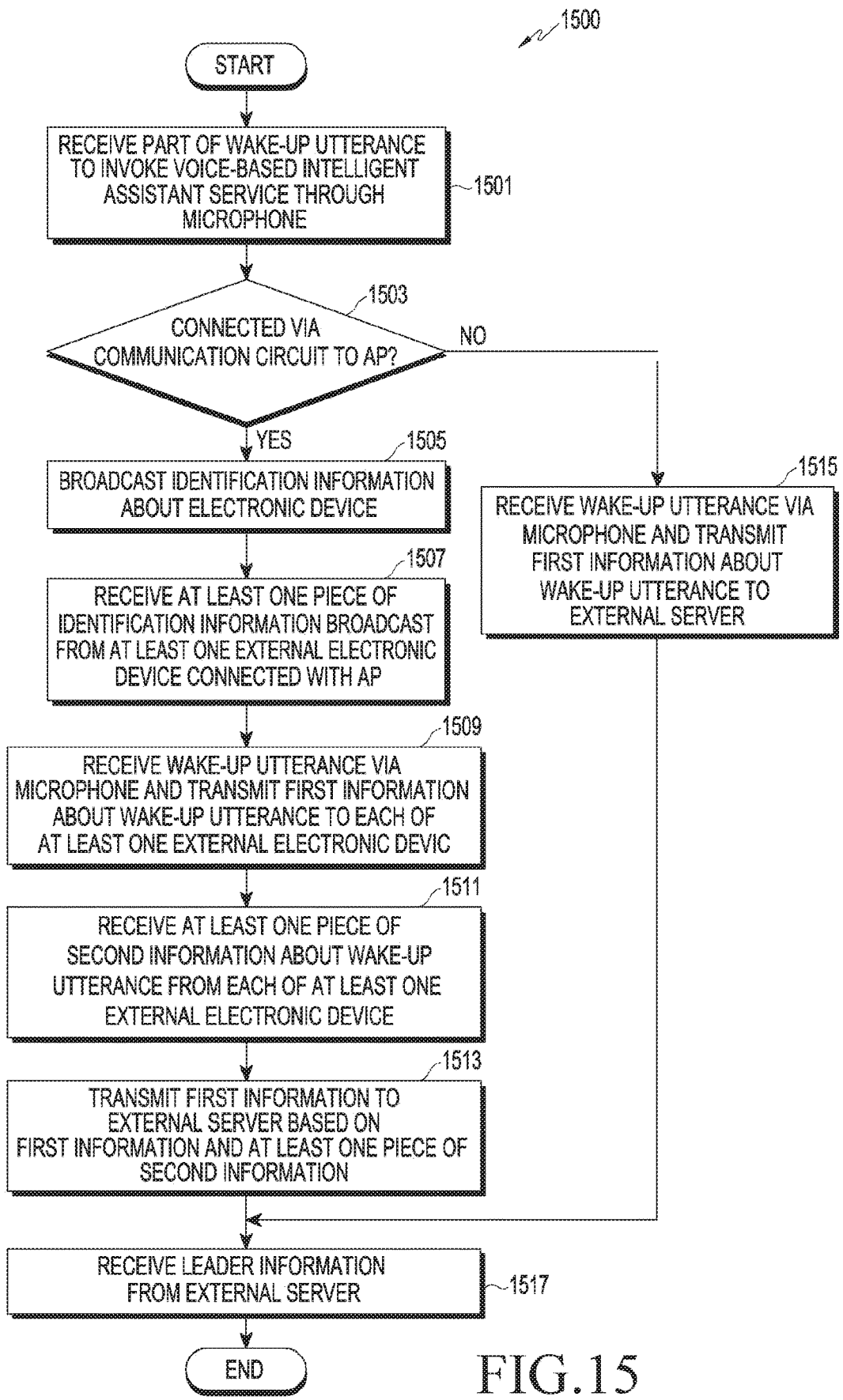
FIG. 15 is a flowchart illustrating a method of determining a leader device according to an embodiment.

FIG. 15 is a flowchart (1500) illustrating a method of determining a leader according to an embodiment.

Referring to FIG. 15, in operation 1501, according to an embodiment, an electronic device 101 (e.g., the processor 120) may receive part of a wake-up utterance to invoke a voice-based intelligent assistant service through the microphone.

In operation 1503, according to an embodiment, the electronic device 101 may determine whether it is in the state of being connected with an AP through the communication circuit. For example, if not connected with the AP, the electronic device 101 may be in the state of communicating via a 4th generation (4G) mobile communication or a 5th generation (5G) mobile communication scheme.

In operation 1505, according to an embodiment, if connected with the AP via the communication circuit, the electronic device 101 may broadcast identification information about the electronic device 101. For example, the electronic device 101 may request the AP to broadcast the IP address of the electronic device 101 or broadcast the IP address of the electronic device 101 to at least one external electronic device connected with the AP.

In operation 1507, according to an embodiment, the electronic device 101 may receive at least one piece of identification information broadcast from the at least one external electronic device connected with the AP. For example, the electronic device 101 may receive the IP address of each of the at least one external electronic device connected with the AP and additionally request the external electronic devices from which no IP addresses are received.

In operation 1509, according to an embodiment, the electronic device 101 may receive a wake-up utterance through the microphone and transmit first information about the wake-up utterance to each of the external electronic devices. Specifically, the electronic device 101 may detect the whole wake-up utterance and obtain the first information about the wake-up utterance. For example, the first information may include at least one of the SNR, audio quality, volume, or sound pressure of the wake-up utterance. The electronic device 101 may transmit the first information to each of the at least one external electronic device through UDP communication. Because the electronic device 101 transmits the first information through UDP communication, the electronic device 101 may receive an ACK from each of the at least one external electronic device.

In operation 1511, according to an embodiment, the electronic device 101 may receive at least one piece of second information about the wake-up utterance from each of the at least one external electronic device. For example, when the electronic device 101, the first external electronic device, and the second external electronic device are connected with the AP, the electronic device 101 may receive second information from the first external electronic device and the second external electronic device. The second information received from the first external electronic device may include at least one of the SNR, audio quality, volume, sound pressure, or confidence score of the wake-up utterance received by the first external electronic device. The second information received from the second external electronic device may include at least one of the SNR, audio quality, volume, sound pressure, or confidence score of the wake-up utterance received by the second external electronic device. The electronic device 101, the first external electronic device, and the second external electronic device receive one wake-up utterance issued by the user. However, since the electronic device 101, the first external electronic device, and the second external electronic device are arranged in different locations, the pieces of information about the wake-up utterance may differ from each other.

In operation 1513, according to an embodiment, the electronic device 101 may transmit the first information to the external server based on the first information and at least one piece of second information. If the electronic device 101 is determined to be the leader device based on the first information and the second information, the electronic device 101 may notify the external server that the electronic device 101 is the leader device along with the first information.

In operation 1515, according to an embodiment, if not connected with the AP via the communication circuit in operation 1503, the electronic device 101 may receive the wake-up utterance through the microphone and transmit the first information about the wake-up utterance to the external server. For example, the external server may be a server to select the leader device or an intelligent assistant server.

In operation 1517, according to an embodiment, the electronic device 101 may receive leader information from the external server. For example, the leader information may be determined based on the first information transmitted in operation 1513 and the first information transmitted in operation 1515. That is, the leader device may be determined based on the information about the electronic device determined to be the leader device among the plurality of electronic devices connected with the AP and the information about the electronic device not connected with the AP. Accordingly, although the electronic device 101 is not connected with the AP (i.e., although the electronic device 101 and at least one external electronic device are not connected with one AP), the leader device may be determined among the electronic device 101 and at least one external electronic device.

Figure 16:
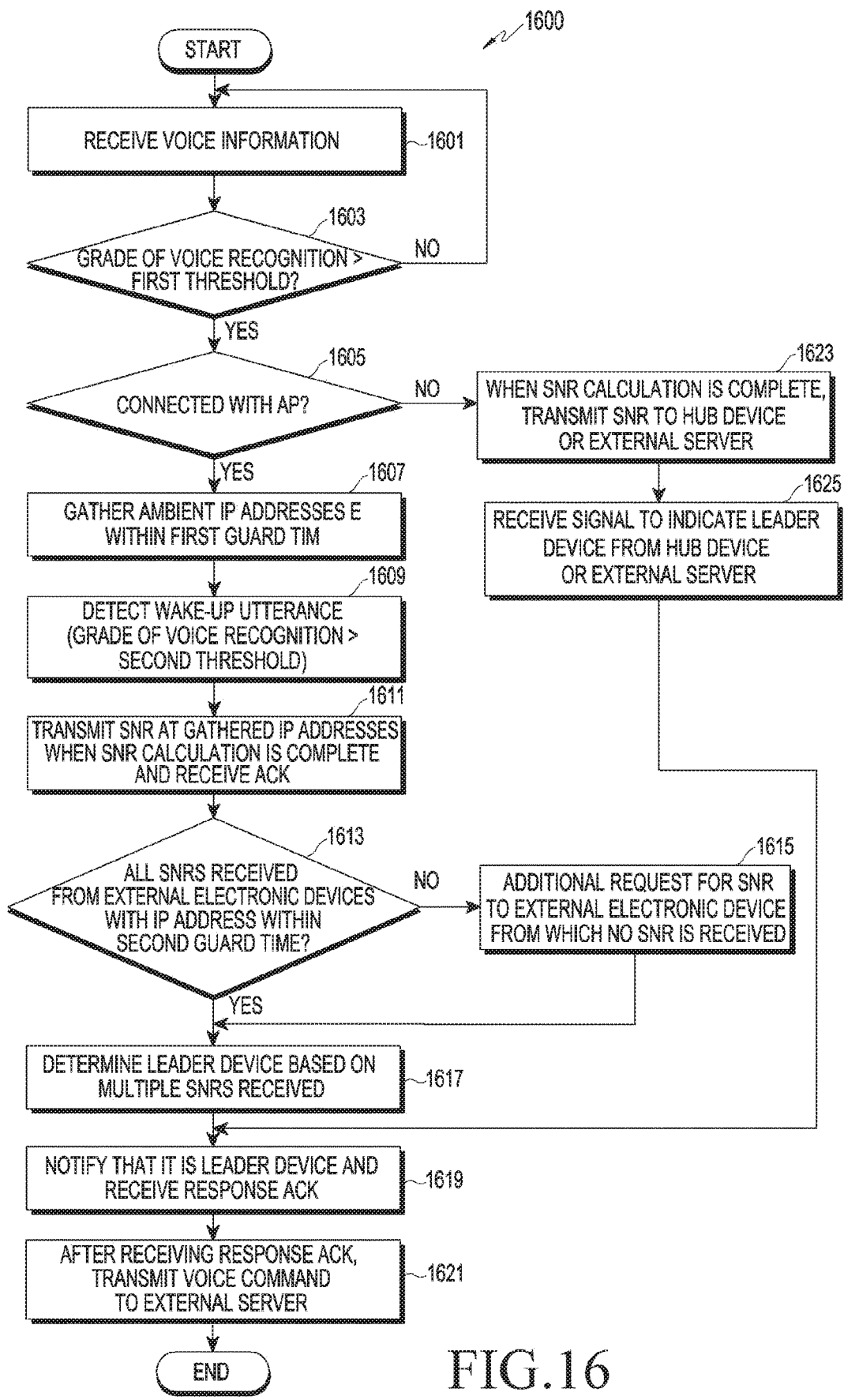
FIG. 16 is a flowchart illustrating a method of determining a leader device according to an embodiment.

FIG. 16 is a flowchart (1600) illustrating a method of determining a leader according to an embodiment.

Referring to FIG. 16, in operation 1601, an electronic device 101 (e.g., the processor 120) may receive voice information according to an embodiment. For example, the voice information may include a wake-up utterance to invoke an intelligent assistant service and a voice command for the intelligent assistant service. For example, the wake-up utterance may be "Hi, Bixby!" and the voice command may be "What's the weather like today?"

In operation 1603, the electronic device 101 may determine whether the grade of voice recognition is larger than a first threshold, according to an embodiment. For example, the first threshold may be part of the wake-up utterance, e.g., "Hi" which is part of "Hi, Bixby" or "Alex" which is part of "Alexa." When the grade of voice recognition does is not larger than the first threshold, the electronic device 101 may go back to operation 1601 to receive voice information.

When the grade of voice recognition does is not larger than the first threshold in operation 1605, according to an embodiment, the electronic device 101 may determine whether it is in the state of being connected with an AP in operation 1605.

In operation 1607, according to an embodiment, if connected with the AP, the electronic device 101 may gather ambient IP addresses within a first guard time. The first guard time may be any time after the time of determining that the grade of voice recognition is larger than the first threshold and may be, e.g., 100 ms to 150 ms.

In operation 1609, the electronic device 101 may detect the wake-up utterance, according to an embodiment. For example, the electronic device 101 may detect the wake-up utterance using 'keyword recognition" which extracts and recognizes only the target word for recognition.

In operation 1611, upon detecting the wake-up utterance, the electronic device 101 may calculate the SNR of the wake-up utterance and transmit the calculated SNR to the gathered IP addresses, according to an embodiment. For example, the electronic device 101 may transmit the SNR to the ambient IP addresses through UDP communication and receive ACKs from the external electronic devices corresponding to the ambient IP addresses.

In operation 1613, the electronic device 101 may determine whether it receives all the SNRs from the external electronic devices of the IP addresses within a second guard time. For example, the second guard time may be any time after the time when the electronic device 101 transmits the SNR of wake-up utterance in operation 1409.

In operation 1615, upon failing to receive the SNRs from all the external electronic devices of the IP addresses within the second guard time in operation 1613, the electronic device 101 may send an additional request for SNR to the external electronic devices from which no SNRs are received in operation 1615. For example, if the electronic device 101 stores the IP addresses of the first external electronic device and second external electronic device and receives the SNR from the first external electronic device within the second guard time, the electronic device 101 may send an additional request for SNR to the second external electronic device. In such operation, the electronic device 101 may receive the SNRs from all of the external electronic devices connected with the AP.

In operation 1617, the electronic device 101 may determine the leader device based on the plurality of received SNRs, according to an embodiment. For example, the electronic device 101 may compare the SNRs received from the plurality of external electronic devices connected with the AP with the SNR of the wake-up utterance received through the microphone, thereby determining the leader device. For example, when the SNR of the wake-up utterance received through the microphone is the largest, the electronic device 101 may determine that the electronic device 101 itself is the leader device.

In operation 1623, according to an embodiment, if not connected with the AP, the electronic device 101 may transmit the SNR to the hub device or external server when the SNR calculation for the received wake-up utterance is complete.

In operation 1625, according to an embodiment, the electronic device 101 may receive a signal indicating that it is the leader device from the hub device or external server. For example, the hub device or external server may compare the SNR received from the electronic device 101 with the SNR received from the external electronic device, thereby determining the leader device. In this case, the external electronic device may be the device determined to be the leader device among a plurality of external electronic devices connected with the AP where the electronic device 101 is not connected.

In operation 1619, the electronic device 101 may notify the ambient external electronic devices that the electronic device 101 is the leader device and receive response Ack's. For example, if connected with the AP, the electronic device 101 may transmit a signal to indicate that the electronic device 101 is the leader device to each of the external electronic devices connected with the AP via UDP communication and receive ACKs. The electronic device 101 may retransmit signals indicating that the electronic device 101 is the leader device to external electronic devices from which no ACK is received.

In operation 1621, the electronic device 101 may receive an ACK from each of the external electronic devices connected with the AP and transmit a voice command to the external server, according to an embodiment.

Although the SNR of wake-up utterance is used to determine the leader device in description with respect to FIG. 16, this is merely an example. The determination of the leader device may also be made based on the confidence score of wake-up utterance or both the SNR and confidence score of wake-up utterance. For example, when the difference between the largest confidence score of external electronic device among the confidence scores of a plurality of wake-up utterances and the confidence score of wake-up utterance of the electronic device 101 is within a threshold, the leader device may be determined using the SNR of the external electronic device and the SNR of the electronic device 101.

As another example, when the difference between the largest SNR of external electronic device among a plurality of SNRs and the SNR of the electronic device 101 is within a threshold, the leader device may be determined using the confidence score of wake-up utterance of the external electronic device and the confidence score of the electronic device 101.

As set forth above, according to an embodiment, if not connected with the AP, the electronic device 101 may directly transmit the information about the wake-up utterance to the external server or hub device and receive information indicating the leader device. Accordingly, even if not connected with the AP, the electronic device 101 may participate in the competition for determining the leader device with at least one external electronic device connected with the AP (i.e., using other communication scheme).

Figure 17:
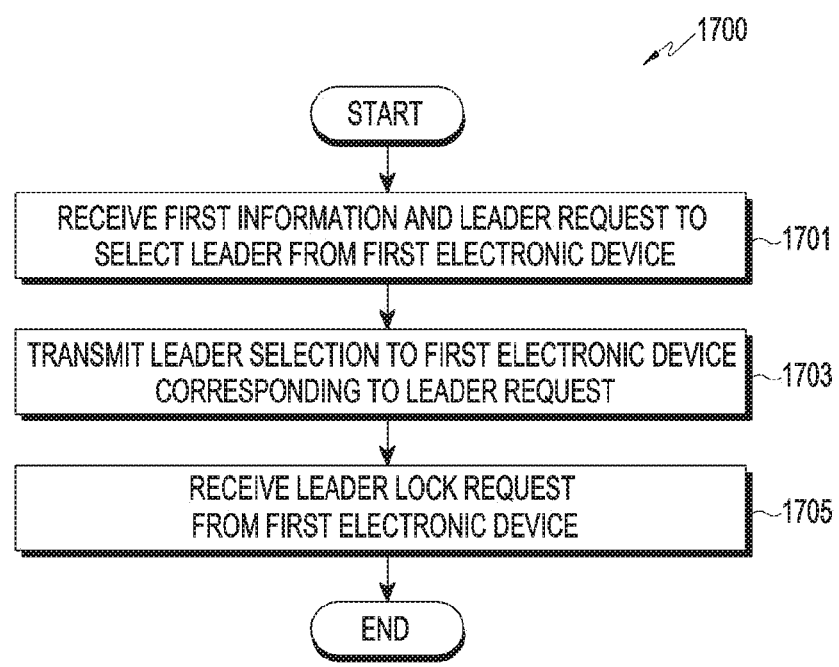
FIG. 17 is a flowchart illustrating a method of determining a leader device according to an embodiment.

FIG. 17 is a flowchart (1700) illustrating a method of determining a leader according to an embodiment.

Referring to FIG. 17, in operation 1701, according to an embodiment, an external server 108 (e.g., the server 108) may receive first information and a leader request to select the leader from a first electronic device (e.g., the electronic device 101). For example, the first electronic device may be the electronic device determined to be the leader device among a plurality of external electronic devices connected with the AP where the first electronic device is connected.

In operation 1703, according to an embodiment, the external server 108 may transmit a leader selection to the first electronic device corresponding to the leader request. According to an embodiment, the first electronic device may be the leader device by receiving the leader selection from the external server 108 but rather than by its own determination that the first electronic device is the leader device.

In operation 1705, according to an embodiment, the external server 108 may receive a leader lock request from the first electronic device. For example, the leader lock may mean rejecting the leader request from other external electronic devices than the first electronic device within any time after the external server 108 confirms the leader lock.

As set forth above, according to an embodiment, the external server 108 may receive the leader request from the first electronic device, transmit the leader selection, and receive the leader lock request. Accordingly, when there is an external electronic device other than the first electronic device, which determines that it is the leader device, one leader device may be selected.

Figure 18:
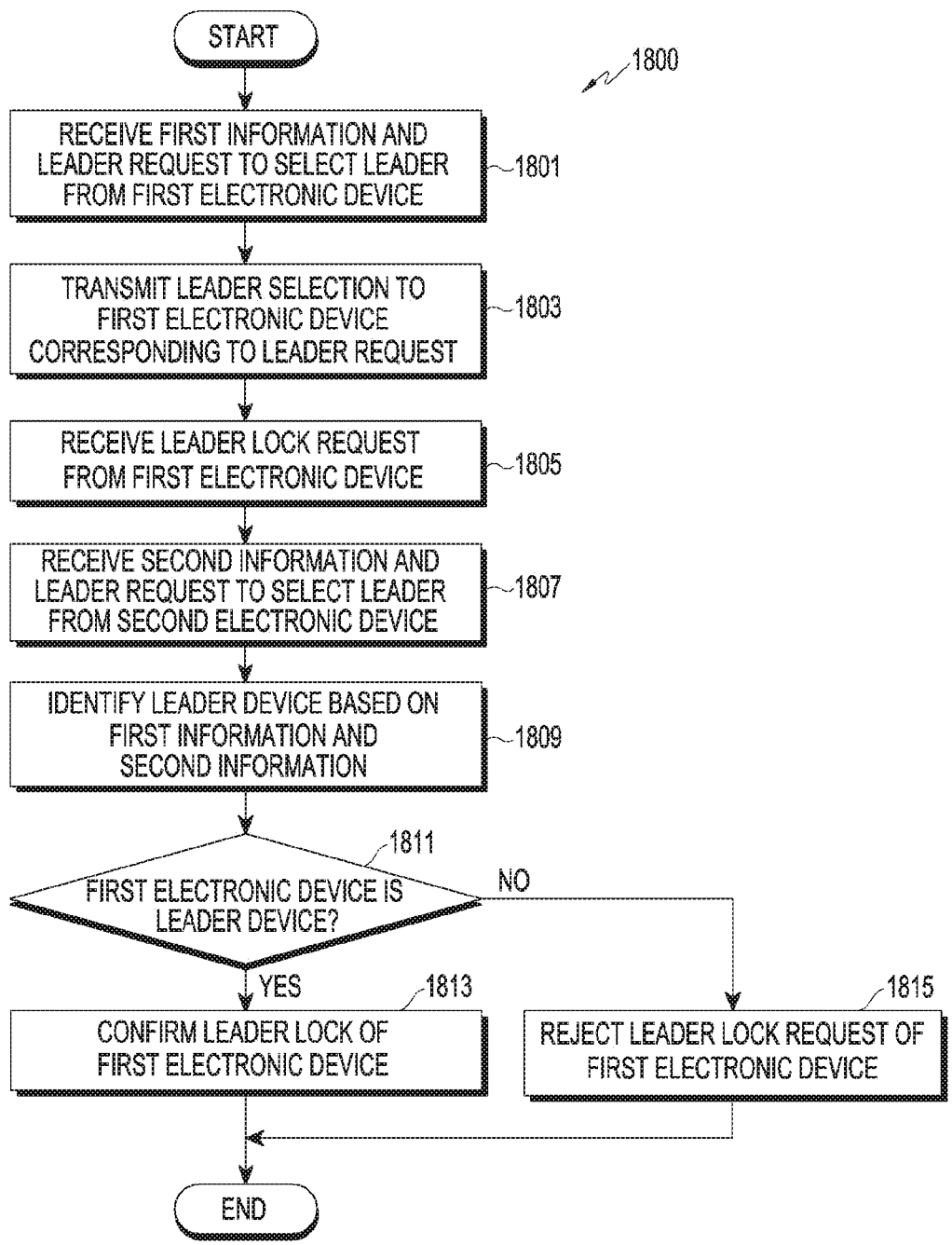
FIG. 18 is a flowchart illustrating a method of determining a leader device according to an embodiment.
Figure 19:
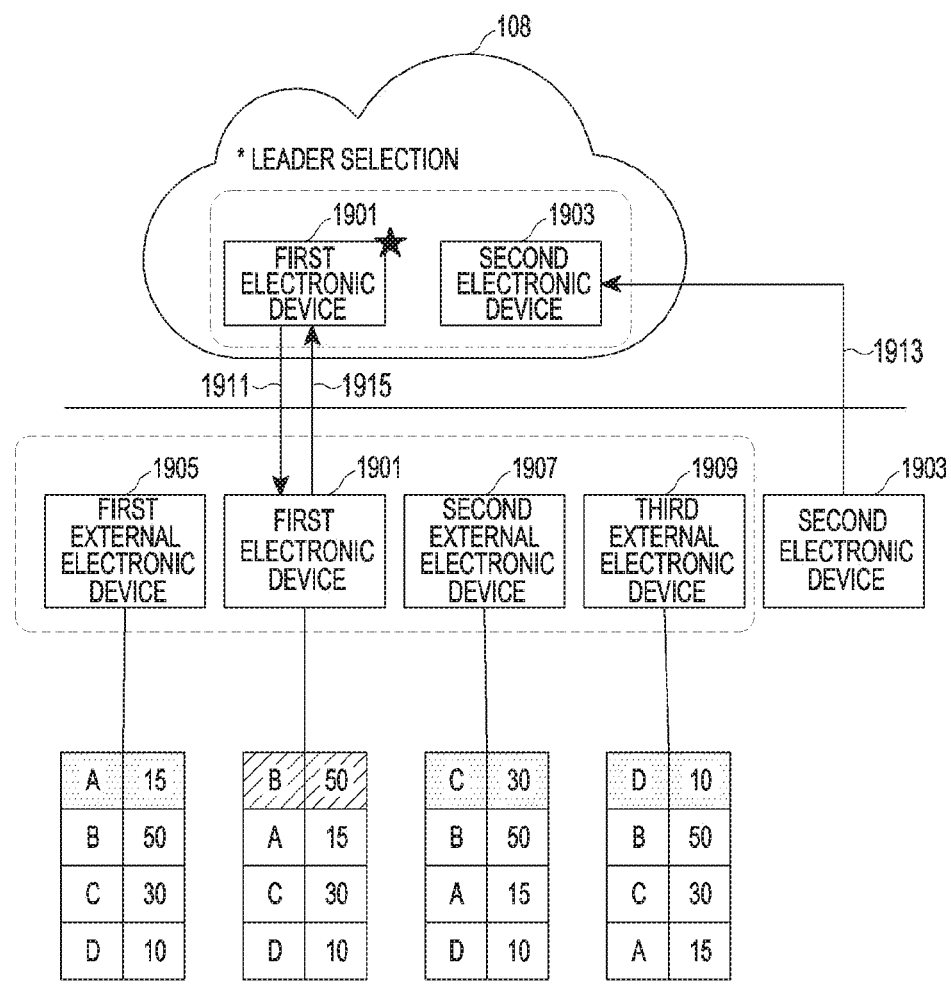
FIG. 19 illustrates an operation of determining a leader device according to an embodiment.

FIG. 18 is a flowchart (1800) illustrating a method of determining a leader according to an embodiment. The embodiment of FIG. 18 is described in further detail with reference to FIGS. 19 and 20. FIG. 18 is a view illustrating an operation of determining a leader according to an embodiment. FIG. 19 is a view illustrating an operation of determining a leader according to an embodiment.

Referring to FIG. 18, in operation 1801, according to an embodiment, an external server 108 (e.g., the server 108) may receive first information and a leader request to select the leader from a first electronic device (e.g., the electronic device 101). For example, the first electronic device may be the electronic device determined to be the leader device among a plurality of external electronic devices connected with the AP where the first electronic device is connected.

In operation 1803, according to an embodiment, the external server 108 may transmit a leader selection to the first electronic device corresponding to the leader request. According to an embodiment, the first electronic device may be the leader device by receiving the leader selection from the external server 108 but rather than by its own determination that the first electronic device is the leader device.

In operation 1805, according to an embodiment, the external server 108 may receive a leader lock request from the first electronic device. For example, the leader lock may mean rejecting the leader request from external electronic devices other than the first electronic device within any time after the external server 108 confirms the leader lock.

In operation 1807, according to an embodiment, the external server 108 may receive second information and a leader request to select a leader from a second electronic device (e.g., the third external electronic device 1205). For example, the second electronic device may be in the state of being connected with an AP other than the AP where the first electronic device is connected or in the state of using a 5G mobile communication scheme. In other words, the first electronic device and the second electronic device may be in the state of being connected with different APs or in the state of transmitting or receiving signals through different communication schemes.

In operation 1809, according to an embodiment, the external server 108 may identify the leader device based on first information received from the first electronic device and second information received from the second electronic device.

FIG. 19 illustrates an operation of determining a leader device according to an embodiment.

Referring to FIG. 19, the first electronic device 1901, the first external electronic device 1905, the second external electronic device 1907, and the third external electronic device 1909 may be in the state of being connected with the same first AP. In operation 1915, the external server 108 may receive first information and a leader request from the first electronic device 1901. The second electronic device 1903 may communicate with the server 108 in a different communication scheme that does not pass through the first AP or communicate with the server 108 through a second AP different from the first AP. Although no external electronic devices connected with the second AP are shown, there may be at least one external electronic device connected with the second AP.

In operation 1913, the external server 108 may receive second information and a leader request for the second electronic device 1903 to request to select a leader from the second electronic device 1903. The external server 108 may compare at least part of the confidence score and SNR of the wake-up utterance received from the first electronic device 1901 with at least part of the confidence score and SNR of the wake-up utterance received from the second electronic device 1903, thereby identifying any one of the first electronic device 1901 and the second electronic device 1903 as the leader device.

Figure 20:
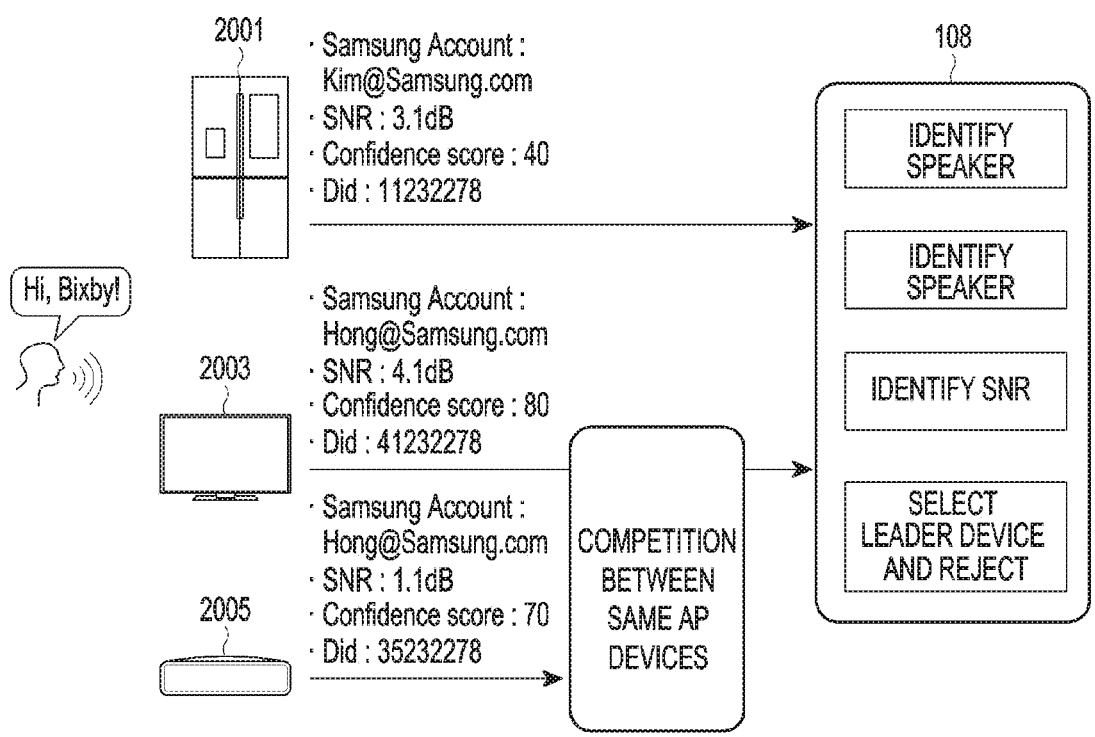
FIG. 20 illustrates an operation of determining a leader device according to an embodiment.

FIG. 20 illustrates an operation of determining a leader device according to an embodiment.

Referring to FIG. 20 that the first electronic device 2001 is in the state of being connected with no AP, the second electronic device 2003 and the third electronic device 2005 are in the state of being connected with one AP, and the second electronic device 2003 among the second electronic device 2003 and the third electronic device 2005 is in the state of being determined to be the leader device. The external server 108 may receive first state information about the first electronic device and first information about the wake-up utterance received from the first electronic device 2001 from the first electronic device 2001. For example, the first information about the wake-up utterance may include an SNR (3.1 dB) and a confidence score (40), and the first state information may include at least one of the type (e.g., refrigerator) information about the first electronic device 2001, account information, information about the application in use, or information about proximity to the user. The external server 108 may receive second state information about the second electronic device and second information about the wake-up utterance received from the second electronic device 2003 from the second electronic device 2003. For example, the second information about the wake-up utterance may include an SNR (4.1 dB) and a confidence score (80), and the second state information may include at least one of the type (e.g., smart TV) information about the second electronic device 2003, account information, information about the application in use, or information about proximity to the user. The electronic device 101 may identify the leader device based on the first information about the wake-up utterance, the state information about the first electronic device 2001, the second information about the wake-up utterance, and the state information about the second electronic device 2003.

Referring back to FIG. 18, in operation 1811, according to an embodiment, the external server 108 may determine whether the first electronic device is the leader device.

In operation 1813, according to an embodiment, when the first electronic device is determined to be the leader device in operation 1811, the external server 108 may confirm the leader lock of the first electronic device. Confirming the leader lock may mean rejecting leader requests from other external electronic devices than the first electronic device during any time after the time when the leader lock is confirmed.

In operation 1815, according to an embodiment, when the first electronic device is not the leader device (i.e., if the second electronic device is identified to be the leader device), the external server 108 may reject the leader lock request from the first electronic device.

Figure 21:
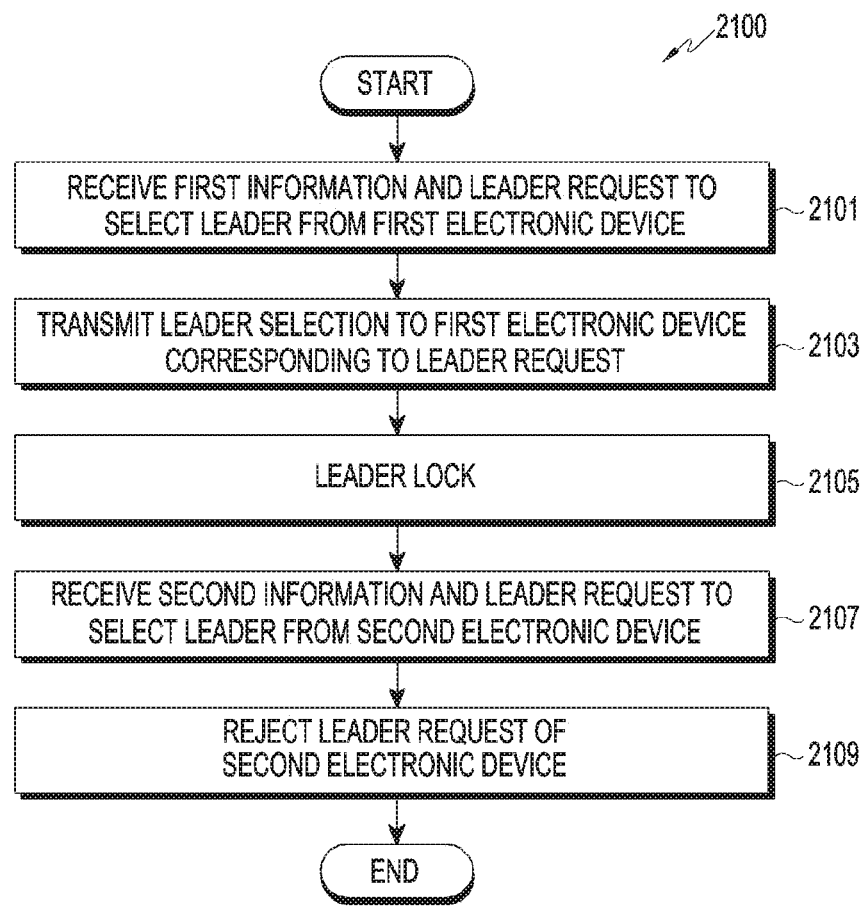
FIG. 21 is a flowchart illustrating a method of determining a leader device according to an embodiment.

FIG. 21 is a flowchart (2100) illustrating a method of determining a leader according to an embodiment. Referring to FIG. 21, in operation 2101, according to an embodiment, an external server 108 (e.g., the server 108) may receive first information and a leader request to select the leader from a first electronic device (e.g., the electronic device 101).

Figure 22:
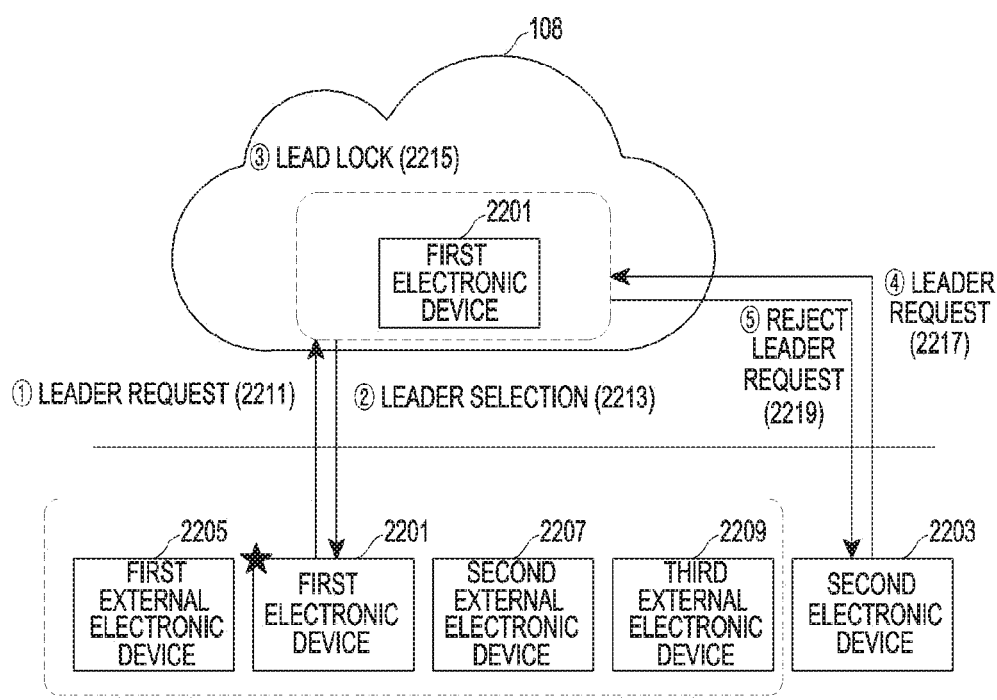
FIG. 22 illustrates an operation of determining a leader device according to an embodiment.

FIG. 22 illustrates an operation of determining a leader device according to an embodiment.

Referring to FIG. 22, the first electronic device 2201, the first external electronic device 2205, the second external electronic device 2207, and the third external electronic device 2209 are in the state of being connected with the same first AP. It may also be assumed that the second electronic device 2203 is not connected with the first AP and performs communication in another communication scheme or is connected with a second AP. Although no external electronic devices connected with the second AP are shown, there may be at least one external electronic device connected with a second AP. In operation 2211, the external server 108 may receive first information and a leader request to select a leader from the first electronic device 2201.

Referring back to FIG. 21, in operation 2103, according to an embodiment, the external server 108 may transmit a leader selection to the first electronic device corresponding to the leader request. For example, as illustrated in FIG. 22, in operation 2213, the external server 108 may transmit a leader selection to the first electronic device 2201.

Referring back to FIG. 21, in operation 2105, according to an embodiment, the external server 108 may perform leader lock while simultaneously transmitting the leader selection to the first electronic device.

For example, as shown in FIG. 22, if the external server 108 determines that the first electronic device 2201 is the leader device, the leader lock may be performed without the leader lock request from the first electronic device 2201. For example, the leader lock may mean rejecting leader selections received from external electronic devices other than the first electronic device within any time after the time when the external server 108 performs the leader lock.

Referring back to FIG. 21, in operation 2107, according to an embodiment, the external server 108 may receive second information and a leader request to select a leader from the second electronic device. For example, as illustrated in FIG. 22, in operation 2217, the external server 108 receives second information and a leader request to select a leader from the second electronic device 2203.

Referring back to FIG. 21, in operation 2109, according to an embodiment, the external server 108 may reject the leader request from the second electronic device.

For example, as illustrated in FIG. 22, upon receiving a leader request from the second electronic device 2203 in operation 2217 during the leader lock (2215), the external server 108 may reject the leader request in operation 2219.

As described above, if selecting the first electronic device as the leader device, the external server 108 may perform the leader lock immediately when selecting the first electronic device as the leader device (i.e., without receiving a leader lock request from the first electronic device). Accordingly, the speed of selecting the leader device may first be considered.

Figure 23:
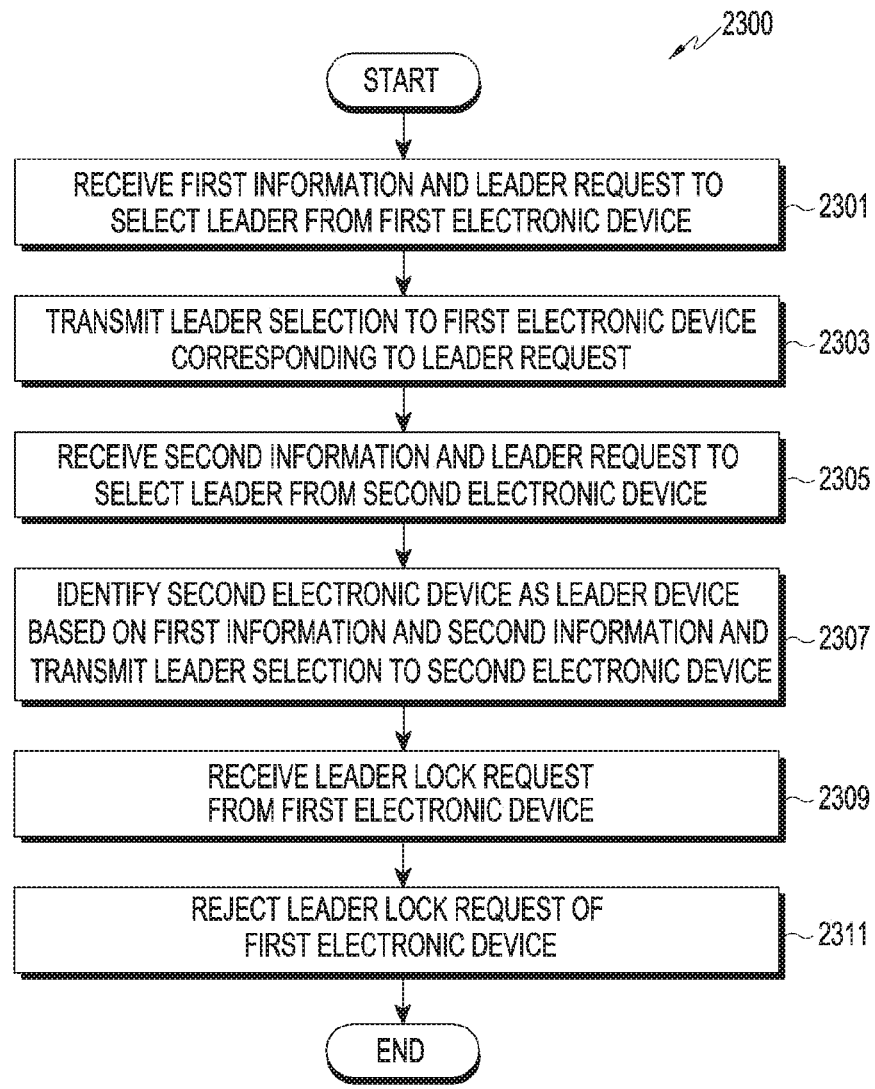
FIG. 23 is a flowchart illustrating a method of determining a leader device according to an embodiment.

FIG. 23 is a flowchart (2300) illustrating a method of determining a leader according to an embodiment. Referring to FIG. 23, in operation 2301, the server 108 receives first information and a leader request to select the leader from a first electronic device. The first electronic device may be the electronic device determined to be the leader device among a plurality of external electronic devices connected with the AP to which the first electronic device is connected.

Figure 24:
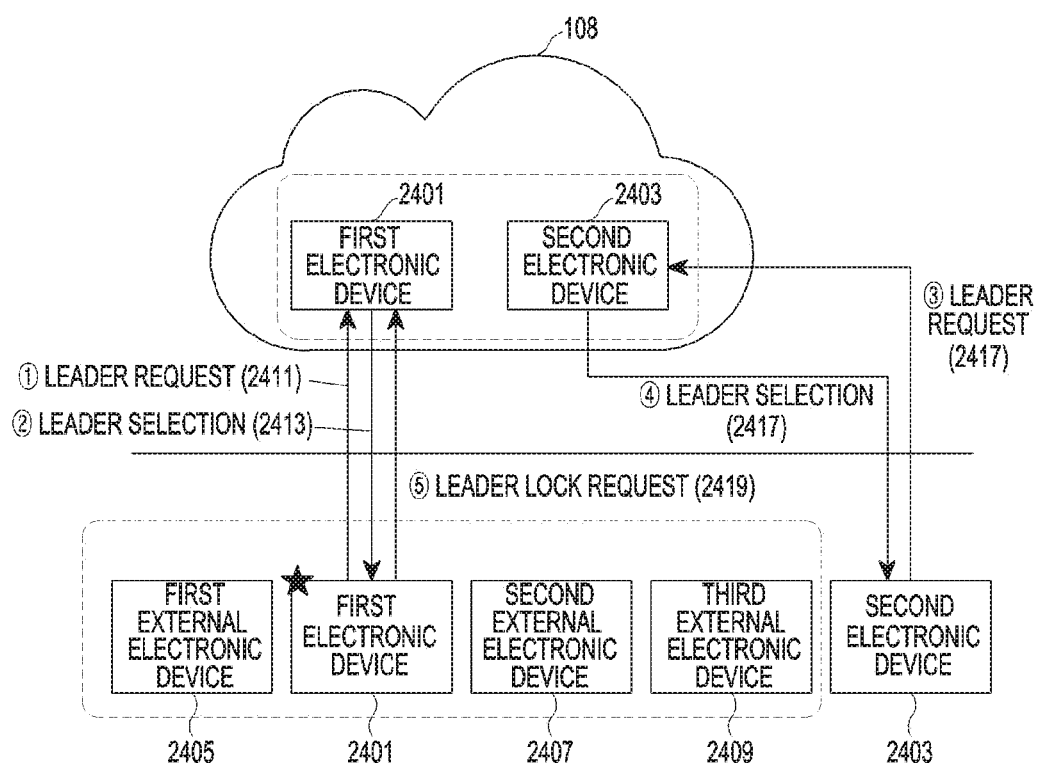
FIG. 24 illustrates an operation of determining a leader device according to an embodiment.

FIG. 24 illustrates an operation of determining a leader device according to an embodiment.

Referring to FIG. 24 that the first electronic device 2401, the first external electronic device 2405, the second external electronic device 2407, and the third external electronic device 2409 are in the state of being connected with the same first AP. It may also be assumed that the second electronic device 2403 is not connected with the first AP and performs communication in another communication scheme or is connected with a second AP. Although no external electronic devices connected with the second AP are shown, there may be at least one external electronic device connected with a second AP. In operation 2411, the external server 108 may receive first information and a leader request to select a leader from the first electronic device 2401.

Referring back to FIG. 23, in operation 2303, according to an embodiment, the external server 108 may transmit a leader selection to the first electronic device corresponding to the leader request. For example, as shown in FIG. 24, the external server 108 may transmit a leader selection to the first electronic device 2401 in operation 2413.

Referring back to FIG. 23, in operation 2305, according to an embodiment, the external server 108 may receive second information and a leader request to select a leader from the second electronic device.

For example, as shown in FIG. 24, the external server 108 may receive second information and a leader request to select a leader from the second electronic device 2403.

Referring back to FIG. 23, in operation 2307, according to an embodiment, the external server 108 may identify the second electronic device as the leader device based on first information received from the first electronic device and second information received from the second electronic device and transmits a leader selection to the second electronic device.

For example, as illustrated in FIG. 24, the external server 108 may identify the second electronic device 2403 as the leader device and in operation 2417 transmits a leader selection to the second electronic device 2403.

Referring back to FIG. 23, in operation 2309, according to an embodiment, the external server 108 may receive a leader lock request from the first electronic device. For example, the leader lock may mean rejecting leader selection requests received from other external electronic devices than the first electronic device within any time after the time when the external server 108 confirms the leader lock.

For example, as illustrated in FIG. 24, the external server 108 may receive a leader lock request from the first electronic device 2401 in operation 2419.

Referring back to FIG. 23, in operation 2311, according to an embodiment, the external server 108 may reject the leader lock request from the first electronic device.

Referring again to FIG. 24, although the first electronic device 2401 transmits a leader lock request within any time after receiving (2413) a leader selection from the external server 108, the second electronic device 2403 may be selected as the leader device before transmitting (2419) the leader lock request and after receiving (2413) the leader selection. In such a case, because the second electronic device is the leader device when the external server 108 receives the leader lock from the first electronic device, the leader lock request from the first electronic device may be rejected. Accordingly, the embodiment illustrated in FIG. 24 provides increased accuracy in identifying the leader device than in the embodiment of FIG. 22 when leader lock is performed simultaneously with leader selection.

Figure 25:
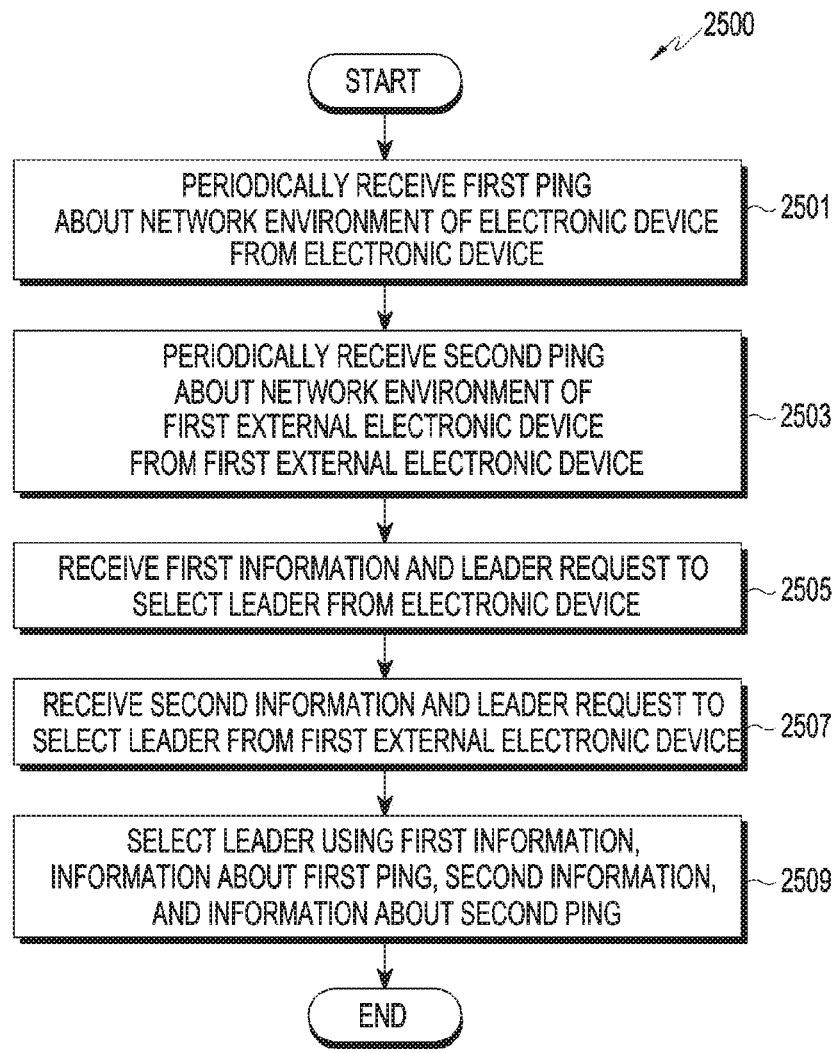
FIG. 25 is a flowchart illustrating an operation of determining a leader device according to an embodiment.
Figure 26A:
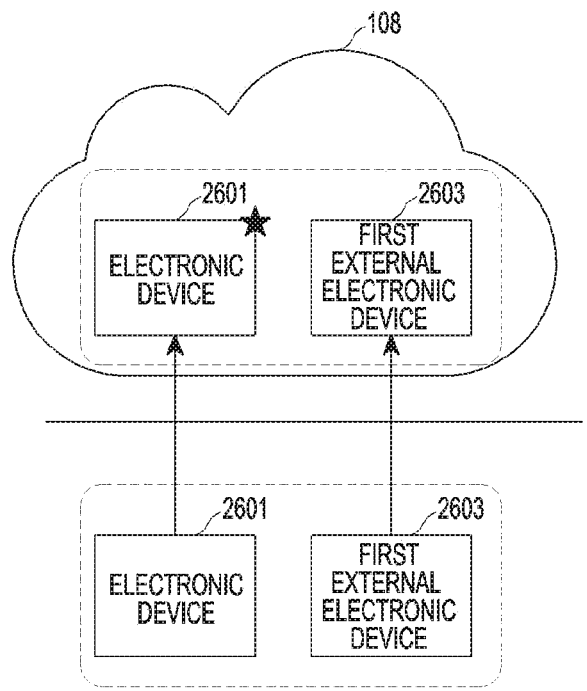
FIGS. 26A and 26B illustrate an operation of determining a leader device according to an embodiment.
Figure 26B:
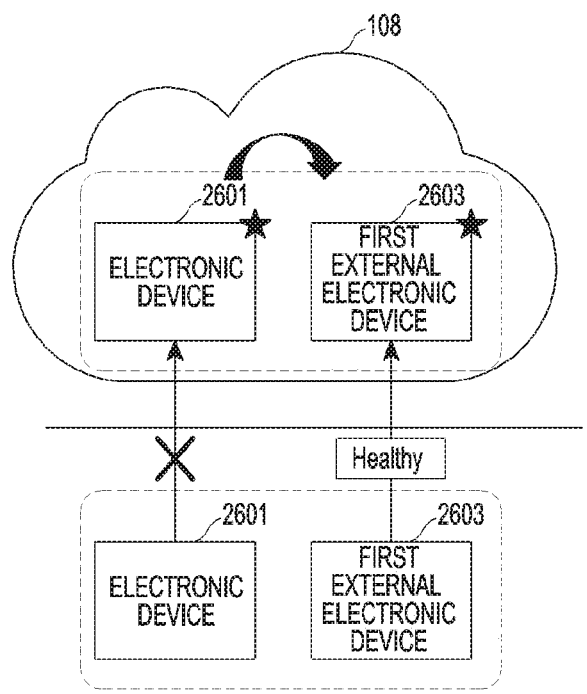

FIG. 25 is a flowchart (2500) illustrating an operation of determining a leader according to an embodiment. FIGS. 26A and 26B illustrate an operation of determining a leader device according to an embodiment.

Referring to FIGS. 25 and 26A, in operation 2501, according to an embodiment, an external server 108 (e.g., the server 108) may periodically receive a first packet Internet groper (ping) about the network environment of an electronic device 2601 (e.g., the electronic device 101) from the electronic device 2601.

In operation 2503, according to an embodiment, the external server 108 may periodically receive a second ping about the network environment of a first external electronic device 2603 (e.g., the electronic device 102 or 104) from the first external electronic device 2603. As illustrated in FIG. 26A, the external server 108 may periodically receive the first ping and the second ping from the electronic device 2601 and the first external electronic device 2603, respectively.

Referring back to FIG. 25, in operation 2505, according to an embodiment, the external server 108 may receive first information and a leader request to select a leader from the electronic device 2601. For example, if the electronic device 2601 receives a wake-up utterance and transmits first information about the wake-up utterance, the external server 108 may receive the first information and a leader request from the electronic device 2601. The external server 108 may periodically receive the first ping until receiving a leader request from the electronic device 2601.

In operation 2507, according to an embodiment, the external server 108 may receive second information and a leader request to select a leader from a first external electronic device 2603. For example, if the first external electronic device 2603 receives a wake-up utterance and transmits second information about the wake-up utterance, the external server 108 may receive the second information and a leader request from the first external electronic device 2603. The external server 108 may periodically receive the second ping until receiving a leader request from the first external electronic device 2603.

In operation 2509, according to an embodiment, the external server 108 may select the leader device using the first information, information about the first ping, the second information, and information about the second ping. For example, if the SNR included in the first information is larger than the SNR included in the second information, and the network environment of the electronic device and the network environment of the first external electronic device 2603 are determined to be normal(healthy) based on the information about the first ping and the information about the second ping, the external server 108 may select the electronic device with the larger SNR as the leader device. As another example, if the network of the electronic device 2601 is determined to be not normal (unhealthy) based on the information about the first ping, although the SNR included in the first information is larger than the SNR included in the second information, as illustrated in FIG. 26B, the external server 108 may identify the first external electronic device 2603 as the leader device. For example, if the count of the first ping is smaller than the count of the second ping, the network state of the electronic device may be determined to be not normal (unhealthy).

As described above, according to an embodiment, the external server 108 may select a leader device based on the network environment of the first external electronic device and the electronic device 101 having requested to select a leader device. Accordingly, an electronic device which has a poor network environment may be prevented from being selected as the leader device.

Figure 27:
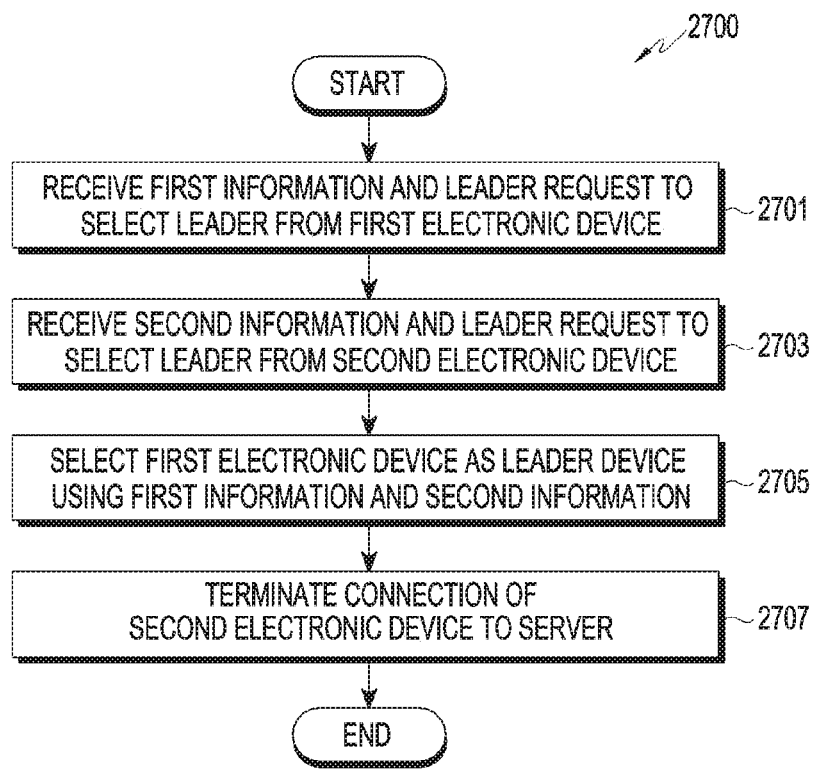
FIG. 27 is a flowchart illustrating a method of determining a leader device according to an embodiment.
Figure 28A:
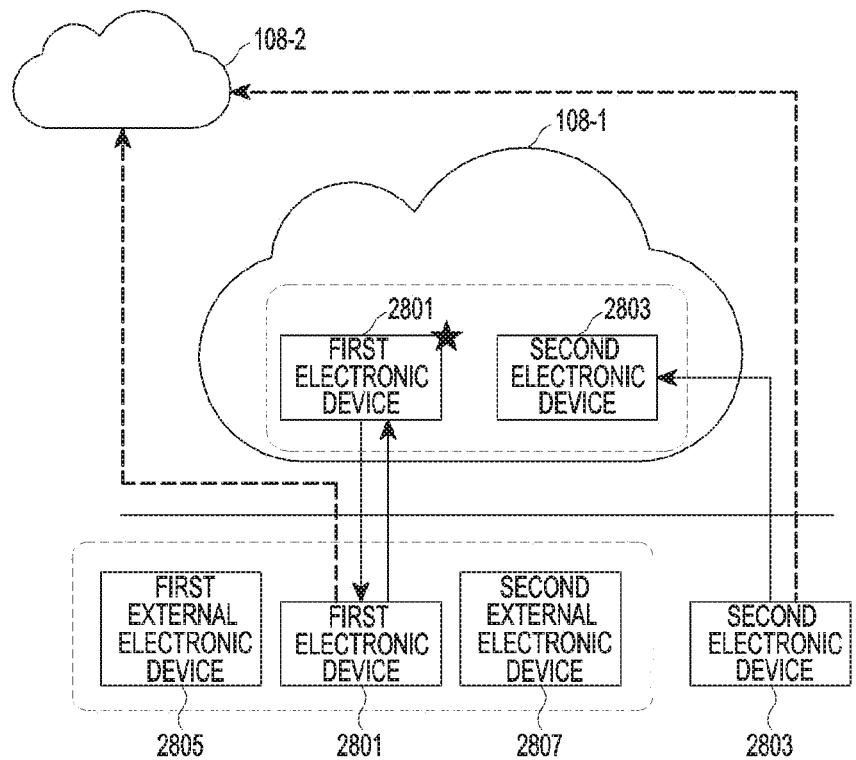
FIGS. 28A and 28B illustrate an operation of determining a leader device according to an embodiment.
Figure 28B:
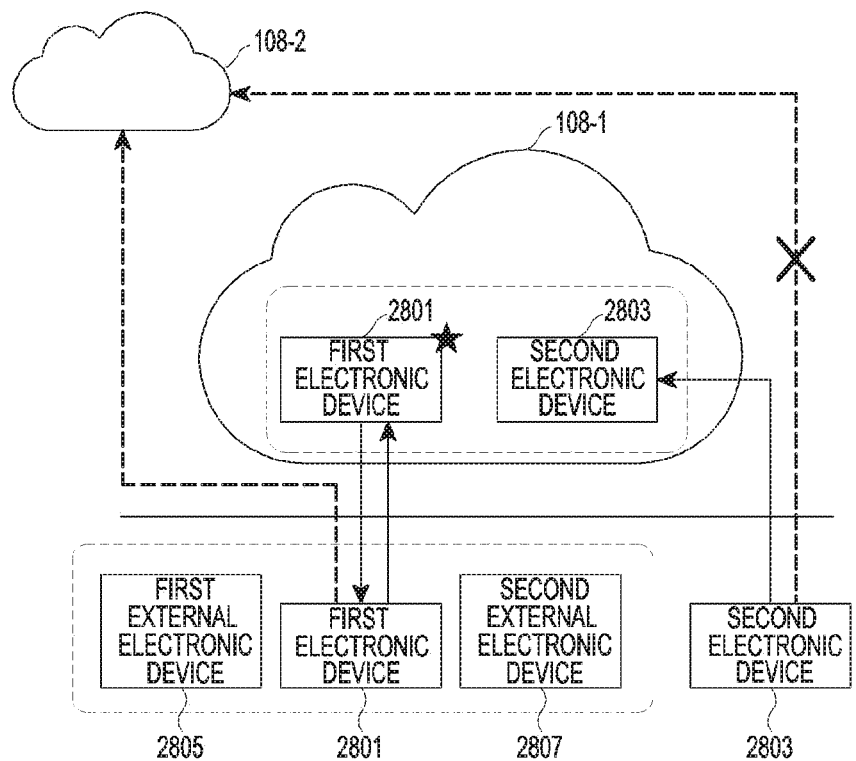

FIG. 27 is a flowchart (2700) illustrating an operation of determining a leader according to an embodiment. FIGS. 28A and 28B illustrate an operation of determining a leader device according to an embodiment.

Referring to FIGS. 27 and 28A, in operation 2701, according to an embodiment, an external server 108-1 (e.g., the server 108) may receive first information and a leader request to select the leader from a first electronic device 101 (e.g., the electronic device 101). For example, as illustrated in FIG. 28A, the external server 108-1 may receive first information and a leader request to select a leader from the first electronic device 2801. For example, the first electronic device 2801 may be in the state of being connected with a first AP, and the leader device may be determined from among the first electronic device 2801, the first external electronic device 2805, and the second external electronic device 2807 connected with the first AP.

Referring back to FIG. 27, in operation 2703, according to an embodiment, the external server 108-1 may receive second information and a leader request to select a leader from a second electronic device (e.g., the electronic device 102). For example, as illustrated in FIG. 28A, the external server 108-1 may receive second information and a leader request to select a leader from the second electronic device 2803. The second electronic device 2803 may be in the state of being connected with a second AP different from the first AP, and the leader device may be determined from among at least one external electronic device connected with the second AP. Or, the second electronic device 2803 may be in the state of using a 4G or 5G mobile communication scheme.

Referring back to FIG. 27, in operation 2705, according to an embodiment, the external server 108-1 may select the first electronic device as the leader device based on the first information received from the first electronic device 101 and the second information received from the second electronic device. For example, if the leader selection by the external server 108-1 is delayed a predetermined time or more, the first electronic device 101 and the second electronic device may connect to a server 108-2 to provide an intelligent assistant service without leader selection by the external server 108-1.

In operation 2707, according to an embodiment, the external server 108-1 may terminate the connection with the server 108-2 providing an intelligent assistant service with the second electronic device. Referring to FIG. 28B, if an electronic device (i.e., the second electronic device 2803) other than the first electronic device 2801 selected as the leader device is connected with the server 108-2 providing the intelligent assistant service at the time when the external server 108-1 completes the leader selection, the connection may be terminated. Thus, only the electronic devices requesting to select a leader may be awakened while preventing all the electronic devices receiving the wake-up utterance from waking up.

Figure 29B:
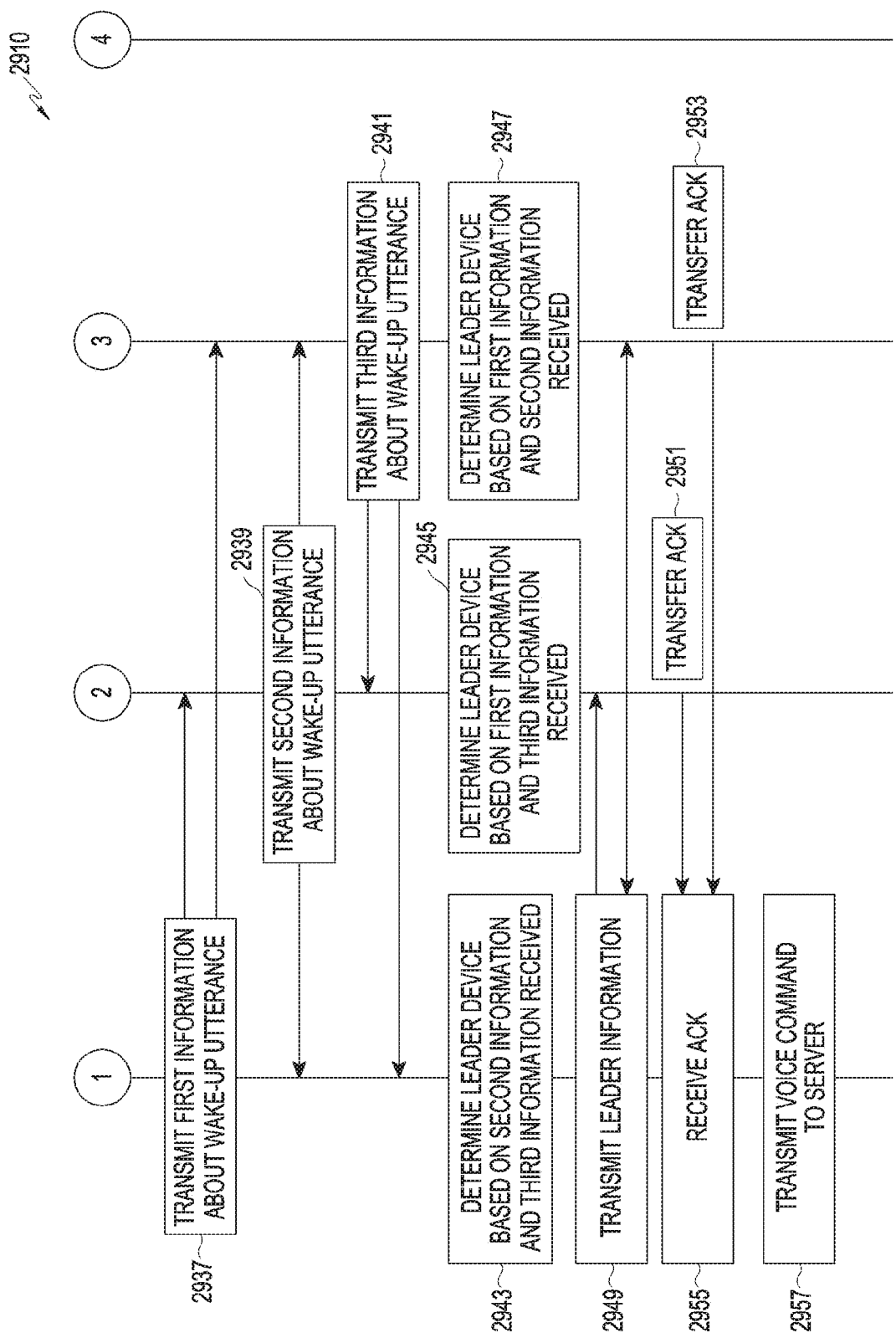

FIGS. 29A and 29B are sequence diagrams (2900 and 2910) illustrate an operation of determining a leader device according to an embodiment. In FIGS. 29A and 29B, it may be assumed that the electronic device 101, the first external electronic device 2901, and the second external electronic device 2903 are in the state of being connected with an AP 2905. The electronic device 101, the first external electronic device 2901, and the second external electronic device 2903 may receive voice information 2911 issued by the user, and the voice information 2911 may include a wake-up utterance and a voice command. Although FIGS. 29A and 29B illustrate that operations 2913 to 2957 are performed after the voice information 2911 is received, operations 2913 to 2957 may be performed while receiving the voice information 2911.

Referring to FIG. 29A, in operation 2913, according to an embodiment, when at least part of a wake-up utterance is received, the electronic device 101 (e.g., the processor 120) may broadcast the IP address of the electronic device 101. For example, the electronic device 101 may broadcast the IP address through the AP 2905 as shown in FIG. 29A. For example, the electronic device 101 may broadcast the IP address through an AP.

In operation 2915, according to an embodiment, the first external electronic device 2901 (e.g., the electronic device 102 or 104) may receive the IP address of the electronic device 101.

In operation 2917, according to an embodiment, the second external electronic device 2903 (e.g., the electronic device 102 or 104) may receive the IP address of the electronic device 101.

In operation 2919, according to an embodiment, when at least part of the wake-up utterance is received, the first external electronic device 2901 may broadcast the IP address of the first external electronic device 2901.

In operation 2923, according to an embodiment, the electronic device 101 may receive the IP address of the first external electronic device 2901.

In operation 2921, according to an embodiment, the second external electronic device 2903 may receive the IP address of the first external electronic device 2901.

In operation 2925, according to an embodiment, when at least part of the wake-up utterance is received, the second external electronic device 2903 may broadcast the IP address of the second external electronic device 2903.

In operation 2929, according to an embodiment, the electronic device 101 may receive the IP address of the second external electronic device 2903.

In operation 2927, according to an embodiment, the first external electronic device 2901 may receive the IP address of the second external electronic device 2903.

In operation 2931, according to an embodiment, the electronic device 101 may generate an IP address list for the external electronic devices connected with the AP based on the IP address of the first external electronic device 2901 and the IP address of the second external electronic device 2903.

In operation 2933, according to an embodiment, the first external electronic device 2901 may generate an IP address list for the external electronic devices connected with the AP based on the IP address of the electronic device 101 and the IP address of the second external electronic device 2903.

In operation 2935, according to an embodiment, the second external electronic device 2903 may generate an IP address list for the external electronic devices connected with the AP based on the IP address of the electronic device 101 and the IP address of the first external electronic device 2901.

Referring to FIG. 29B, in operation 2937, according to an embodiment, upon receiving the whole wake-up utterance, the electronic device 101 may transmit first information about the received wake-up utterance. For example, the first information may include at least of the SNR, audio quality, volume, sound pressure, or confidence score of the wake-up utterance received from the electronic device 101. For example, the electronic device 101 may transmit the first information to each of the first external electronic device 2901 and the second external electronic device 2903 through UDP communication scheme. Although not illustrated in FIGS. 29A and 29B, the electronic device 101 may receive an ACK from each of the first external electronic device 2901 and the second external electronic device 2903, corresponding to the transmission of the first information.

In operation 2939, according to an embodiment, upon receiving the whole wake-up utterance, the first external electronic device 2901 may transmit second information about the received wake-up utterance. For example, the second information may include at least one of the SNR, audio quality, volume, sound pressure, or confidence score of the wake-up utterance received from the first external electronic device 2901.

In operation 2941, according to an embodiment, upon receiving the whole wake-up utterance, the second external electronic device 2903 may transmit third information about the received wake-up utterance. For example, the third information may include at least one of the SNR, audio quality, volume, sound pressure, or confidence score of the wake-up utterance received from the second electronic device 2903.

Although the electronic device 101, the first external electronic device 2901, and the second external electronic device 2903 receive the same voice information issued by the user, the first information, the second information, and the third information may differ from each other depending on differences in ambient environment and where the electronic device 101, the first external electronic device 2901, and the second external electronic device 2903 are located.

Although FIGS. 29A and 29B illustrate that when at least part of a wake-up utterance is received, the electronic device 101 broadcasts the IP address of the electronic device 101 and receives IP addresses from the first and second external electronic devices 2901 and 2903 in operations 2913 to 2935, operations 2913 to 2935 may be omitted if there is an IP address list stored. In this case, in operations 2937 to 2941, the electronic device 101 may transmit first information about the wake-up utterance through connection (e.g., peer-to-peer (P2P)) with the external electronic device using information contained in the stored IP address list and receive information about the wake-up utterance from the external electronic device.

The electronic device 101 may add the IP address received in operations 2913 to 2929 to the stored IP address list. Accordingly, the electronic device 101 may transmit and receive the first information about the wake-up utterance through connection (e.g., peer-to-peer (P2P)) with the external electronic device included in the IP address list and transmit and receive the first information about the wake-up utterance by performing connection via the AP with the external electronic device not included in the IP address list.

The IP address list may be a list of IP addresses received from the external electronic devices before the electronic device 101 receives the voice information 2911 and may be stored for a predetermined time (e.g., 24 hours). The electronic device 101 may initialize the IP address list at each period (e.g., 24 hours) to update the information about the external electronic devices connected with the AP 2905. When there is no response during a particular time or a particular number of times while communicating via connection with the external electronic devices included in the IP address list, the external electronic devices may be deleted out of the IP address list.

In operation 2943, according to an embodiment, the electronic device 101 may determine the leader device based on the second information and third information received. For example, when the SNR included in the first information is the largest among the SNR included in the first information, the SNR included in the second information, and the SNR included in the third information, the electronic device 101 may determine that the electronic device 101 itself is the leader device. As another example, when the confidence score of wake-up utterance included in the first information is the largest among the confidence score of wake-up utterance included in the first information, the confidence score of wake-up utterance included in the second information, and the confidence score of wake-up utterance included in the third information, the electronic device 101 may determine that the electronic device 101 itself is the leader device.

The electronic device 101 may determine the leader device using both the SNR and the confidence score of wake-up utterance.

In operation 2945, according to an embodiment, the first external electronic device 2901 may determine the leader device based on the first information and third information received. For example, when the SNR included in the first information is the largest among the SNR included in the first information, the SNR included in the second information, and the SNR included in the third information, the first external electronic device 2901 may determine that the electronic device 101 is the leader device (i.e., that the first external electronic device 2901 is not the leader device). As another example, when the confidence score of wake-up utterance included in the first information is the largest among the confidence score of wake-up utterance included in the first information, the confidence score of wake-up utterance included in the second information, and the confidence score of wake-up utterance included in the third information, the first external electronic device 2901 may determine that the electronic device 101 is the leader device (i.e., that the first external electronic device 2901 is not the leader device). The first external electronic device 2901 may determine the leader device using both the SNR and the confidence score of wake-up utterance.

In operation 2947, according to an embodiment, the second external electronic device 2903 may determine the leader device based on the first information and second information received. For example, when the SNR included in the first information is the largest among the SNR included in the first information, the SNR included in the second information, and the SNR included in the third information, the second external electronic device 2903 may determine that the electronic device 101 is the leader device (i.e., that the second external electronic device 2903 is not the leader device). As another example, when the confidence score of wake-up utterance included in the first information is the largest among the confidence score of wake-up utterance included in the first information, the confidence score of wake-up utterance included in the second information, and the confidence score of wake-up utterance included in the third information, the second external electronic device 2903 may determine that the electronic device 101 is the leader device (i.e., that the second external electronic device 2903 is not the leader device). The second external electronic device 2903 may determine the leader device using both the SNR and the confidence score of wake-up utterance.

In operation 2949, according to an embodiment, the electronic device 101 may transmit leader information to indicate that the electronic device 101 is the leader device to the first external electronic device 2901 and the second external electronic device 2903. For example, the electronic device 101 may transmit the leader information to each of the first external electronic device 2901 and the second external electronic device 2903 through UDP communication scheme (1:N).

In operation 2951, according to an embodiment, the first external electronic device 2901 may transmit an ACK to the electronic device 101, corresponding to the reception of the leader information.

In operation 2953, according to an embodiment, the second external electronic device 2903 may transmit an ACK to the electronic device 101, corresponding to the reception of the leader information.

In operation 2955, according to an embodiment, the electronic device 101 may receive ACKs from both the first external electronic device 2901 and the second external electronic device 2903 to which the leader information is transmitted.

In operation 2957, according to an embodiment, the electronic device 101 may transmit a voice command to a server.

As set forth above, according to an embodiment, upon receiving part of a wake-up utterance, the electronic device 101 may broadcast the IP address and generate an IP address list using the IP addresses broadcast from external electronic devices. Upon receiving the whole wake-up utterance, the electronic device 101 may transmit information about the wake-up utterance to each external electronic device based on the generated IP address list and determine the leader device using information about the wake-up utterance transmitted from the external electronic devices. Thus, increased accuracy may be achieved for information about wake-up utterances transmitted or received, and an intelligent assistant service may be provided to the user although not all of the devices are connected to the server.

Figure 30:
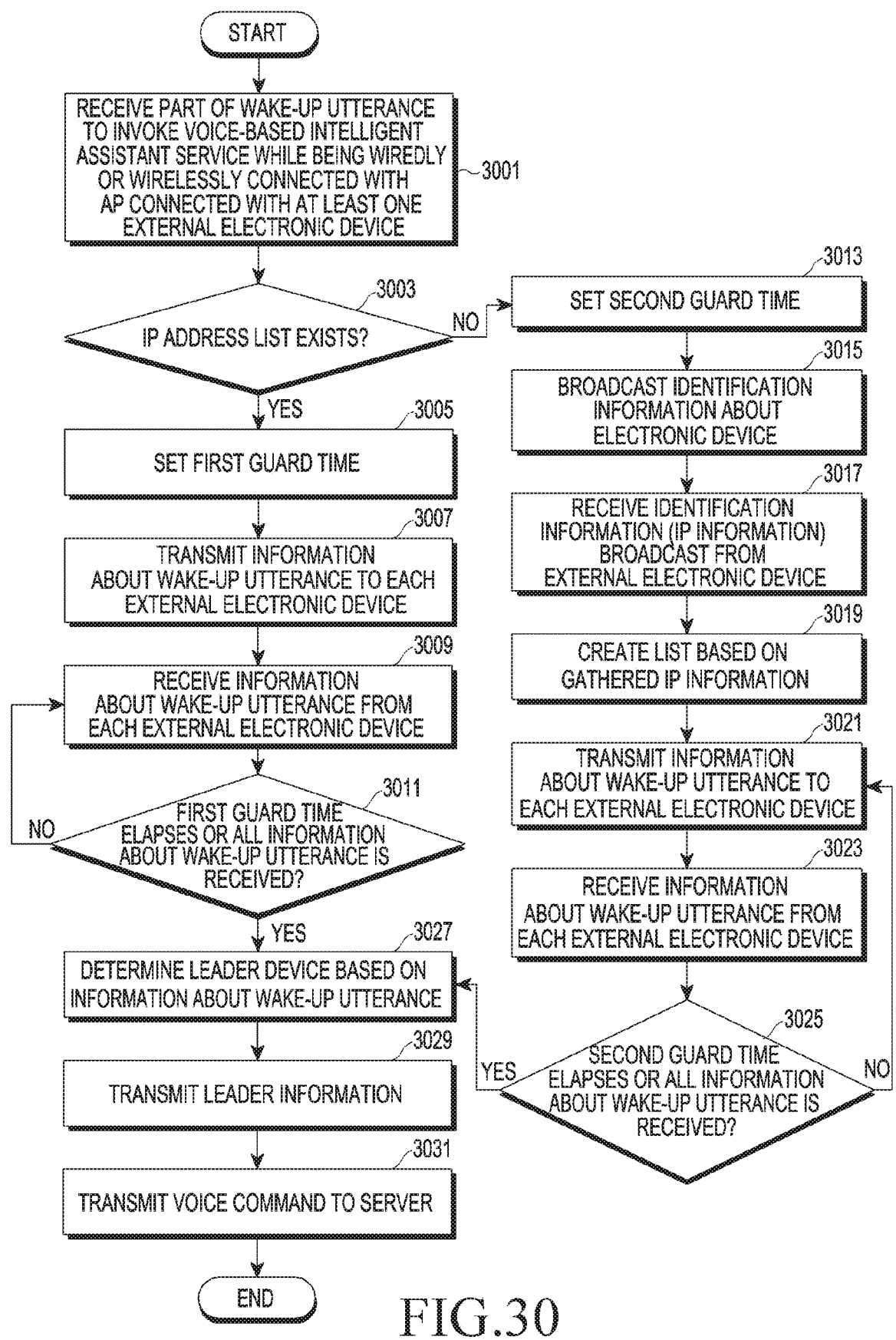
FIG. 30 is a flowchart illustrating a method of determining a leader device according to an embodiment.

FIG. 30 is a flowchart (3000) illustrating an operation of determining a leader according to an embodiment.

Referring to FIG. 30, in operation 3001, the electronic device 202, along with the second electronic device 204 and the third electronic device 206, is connected with the AP 208 while receiving, from the user, a wake-up utterance to invoke a voice-based intelligent assistant service. Operation 3001 may be triggered at the time of receiving part of the wake-up utterance. For example, when the wake-up utterance is "Hi, Bixby," the time of receiving part of the wake-up utterance may be a first time when part, "Hi," of "Hi, Bixby" is received.

In operation 3003, the electronic device 101 may determine whether there is an IP address list. For example, the IP address list may be a list received from the AP 208 or a list of IP addresses received and stored, which are broadcast from external electronic devices before the electronic device 101 receives the wake-up utterance in operation 3001. The electronic device 101 may store the IP address list during a designated time (e.g., 24 hours).

When there is determined to be an IP address list in operation 3003, the electronic device 101 may set a first guard time in operation 3005. For example, the electronic device 101 may shorten a preset guard time and set it as the first guard time.

In operation 3007, the electronic device 101 may transmit information about the wake-up utterance to each external electronic device included in the IP address list. Operation 3007 may be initiated after a second time when the electronic device 101 receives the whole wake-up utterance. For example, the information about the wake-up utterance may include at least one of the SNR, audio quality or sound pressure of the wake-up utterance received through the microphone by the electronic device 101, a feature value of the input sound signal, or the confidence score of wake-up utterance. For example, the confidence score of wake-up utterance may be a value indicating the similarity between a pre-stored wake-up utterance and the wake-up utterance received through the microphone. The degree of match between the pre-stored wake-up utterance and the wake-up utterance received through the microphone may be set to a value ranging from 0 to 100, and as the distance between the user and the device decreases, the similarity may increase.

In operation 3009, the electronic device 101 may individually receive information about the wake-up utterance received from each external electronic device from each of the external electronic devices included in the IP address list.

In operation 3011, the electronic device 101 may determine whether the first guard time elapses or whether all the information about the wake-up utterance received by each external electronic device is received.

When the first guard time elapses or all the information about the wake-up utterance is received, the electronic device 101 may determine the leader device based on the information about the wake-up utterance in operation 3027. In other words, even when all the information about the wake-up utterance is not received, the electronic device 101 may determine the leader device if the first guard time elapses.

When there is not determined to be an IP address list, the electronic device 101 may set a second guard time in operation 3013. For example, the electronic device 101 may extend a preset guard time and set it as the second guard time.

In operation 3015, the electronic device 101 may broadcast identification information about the electronic device 101. For example, the identification information about the electronic device 101 may include the IP address of the electronic device 101.

In operation 3017, the electronic device 101 may receive the identification information broadcast from at least one external electronic device. For example, the identification information broadcast from at least one external electronic device may include the IP addresses of the at least one external electronic device.

In operation 3019, the electronic device 101 may generate an IP address list based on the received identification information.

In operation 3021, the electronic device 101 may transmit information about the wake-up utterance to each external electronic device included in the IP address list. For example, the information about the wake-up utterance may include at least one of the SNR, audio quality or sound pressure of the wake-up utterance received through the microphone by the electronic device 101, a feature value of the input sound signal, or the confidence score of wake-up utterance.

In operation 3023, the electronic device 101 may receive information about the wake-up utterance from each external electronic device included in the IP address list. The information about the wake-up utterance received from the external electronic device may include at least one of the SNR, audio quality or sound pressure of the wake-up utterance received through the microphone by the external electronic device, a feature value of the input sound signal, or the confidence score of wake-up utterance.

In operation 3025, the electronic device 101 may determine whether the second guard time elapses or whether all the information about the wake-up utterance received by each external electronic device is received.

When the second guard time elapses or all the information about the wake-up utterance is received, the electronic device 101 may determine the leader device based on the information about the wake-up utterance in operation 3027.

In operation 3029, the electronic device 101 may transmit the leader information to the external electronic devices included in the IP address list. In operation 3029, it may be assumed that the electronic device 101 is determined to be the leader device. The electronic device 101 may transmit leader information via connection and receive an ACK.

In operation 3031, the electronic device 101 may transmit a voice command via connection with an intelligent assistant server. Thus, if there is an IP address list stored, the electronic device 101 may omit the process of transmitting or receiving the IP address, thereby shortening the time of determining the leader device.

According to an embodiment, an electronic device 101 comprises a user interface, at least one communication module (e.g., the communication module 190), a microphone, at least one speaker (e.g., the sound output device 155), at least one processor (e.g., the processor 120) operatively connected with the user interface, the at least one communication module (e.g., the communication module 190), the microphone, and the at least one speaker (e.g., the sound output device 155), and at least one memory (e.g., the memory 130) operatively connected with the at least one processor (e.g., the processor 120) wherein the at least one memory (e.g., the memory 130) stores instructions executed to enable the at least one processor (e.g., the processor 120) to, while the electronic device 101 is wiredly or wirelessly connected with an access point (AP) (e.g., the AP 405) connected with at least one external electronic device (e.g., the electronic devices 102 and 104), after receive part of a wake-up utterance to invoke a voice-based intelligent assistant service through the microphone broadcast identification information about the electronic device 101 and receive identification information broadcast from the at least one external electronic device (e.g., the electronic devices 102 and 104), after receiving the whole wake-up utterance through the microphone individually transmit first information related to the wake-up utterance received through the microphone to the at least one external electronic device (e.g., the electronic devices 102 and 104) and individually receive second information related to the wake-up utterance received by the at least one external electronic device (e.g., the electronic devices 102 and 104) from the at least one external electronic device (e.g., the electronic devices 102 and 104), and determine whether to transmit voice information received after the wake-up utterance to an external server (e.g., the server 108) based on at least part of the first information and the second information.

According to an embodiment, the first information and the second information may include at least one of a signal-to-noise ratio (SNR), audio quality, volume, sound pressure, or confidence score of the wake-up utterance.

According to an embodiment, a confidence score of a first wake-up utterance included in the first information may be a value to indicate a degree at which information about a wake-up utterance stored in the memory (e.g., the memory 130) matches the wake-up utterance received through the microphone.

According to an embodiment, the instructions may be configured to enable the processor (e.g., the processor 120) to transmit the voice information received after the wake-up utterance to the external server (e.g., the server 108) when a first value included in the first information is larger than a second value included in the second information and refrain from transmitting the voice information received after the wake-up utterance to the external server (e.g., the server 108) when the first value is smaller than the second value.

According to an embodiment, the instructions may be configured to enable the processor (e.g., the processor 120) to send a request for the second information to at least one (e.g., the electronic devices 102 and 104), failing to receive the wake-up utterance-related second information, of the at least one external electronic device (e.g., the electronic devices 102 and 104) and receive the second information from the at least one external electronic device (e.g., the electronic devices 102 and 104) to which the request is transmitted.

According to an embodiment, the first information may include state information about the electronic device 101, and the second information includes state information about the at least one external electronic device (e.g., the electronic devices 102 and 104). The state information may include at least one of type information, information about a running application, information about a distance to a user, or priority information.

According to an embodiment, the instructions may be configured to enable the processor (e.g., the processor 120) to individually transmit the first information to the at least one external electronic device (e.g., the electronic devices 102 and 104) through user datagram protocol (UDP) communication based on identification information about the at least one external electronic device (e.g., the electronic devices 102 and 104).

According to an embodiment, the instructions may be configured to enable the processor (e.g., the processor 120) to perform user authentication to indicate whether the wake-up utterance is an utterance issued from at least one registered user based on the wake-up utterance received through the microphone.

According to an embodiment, the instructions may be configured to enable the processor (e.g., the processor 120) to transmit leader information indicating that the electronic device 101 is a leader device to the external server (e.g., the server 108) when the voice information received after the wake-up utterance is determined to be transmitted to the external server (e.g., the server 108).

According to an embodiment, the instructions may be configured to enable the processor (e.g., the processor 120) to receive a leader selection in response to the leader information from the external server (e.g., the server 108) and receive the voice information based on the received leader selection and transmit the voice information to the external server (e.g., the server 108).

According to an embodiment, the instructions may be configured to enable the processor (e.g., the processor 120) to receive a leader change command in response to the leader information from the external server (e.g., the server 108) and refrain from transmitting the voice information to the external server (e.g., the server 108) based on the received leader change command.

According to an embodiment, the instructions may be configured to enable the processor (e.g., the processor 120) to output a response corresponding to the wake-up utterance through at least one of the at least one speaker (e.g., the sound output device 155) or the user interface when the voice information received after the wake-up utterance is determined to be transmitted to the external server (e.g., the server 108).

According to an embodiment, the instructions may be configured to enable the processor (e.g., the processor 120) to receive a voice command indicating a leader change command through the microphone and refrain from transmitting the voice information to the external server (e.g., the server 108) based on, at least, a result of processing the voice command indicating the leader change command.

According to an embodiment, an electronic device 101 comprises a communication module (e.g., the communication module 190), a microphone, a speaker (e.g., the sound output device 155), at least one processor (e.g., the processor 120) operatively connected with the communication module (e.g., the communication module 190), the microphone, and the speaker (e.g., the sound output device 155), and a memory (e.g., the memory 130) operatively connected with the at least one processor (e.g., the processor 120), wherein the memory (e.g., the memory 130) may store instructions executed to enable the at least one processor (e.g., the processor 120) to, upon receiving part of a wake-up utterance to invoke a voice-based intelligent assistant service through the microphone, determine whether the electronic device 101 is in a state of being connected with an AP (e.g., the AP 405) through the communication module (e.g., the communication module 190) and when the electronic device 101 is in the state of being connected with the AP (e.g., the AP 405), broadcast identification information about the electronic device 101 through the communication module (e.g., the communication module 190), receive at least one piece of identification information broadcast from at least one external electronic device (e.g., the electronic devices 102 and 104) connected with the AP (e.g., the AP 405), after receiving the whole wake-up utterance through the microphone, transmit first information about the wake-up utterance to each of the at least one external electronic device (e.g., the electronic devices 102 and 104), receive at least one piece of second information about the wake-up utterance from each of the at least one external electronic device (e.g., the electronic devices 102 and 104), determine whether the electronic device 101 is a leader device based on the first information and the at least one piece of second information, when the electronic device 101 is not in the state of being connected with the AP (e.g., the AP 405), after receiving the whole wake-up utterance through the microphone, transmit the first information about the wake-up utterance to an external server (e.g., the server 108) and receive leader information obtained based on the first information and the at least one piece of second information from the external server (e.g., the server 108).

According to an embodiment, the first information and the second information may include at least one of a signal-to-noise ratio (SNR), audio quality, volume, sound pressure, or confidence score of the wake-up utterance.

According to an embodiment, a confidence score of a first wake-up utterance included in the first information may be a value to indicate a degree at which information about a wake-up utterance stored in the memory (e.g., the memory 130) matches the wake-up utterance received through the microphone.

According to an embodiment, the first information may include a first value indicating a strength of the wake-up utterance received through the microphone, and the at least one piece of second information may include a second value indicating a strength of the wake-up utterance received by the at least one external electronic device (e.g., the electronic devices 102 and 104). The instructions may enable the processor (e.g., the processor 120) to determine that the electronic device 101 is the leader device when the first value is larger than the second value and refrain from determining that the electronic device 101 is the leader device when the first value is smaller than the second value.

According to an embodiment, the first information may include a third value indicating a confidence score of the wake-up utterance received through the microphone, and the at least one piece of second information may include a fourth value indicating a confidence score of the wake-up utterance received by the at least one external electronic device (e.g., the electronic devices 102 and 104). The instructions may enable the processor (e.g., the processor 120) to determine that the electronic device 101 is the leader device when the third value is larger than the fourth value and refrain from determining that the electronic device 101 is the leader device when the third value is smaller than the fourth value.

According to an embodiment, the instructions may be configured to enable the processor (e.g., the processor 120) to determine whether the at least one external electronic device (e.g., the electronic devices 102 and 104) includes an external electronic device (e.g., the electronic devices 102 and 104) not transmitting the second information based on the at least one piece of second information received and when there is an external electronic device (e.g., the electronic devices 102 and 104) not transmitting the second information, request the external electronic device (e.g., the electronic devices 102 and 104) to transmit the second information and, when there is no external electronic device (e.g., the electronic devices 102 and 104) not transmitting the second information, determine that the electronic device (e.g., the electronic device 101) is the leader device based on the first information and the at least one piece of second information.

According to an embodiment, a server comprises at least one communication module, at least one processor operatively connected with the at least one communication module, and at least one memory operatively connected with the at least one processor, wherein the at least one memory may store instructions executed to enable the at least one processor to receive first information and a leader request to select a leader from a first electronic device through the at least one communication module, transmit a leader selection to the first electronic device through the at least one communication module in response to the leader request, and receive a leader lock request from the first electronic device through the at least one communication module.

According to an embodiment, the instructions may be configured to enable the processor to receive second information and a leader request to select a leader from a second electronic device through the at least one communication module, identify a leader device based on the first information and the second information, when the first electronic device is identified to be the leader device, confirm the leader lock request from the first electronic device, and when the second electronic device is identified to be the leader device, reject the leader lock request from the first electronic device.

According to an embodiment, the instructions may be configured to enable the processor to periodically receive a first ping about a network environment of the first electronic device, periodically receive a second ping about a network environment of the second electronic device, and identify the leader device using information about the first ping, information about the second ping, the first information, and the second information.

According to an embodiment, the instructions may be configured to enable the processor to confirm the leader lock request from the first electronic device in response to the leader lock request and, after confirming the leader lock request from the first electronic device, upon receiving a leader request to select a leader device from the second electronic device within a preset time, reject the leader request from the second electronic device. According to an embodiment, the instructions may be configured to enable the processor to individually transmit, to the at least one external electronic device, a confidence score of a first wake-up utterance indicating a degree at which information about a wake-up utterance stored in the memory matches the wake-up utterance received through the microphone and individually receive, from the at least one external electronic device, a confidence score of a second wake-up utterance indicating a degree at which information about a wake-up utterance stored in the at least one external electronic device matches a wake-up utterance received by the at least one external electronic device.

The electronic device according to various embodiments may be one of various types of electronic devices. The electronic devices may include, e.g., a portable communication device (e.g., a smailphone), a computer device, a portable multimedia device, a portable medical device, a camera, a wearable device, a refrigerator, or other home appliance. According to an embodiment of the disclosure, the electronic device is not limited to the above-listed embodiments.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases.

As used herein, terms such as "1st" and "2nd," or "first" and "second" may be used to distinguish a corresponding component from another, but do not limit the components in other aspect (e.g., importance or order).

If an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, a module may be implemented in the form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to various embodiments, there may be provided an electronic device and server to select an electronic device to respond to a user's wake-up utterance among a plurality of electronic devices.

According to various embodiments, there may be provided an electronic device that, when part of a wake-up utterance is received, broadcasts its identification information to ambient electronic devices and receives identification information about the ambient electronic devices, which is broadcast from the ambient electronic devices. According to various embodiments, there may be provided an electronic device that, when the whole wake-up utterance is received, transmits information about the wake-up utterance to the ambient electronic devices, receives information about the wake-up utterance from the ambient electronic devices, and selects an electronic device to transfer the user's voice information to a server using the information about the wake-up utterance.

Therefore, an electronic device to respond to the user's wake-up utterance may be selected from among a plurality of electronic devices.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a display;
at least one communication circuitry;
a microphone;
at least one speaker;
at least one processor operatively connected with the display, the at least one communication circuitry, the microphone, and the at least one speaker; and
at least one memory operatively connected with the at least one processor, wherein the at least one memory stores instructions, which when executed, instruct the at least one processor to:
while the electronic device is wiredly or wirelessly connected with an access point (AP) connected with a plurality of external electronic devices:
based on receiving, through the microphone, a part of a wake-up utterance to invoke a voice-based intelligent assistant service during a first time, broadcast first identification information about the electronic device and receive at least one second identification information broadcasted from at least one external electronic device among the plurality of external electronic devices, wherein the at least one second identification information is broadcasted after receiving, by the at least one external electronic device, the part of the wake-up utterance,
based on receiving a whole of the wake-up utterance through the microphone after the first time, individually transmit first information related to the wake-up utterance received through the microphone to the at least one external electronic device based on the at least one second identification information broadcasted from at least one external electronic device and individually receive, from the at least one external electronic device, second information related to the wake-up utterance received by the at least one external electronic device based on the broadcasted first identification information, and
determine whether to transmit voice information received after the wake-up utterance to an external server based on at least part of the first information and the second information.

2. The electronic device of claim 1, wherein the first information and the second information include at least one of a signal-to-noise ratio (SNR), audio quality, volume, sound pressure, or a confidence score of the wake-up utterance.

3. The electronic device of claim 2, wherein the confidence score of the wake-up utterance included in the first information is a value to indicate a degree at which information about a pre-set wake-up utterance stored in the memory matches the wake-up utterance received through the microphone.

4. The electronic device of claim 1, wherein the instructions further instruct the processor to:
transmit the voice information received after the wake-up utterance to the external server when a first value included in the first information is larger than a second value included in the second information, and
refrain from transmitting the voice information received after the wake-up utterance to the external server when the first value is smaller than the second value.

5. The electronic device of claim 1, wherein the instructions further instruct the processor to:
send a request for the second information to at least one, failing to receive the wake-up utterance-related second information, of the at least one external electronic device, and
receive the second information from the at least one external electronic device to which the request is transmitted.

6. The electronic device of claim 1, wherein the first information includes state information about the electronic device, and the second information includes state information about the at least one external electronic device, and wherein the state information includes at least one of type information, information about a running application, information about a distance to a user, or priority information.

7. The electronic device of claim 1, wherein the instructions further instruct the processor to:
individually transmit the first information to the at least one external electronic device through user datagram protocol (UDP) communication based on identification information about the at least one external electronic device.

8. The electronic device of claim 1, wherein the instructions further instruct the processor to perform user authentication to indicate whether the wake-up utterance is an utterance issued from at least one registered user based on the wake-up utterance received through the microphone.

9. The electronic device of claim 1, wherein the instructions further instruct the processor to transmit leader information indicating that the electronic device is a leader device to the external server when the voice information received after the wake-up utterance is determined to be transmitted to the external server.

10. The electronic device of claim 9, wherein the instructions further instruct the processor to:
receive a leader selection in response to the leader information from the external server and receive the voice information based on the received leader selection, and transmit the voice information to the external server.

11. The electronic device of claim 9, wherein the instructions further instruct the processor to:
receive a leader change command in response to the leader information from the external server, and
refrain from transmitting the voice information to the external server based on the received leader change command.

12. The electronic device of claim 1, wherein the instructions further instruct the processor to output a response corresponding to the wake-up utterance through at least one of the at least one speaker or the display when the voice information received after the wake-up utterance is determined to be transmitted to the external server.

13. The electronic device of claim 12, wherein the instructions further instruct the processor to:
receive a voice command indicating a leader change command through the microphone and refrain from transmitting the voice information to the external server based on, at least, a result of processing the voice command indicating the leader change command.

* * * * *